(12) United States Patent
Maeda et al.

(10) Patent No.: US 6,678,026 B2
(45) Date of Patent: Jan. 13, 2004

(54) LIQUID CRYSTAL DEVICE AND ELECTRONIC APPARATUS

(75) Inventors: Tsuyoshi Maeda, Yamanashi-ken (JP); Osamu Okumura, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/114,066

(22) Filed: Apr. 3, 2002

(65) Prior Publication Data

US 2003/0103177 A1 Jun. 5, 2003

(30) Foreign Application Priority Data

| Apr. 10, 2001 | (JP) | ................................. 2001-111815 |
| Apr. 10, 2001 | (JP) | ................................. 2001-111816 |
| Apr. 10, 2001 | (JP) | ................................. 2001-111817 |
| Jun. 7, 2001 | (JP) | ................................. 2001-173105 |

(51) Int. Cl.$^7$ ............................................. G02F 1/1335
(52) U.S. Cl. .................... 349/113; 349/117; 349/114
(58) Field of Search ................. 439/114, 115, 439/113, 117, 118, 119, 130

(56) References Cited

U.S. PATENT DOCUMENTS

| 5,724,112 A | * | 3/1998 | Yoshida et al. ............. 349/117 |
| 6,108,064 A | * | 8/2000 | Minoura et al. ............. 349/130 |
| 6,380,993 B2 | * | 4/2002 | Maeda ........................ 349/63 |
| 6,580,484 B2 | * | 6/2003 | Okamoto et al. ............. 349/119 |

* cited by examiner

Primary Examiner—Frank G. Font
Assistant Examiner—Sang H. Nguyen
(74) Attorney, Agent, or Firm—Oliff & Berridge, PLC

(57) ABSTRACT

One objective of the present invention is to provide a liquid crystal device, and an electronic apparatus which includes this liquid crystal device, which are capable of reducing blurring of the pattern which is displayed on the display and enhancing the display quality, and are capable of providing sharp display.

The liquid crystal device of the present invention is characterized by comprising a pair of base plates, a liquid crystal layer, a reflective layer, and a directional frontal scattering film, and in that the directional frontal scattering film is arranged upon the liquid crystal panel so that when light from a light source K which is arranged on one surface side of said directional frontal scattering film is illuminated thereupon, and the parallel transmitted light, in which the diffused transmitted light has been eliminated from the entire transmitted light which has passed through said directional frontal scattering film, is observed by a light receiving portion which is arranged on the other surface side of said directional frontal scattering film, the polar angle θ direction which yields the minimum transmission ratio is upon the light reception side, and the polar angle direction which yields the maximum transmission ratio is upon the observation direction side.

48 Claims, 26 Drawing Sheets

LIQUID CRYSTAL DEVICE AND ELECTRONIC APPARATUS

BACKGROUND OF THE INVENTION

1. Field of the Invention

The present invention relates to a liquid crystal display device of a reflective type or a semi-transparent reflective type, which eliminates blurring of patterns on the display, and thus is able to provide a bright and sharp display, and an electronic apparatus comprising such a liquid crystal device.

2. Description of the Related Art

Many liquid crystal display devices which consume small amounts of electrical power are used as display sections in various types of electronic apparatus, such as notebook type personal computers, portable type game machines, electronic notebooks and the like. In particular, in recent years, accompanying the variety display contents, the demand for liquid crystal display devices which are capable of providing display in color is increasing. Furthermore, due to the requirement for lengthening of the battery operation time of the electronic apparatus, color liquid crystal display devices have been developed of a reflective type which do not require any back light device.

Outlines of examples of the structure of color liquid crystal display devices of prior art reflective types will now be described below with reference to the figures.

FIGS. 34A and 34B are enlarged outline sectional figures showing the essential elements of prior art reflective type color liquid crystal display devices. Among these figures, FIG. 34A shows a reflective type liquid crystal display device of a frontal scattering plate type, while FIG. 34B shows a liquid crystal display device of an internal reflection scattering plate type.

In the liquid crystal display device of the frontal scattering plate type shown in FIG. 34A, a liquid crystal layer 102 is sandwiched between a pair of glass base plates 100 and 101, and a color filter 104 is provided upon a surface portion on the liquid crystal layer 102 side of one glass base plate 101 (the upper one in the figure), while a light reflective layer 103 is provided upon a surface portion on the liquid crystal layer 102 side of the other glass base plate 100 (the lower one in the figure). Furthermore, for example, a frontal scattering film 105 in which metallic oxide particles are scattered as a filler in a base material made of triallylcyanate or the like of a thickness of 50 to 200 μm is adhered upon the upper surface side of the glass base plate 101 via a transparent adhesive material or an adhesive sheet (not shown in the figure), and a polarization plate 106 is provided over this.

With this reflective type liquid crystal device of the frontal scattering type, an incident light L1, after having passed through the polarization plate 106, the frontal scattering film 105, the glass base plate 101, the liquid crystal layer 102, and the color filter 104, is reflected by the surface of the light reflective layer 103 which also serves a drive electrode, and the reflected light is emitted from the liquid crystal device via the liquid crystal layer 102, the color filter 104, the glass base plate 101, the frontal scattering film 105, and the polarization plate 106, so as to be visible to the observer E as reflected light L2. Here, the light which is emitted from the liquid crystal device is controlled by the state of the liquid crystal layer 102. In other words, the polarization state of the reflected light is controlled by the alignment state of liquid crystal molecules in the liquid crystal layer 102, and, when the polarization state of the reflected light agrees with the polarization axis of the polarization plate 106, the reflected light passes through the polarization plate, so that display of the desired color is performed.

Furthermore, the liquid crystal display device of the internal reflection scattering plate type shown in FIG. 34B comprises a pair of glass base plates 100 and 101 and a liquid crystal layer 102, and a pixel electrode 107 made from an Al thin film or the like, which serves as a light reflective layer, is formed on the surface of the glass base plate 100 toward the liquid crystal layer 102 in a state such as to be provided with concave and convex portions which reflect light randomly. In this structure, upon the surface of the glass base plate 101 at the incident light side towards the liquid crystal layer 102, there is provided a color filter 104, and a polarization plate 106 is provided on the upper surface of the glass base plate 101. In the liquid crystal display device of the internal reflection scattering plate type, an incident light, after having passed through the polarization plate 106, the glass base plate 101, the color filter 104, and the liquid crystal layer 102, is randomly reflected by the surface of the light reflective layer 107 which is formed in a concave and convex shop so as to serve as a pixel electrode, and the reflected light, after having been converted into polarized light according to the state of the liquid crystal layer 102, passes through the color filter 104, the glass base plate 101, and the polarization plate 106 while being either transmitted or not transmitted by the polarization plate 106 according to its polarization state, so that, when it has been transmitted, it is visible as a color display by being incident upon the naked eye E of the observer as scattered light L3'.

By the way, in the prior art structure shown in FIG. 34A, the frontal scattering film 105 is used with the objective, when the light reflective layer 103 is a mirror reflection layer, of weakening the strong mirror reflection (regular reflection) in the particular direction which is unique to the mirror finished surface, so as thereby to enable a clear display over as wide a range as possible.

Since this type of the frontal scattering film 105 generally has a structure in which a large number of beads (with, for example, index of refraction n=1.4) of particle diameter approximately 4 μm (4×10$^{-6}$ m) are scattered in the interior of a acrylic resin layer (with, for example, index of refraction n=1.48 to 1.49 approximately) of thickness approximately 25~30 μm (25~30×10$^{-6}$ m), it is widely used in reflective type liquid crystal display devices for portable telephones, and reflective type liquid crystal display devices for portable type information apparatuses or the like.

As liquid crystal display devices for portable apparatuses, in addition to the reflective type, liquid crystal display devices of a semi transparent reflective type which comprises a back light are also known. Conventional semi transparent reflective type liquid crystal devices comprise the reflective layer being constituted as a semi transparent reflective layer. In the case of transmissive display, a transmissive display is performed by causing the light of the back light to arrive to the observer via the semi transparent reflective layer. In contrast, in the case in which the back light is not employed, this display is able efficiently to take advantage of reflected light and to function as a reflective type liquid crystal display device.

However, with the above described frontal scattering film, there is an undesirable tendency for mixing to occur between the different information in different pixels before it is perceived by the eye of the user, so that there is the problem that blurring of the pattern which is displayed on the display can easily occur. The present inventors have believed that in a reflective type liquid crystal display device such as shown in FIG. 34A, the pattern which is displayed on the display is blurred due to the scattering which is generated by the frontal scattering film 105 from when the incident light is reflected by the reflecting layer 103 until it reaches the eye of the user, so that, when an attempt is made to perform white display and black display upon adjacent pixels, it becomes difficult to distinguish the boundary between the white display and the black display due to the scattering action of the frontal scattering film 105. Furthermore, when the pattern which is displayed on the display is blurred in a liquid crystal device which comprises a color filter 104, there is a tendency for it to become difficult to distinguish the boundary of a display in color, and there is a fear that color mixing may occur, so that there is a fear that it may become impossible to provide desirable coloring performance.

Furthermore, in a liquid crystal display device shown in FIG. 34A, there has been a tendency for the display to be tinged with a yellow tinge (tinting of the display), which is undesirable.

Moreover, the blurring of a pattern which is displayed on the display, or the state of not obtaining sufficiently good coloring performance, can apply in the case of performing reflective display upon such a semi transparent reflective type liquid crystal display device as well.

Next, with the structure comprising the light reflective pixel electrode 107 having concavities and convexities (the internal scattering structure) such as shown in FIG. 34B, although with a frontal scattering film the fear of generation of the blurring of the above described type of display is small, there is the undesirable problem that the cost of production becomes high, since special process stages and a greater number of processes become required, due to manufacturing the pixel electrode 107 which has the concavities and convexities.

Furthermore, with a liquid crystal display device which uses the above described frontal scattering film 105, the point of view from which the most clear reflective display is obtained is the regular reflection direction at the incident angle θ of the incident light (taking the normal direction H to the liquid crystal panel 100a as being an angle of 0°), but, since this direction is the direction of surface reflection, and the observer E observes the display avoiding the direction of surface reflection. Accordingly, there is the problem that when this is done the brightness is low, and the reflective display is not seen vividly. This is due to the reasons below. With a liquid crystal display device which uses the frontal scattering film 105 described above, the peak of transmission light is at the angle β which is equal to the absolute value of the incident angle θ of the incident light L1. Therefore, the reflected light L2 exhibits a peak at the angle β which is equal to the absolute value of the incident angle θ, so that the reflected light L2 is less at positions which are spaced away from the emission angle β. However in general, when the observer E observes the display, the reflected light L2 of the incident light L1 from an illumination source or the like which is incident upon the panel 10a from a slanting direction which inclines in the range of 20° to 35° with respect to the normal H to the liquid crystal panel 10a is observed from a direction which is spaced away from the regular reflection direction by −30° to 0°. Therefore the brightness when seen far from the emission angle β of the reflected light L2 is low, and the pattern which is displayed on the display is not seen vividly.

Moreover, when the reflective type liquid crystal display device shown in FIG. 34A is observed from a direction which somewhat deviates from the regular reflection direction, it is subject to the problem that it is hard to distinguish the pattern which is displayed on the display because this is a region in which the contrast is low. The present inventors believe that this reduction of contrast in the conventional reflective type liquid crystal display devices occurs because the regions in which the contrast is high are deviated from the regions which are seen from directions which are in the vicinity of the normal direction or which are more towards the normal direction than the regular reflection direction.

From the above background, and as the result of intensively considering a frontal scattering film and further studying the same, the present inventors have come to realize that it is possible to eliminate blurring of the pattern which is displayed on the display of a liquid crystal display device by applying directivity to the scattering characteristic of the frontal scattering film, and have arrived at the invention of the present application. Furthermore, as the result of intensively considering a frontal scattering film and further studying the same, the present inventors had the knowledge that, in the case of a liquid crystal device comprising the frontal scattering film 105, which is shown in FIG. 34A, the fear that the scattered light which is created when the incident light L1 passes through the frontal scattering film 105 at the first time exerts a great influence upon blurring of the pattern which is displayed on the display is small. Moreover, they have arrived at the knowledge that the diffusion which is created when it becomes reflected light and passes through the frontal scattering film 105 for a second time is easily observed by the observer E, and that the scattered light when this reflected light passes through the scattering film 105 exerts a great influence upon the blurring of the pattern on the display.

Furthermore it is considered that, in the case of a liquid crystal display device as shown in FIG. 34A, the reason that the display is undesirably tinged with a yellow tinge (tinting of the display) is that the polarization plate 106, the orientation film, the transparent electrode, the insulation film, the protective film and so on which are comprised in the liquid crystal display device exhibit a yellow color (the hue, when expressed in the L*a*b color system, satisfies the condition b*>0), and further that the scattered light of a conventional isotropic frontal scattering film 105 also is tinged with a yellow color (the hue, when expressed by a L*a*b color system, satisfies the condition b*>0). Yet further, the present inventors have come to realize that, since this scattered light is also tinged with a yellow tint after having been reflected by the reflection layer 103 in the interior of the liquid crystal panel, the display which has been observed with reflected light whose hue satisfies the condition b*>0 and which has been reflected from the liquid crystal display device whose hue satisfies the condition b*>0, also is undesirably tinged with a yellow color.

The present invention has been made in order to solve the above described problems, and one of the objects is to provide a liquid crystal device, which can reduce blurring and tinting of the pattern which is displayed on the display, can enhance display quality, can make a sharp display possible, can simplify the structure of a liquid crystal device, compared with a liquid display device comprising an internal scattering plate, and can reduce the cost of construction while continuing to provide a sharp display, and an electronic apparatus comprising the liquid crystal device.

SUMMARY OF THE INVENTION

In order to resolve the above problems, the first liquid crystal device of the present invention is characterized in that the liquid crystal device comprises a liquid crystal panel comprising a pair of base plates, a liquid crystal layer which is sandwiched between these base plates, a reflective layer which is provided on the liquid crystal layer side of one of the base plates, and a directional frontal scattering film which is provided on the side of the other one of the base plates opposite to its liquid crystal layer side; and in that, when light from a light source, which is arranged on the one surface side of the directional frontal scattering film, comes into the directional frontal scattering film, and the parallel transmitted light, which excludes the diffused transmitted light from the entire transmitted light which has passed through the directional frontal scattering film, is observed by a light receiving portion which is arranged on the other surface side of the directional frontal scattering film, and when the angle of incidence of the incident light with respect to the normal to the directional frontal scattering film is defined as the polar angle $\theta n$, the incident light angle of the in-plane direction of the directional frontal scattering film is defined as the azimuth angle $\phi m$, the maximum transmission ratio of the parallel transmitted light is defined as $Tmax(\phi 1, \theta 1)$, and the minimum transmission ratio of the parallel transmitted light is defined as $Tmin(\phi 2, \theta 2)$, then the directional frontal scattering film is arranged in the liquid crystal panel so that the incident light side when the polar angle and the azimuth angle yield the minimum transmission ratio is upon the light reception side of the liquid crystal panel, and so that the incident light side when the polar angle and the azimuth angle yield the maximum transmission ratio is upon the observation direction side of the liquid crystal panel.

With this reflective type liquid crystal display device which is equipped with a directional frontal scattering film, by arranging the directional frontal scattering film upon the liquid crystal panel so that the incident light side when the polar angle and the azimuth angle which yield the minimum transmission ratio are given is upon the light reception side of the liquid crystal panel, and so that the incident light side when the polar angle and the azimuth angle which yield the maximum transmission ratio are given is upon the observation direction side of the liquid crystal panel, the azimuth angle $\phi 2$ when the minimum transmission ratio of the parallel transmission light is exhibited becomes the direction of the angle of incidence, and the azimuth angle $\phi 1$ when the maximum transmission ratio of the parallel transmission light is exhibited becomes the observer direction. With a liquid crystal panel which has a directional frontal scattering film arranged in this way, the light which is incident upon the directional frontal scattering film is strongly scattered upon incidence, but the amount by which the light is scattered when it passes through the directional frontal scattering film after it has been reflected by the reflective layer interior to the liquid crystal panel becomes small. As a result, there is little influence upon blurring of the pattern which is displayed on the display, and a sharp display with little blurring of the pattern which is displayed on the display is obtained.

The second embodiment of the liquid crystal device of the present invention is characterized by being equipped with a semi-transparent reflective layer, instead of the reflective layer of the liquid crystal device of the above described first embodiment.

For a liquid crystal device which is equipped with a semi-transparent reflective layer as well, the present invention is as effective as in the case of performing reflective display, and in the same manner as in the case of the previously described structure, the azimuth angle $\phi 2$ when the minimum transmission ratio for the parallel transmitted light is exhibited becomes the angle of incidence direction side, and the azimuth angle $\phi 1$ when the maximum transmission ratio for the parallel transmitted light is exhibited becomes the observer direction side. When a directional frontal scattering film arranged in this manner is incorporated, the light which is incident upon the directional frontal scattering film is strongly scattered upon incidence, but, since the amount by which the light is scattered when it passes through the directional frontal scattering film after it has been reflected by the reflective layer interior to the liquid crystal panel becomes small, therefore a sharp display with little blurring of the pattern which is displayed on the display is obtained.

Next, the present invention is characterized in that, with a liquid crystal device which is equipped with the previously described reflective layer or semi-transparent reflective layer, when the maximum transmission ratio of the parallel transmitted light is taken as $Tmax(\phi 1, \theta 1)$ and the minimum transmission ratio of the parallel transmitted light is taken as $Tmax(\phi 2, \theta 2)$, then the relationship $\phi 1 = \phi 2 \pm 180°$ is satisfied.

With a liquid crystal display device of the reflective type or the semi reflective type equipped with a directional frontal scattering film, by satisfying the relationship $\phi 1 = \phi 2 \pm 180°$, the azimuth angle $\phi 2$ when the minimum transmission ratio of the parallel transmission light is exhibited becomes the straight on direction of the angle of incidence, and the azimuth angle $\phi 1$ when the maximum transmission ratio of the parallel transmission light is exhibited becomes the central observer direction. In the case of 180°, this arrangement relationship becomes the most ideal one. Since the light which is incident upon the directional frontal scattering film is strongly scattered upon incidence, and the amount by which the light which is reflected by the reflective layer or the semi-transparent reflective layer internal to the liquid crystal panel and which then passes through the directional frontal scattering diffraction film for the second time is scattered and diffracted is small, therefore a sharp display is reliably obtained which has little blurring of the pattern which is displayed on the display.

According to the present invention, with the liquid crystal device, it is possible for the ratio between the maximum transmission ratio Tmax and the minimum transmission ratio Tmin of the parallel transmitted light to satisfy the relationship $(Tmax/Tmin) \geq 2$.

By satisfying the relationship $(Tmax/Tmin) > 2$, a brighter and sharper (clearer) display is obtained than with a liquid crystal device which is equipped with an isotropic frontal scattering film according to the prior art, since sufficient scattering is obtained when light is incident upon the directional frontal scattering film.

With the present invention, with the liquid crystal device, it is characterized in that the polar angle $\theta 1$ or $\theta 2$ when the parallel transmitted light attains its maximum or minimum is within the range $-40° \leq \theta 1$ (or $\theta 2) \leq 0°$ or the range $0° \leq \theta 1$ (or $\theta 2) \leq 40°$.

By ensuring that the polar angle $\theta 1$ or $\theta 2$ is within the above described range, in an actual use environment, a brighter and sharper (clearer) display is obtained than with a liquid crystal device which is equipped with an isotropic frontal scattering film according to the prior art.

With the present invention, with the liquid crystal device, it is characterized in that the polar angle $\theta 1$ or $\theta 2$ when the parallel transmitted light attains its maximum or minimum is within the range $-30° \leq \theta 1$ (or $\theta 2) \leq -10°$ or the range $10° \leq \theta 1$ (or $\theta 2) \leq 30°$.

By ensuring that the polar angle $\theta 1$ or $\theta 2$ is within the above described range, in an actual use environment, a brighter and sharper display is obtained than with a liquid crystal device which is equipped with an isotropic frontal scattering film according to the prior art.

With the present invention, with the liquid crystal device, when the parallel beam transmission ratio in the normal direction to the directional frontal scattering film is defined as T(0, 0), then it is possible to arrange for the relationship 3%≦T(0, 0)≦50% to be satisfied. Furthermore, in the above described range, it is possible to arrange for the relationship 5%≦T(0, 0)≦40% to be satisfied.

In these cases, in an actual use environment, a brighter and sharper display is obtained than with a liquid crystal device which is equipped with an isotropic frontal scattering film according to the prior art.

With the present invention, with the liquid crystal device, it is possible to arrange, when the azimuth angle φ of the directional frontal scattering film is regulated in the ranges of φ1±60° and moreover φ2 ±60°, for the parallel beam transmission ratio always to exhibit a maximum at θ1, and for the parallel beam transmission ratio always to exhibit a minimum at θ2.

When the maximum and the minimum are exhibited in this type of azimuth angular range, since it is possible to scatter the light over this type of azimuth angular range (a range of ±60°) and not only in the one direction of φ2, accordingly it can be applied in various types of environment, and it is possible to implement a clear reflection display over a wide range.

With the present invention, with the liquid crystal device, it is possible to arrange, when the azimuth angle φ of the directional frontal scattering film is regulated in the ranges of φ1±60° and moreover φ2 ±60°, for the ratio between the absolute minimum value and the absolute maximum value of the parallel beam transmission ratio to be greater than or equal to 1.5.

Since, by making the ratio between the absolute maximum value and the absolute minimum value of the parallel beam transmission ratio to be large, it is possible to enhance the scattering when the light is incident upon the directional frontal scattering film, and it is possible to suppress the scattering after the light has passed through the directional frontal scattering film, accordingly it is possible to obtain a sharp display with little blurring of the pattern which is displayed on the display.

With the present invention, the parallel beam transmission ratio, when the polar angle of the direction orthogonal to the azimuth angle φ1 which gives the maximum transmission ratio for the parallel transmitted light and the azimuth angle φ2 which gives the minimum transmission ratio for the parallel transmitted light is varied in the range of −40° to +40°, is made to be greater than or equal to the normal direction transmission ratio of the directional frontal scattering film.

By doing this, it is possible to obtain a sharp display with little blurring of the pattern which is displayed on the display, even when the liquid crystal panel of the liquid crystal device is being observed from a sideways direction.

With the present invention, it is possible, when the polar angle θ is in the range of −60° to +60°, to keep the transmission ratio T(φ, θ) greater than or equal to 2% and less than or equal to 50%.

By ensuring that T(φ, θ) is greater than or equal to 2% and less than or equal to 50% in this range, a sharp display is obtained which is bright and has no blurring of the pattern which is displayed on the display.

The third embodiment of the liquid crystal device of the present invention, in order to solve the problems, is characterized by being provided with a liquid crystal panel which comprises a pair of base plates, a liquid crystal layer which is sandwiched between these base plates, a reflective layer which is provided on the liquid crystal layer side of one of the base plates, and a directional frontal scattering film which is provided on the side of the other one of the base plates opposite to its liquid crystal layer side; in that when light from a light source which is arranged on the one surface side of the directional frontal scattering film is illuminated thereupon, and the parallel transmitted light, which excludes the diffused transmitted light from the entire transmitted light which has passed through the directional frontal scattering film, is observed by a light receiving portion which is arranged on the other surface side of the directional frontal scattering film: when the angle of incidence of the incident light with respect to the normal to the directional frontal scattering film is defined as the polar angle θn, the incident light angle of the in-plane direction of the directional frontal scattering film is defined as the azimuth angle φm, the maximum transmission ratio of the parallel transmitted light is defined as Tmax(φ1, θ1), and the minimum transmission ratio of the parallel transmitted light is defined as Tmin(φ2, θ2), then the directional frontal scattering film is arranged in the liquid crystal panel so that the incident light side when the polar angle and the azimuth angle yield the minimum transmission ratio is upon the light reception side of the liquid crystal panel, and so that the incident light side when the polar angle and the azimuth angle yield the maximum transmission ratio is upon the observation direction side of the liquid crystal panel; and in that the directional frontal scattering film is set so that the hue of the diffused transmitted light which has been incident upon and has passed through the directional frontal scattering film from a polar angle direction and an azimuth angle direction which yield the minimum transmission ratio for light from the light source satisfies b*<0 as expressed in the L*a*b* color system.

With the liquid crystal device according to the third embodiment of the present invention, just as with the operation of the liquid crystal device according to the first embodiment of the present invention, the influence upon blurring of the pattern which is displayed on the display is small, and a sharp display is obtained which has little blurring of the pattern which is displayed on the display.

Furthermore, with a reflective type liquid crystal display device which comprises a directional frontal scattering film arranged in the above manner, by the directional frontal scattering film being set so that the hue of the diffused transmitted light which is incident upon the directional frontal scattering film from the polar angle and the azimuth angle direction for which the light from the light source exhibits the minimum transmission ratio and passes through the film satisfies b*<0 as expressed in the L*a*b* color system, the diffused transmitted light which is strongly scattered upon incidence exhibits a bluish white color. Due to this, even after the diffused transmitted light of this bluish white color (whose hue satisfies b*<0) has passed through structural members such as a polarization plate, an orientation film, a transparent electrode, an insulation film, a protective film and the like which almost all exhibit a yellow color (their hues as expressed in the L*a*b* color system satisfy b*>0), and has been reflected by the reflective layer internal to the liquid crystal panel, it still is tinged with a bluish white color (its hue satisfies b*<0). As a result, when the display is observed by this reflected light of a bluish white color (whose hue satisfies b*<0), the hues are in the mutually canceling state, and a display with no tinting (no irisation) is obtained, and it is possible to obtain a sharp display, and to enhance the display quality.

The fourth embodiment of the liquid crystal device of the present invention is characterized by being equipped with a semi-transparent reflective layer, instead of the reflective layer of the liquid crystal device of the above described third embodiment.

For a liquid crystal device which is equipped with a semi-transparent reflective layer as well, the present invention is as effective as in the case of performing reflective display, and it is possible to obtain the same beneficial results as in the case of the previously described structure.

With the liquid crystal device of the present invention, setting the directional frontal scattering film so that the hue of diffused transmitted light from the light source which has been illuminated upon the directional frontal scattering film from the polar angle and the azimuth angle direction which yield the minimum transmission ratio and has passed through it, as expressed in the L*a*b* color display system, satisfies −6<b*<0, is desirable from the point of view of obtaining a display which has no tinting (no irisation), so that it is possible further to enhance the quality of the display.

Furthermore, with the liquid crystal device of the present invention of any of the structures, setting the directional frontal scattering film so that the hue of diffused transmitted light from the light source which has been illuminated upon the directional frontal scattering film from the polar angle and the azimuth angle direction which yield the minimum transmission ratio and has passed through it, as expressed in the L*a*b* color display system, satisfies −10<a*<10, is desirable from the point of view of obtaining a display which has no tinting (no irisation), so that it is possible further to enhance the quality of the display.

Furthermore, with the liquid crystal device of the present invention of any of the structures, setting the directional frontal scattering film so that the hue of diffused transmitted light from the light source which has been illuminated upon the directional frontal scattering film from the polar angle and the azimuth angle direction which yield the minimum transmission ratio and has passed through it, as expressed in the L*a*b* color display system, satisfies −5<a*<5, is even more desirable from the point of view of being able further to enhance the quality, with no tinting.

Furthermore, with the present invention, it is possible for the ratio between the maximum transmission ratio Tmax and the minimum transmission ratio Tmin of the parallel transmitted light to satisfy the relationship (Tmax/Tmin)≧2.

Since sufficient scattering is obtained when the light is incident upon the directional frontal scattering film by satisfying the relationship (Tmax/Tmin)≧2, a brighter and sharper (clearer) display is obtained than with a liquid crystal device which is equipped with an isotropic frontal scattering film according to the prior art. Furthermore, satisfying the relationship (Tmax/Tmin)≧2 is particularly effective as a means for making it possible for the hue as expressed in the L*a*b* color display system of the diffused transmitted light from the light source, which has been incident upon the directional frontal scattering film from the polar angle and azimuth angle direction which yield the minimum transmission ratio and has passed through the film, to satisfy b*<0. More desirably it is a desirable feature to satisfy the relationship (Tmax/Tmin)≧4, which enables the hue of the diffused transmitted light to satisfy b*<0, thus making it possible to enhance the quality of the display.

The fifth embodiment of the liquid crystal device of the present invention is characterized in being provided with a liquid crystal panel which comprises a pair of base plates, a liquid crystal layer which is sandwiched between these base plates, a reflective layer which is provided on the liquid crystal layer side of one of the base plates, and a directional frontal scattering film which is provided on the side of the other one of the base plates opposite to its liquid crystal layer side; in that when light from a light source which is arranged on the one surface side of the directional frontal scattering film is illuminated thereupon, and the parallel transmitted light, which excludes the diffused transmitted light from the entire transmitted light which has passed through the directional frontal scattering film, is observed by a light receiving portion which is arranged on the other surface side of the directional frontal scattering film and when the angle of incidence of the incident light with respect to the normal to the directional frontal scattering film is defined as the polar angle θn, the incident light angle of the in-plane direction of the directional frontal scattering film is defined as the azimuth angle φm, the maximum transmission ratio of the parallel transmitted light is defined as Tmax(φ1, θ1), and the minimum transmission ratio of the parallel transmitted light is defined as Tmin(φ2, θ2), then the directional frontal scattering film is arranged in the liquid crystal panel so that the incident light side when the polar angle and the azimuth angle yield the minimum transmission ratio is upon the light reception side of the liquid crystal panel, and so that the incident light side when the polar angle and the azimuth angle yield the maximum transmission ratio is upon the observation direction side of the liquid crystal panel; and in that furthermore the directional frontal scattering film is arranged so that the azimuth angle φ2 direction which yields the minimum transmission ratio for the parallel transmitted light which has passed through the directional frontal scattering film and the long axis direction of the nematic liquid crystal molecules which are positioned at the central portion of the liquid crystal layer when the applied voltage between the base plates has been cancelled match one another, and, when voltage has been applied between the base plates, the long axis direction of the liquid crystal molecules is the direction in which the liquid crystal molecules respond to the electric field.

With the liquid crystal device according to the fifth embodiment of the present invention, just as with the operation of the liquid crystal device according to the first embodiment of the present invention, the influence upon blurring of the pattern which is displayed on the display is small, and a sharp display is obtained which has little blurring of the pattern which is displayed on the display.

Furthermore, with a reflective type liquid crystal display device incorporating a directional frontal scattering film which is arranged as described, by arranging the directional frontal scattering film so that the azimuth angle φ2 direction which yields the minimum transmission ratio for the parallel transmitted light which has passed through the directional frontal scattering film and the long axis direction of the nematic liquid crystal molecules which are positioned at the central portion of the liquid crystal layer when the applied voltage between the base plates has been cancelled match one another, thereby, normally, the long axis direction of the nematic liquid crystal molecules which are positioned at the central portion of the liquid crystal layer is the direction in which the contrast is high, and this direction in which the contrast is high and the viewing direction in which there is little blurring of the pattern which is displayed on the display match one another. As a result a high contrast display is obtained which has no blurring, and it is possible to obtain a sharp display, and to enhance the quality of the display.

The sixth embodiment of the liquid crystal device of the present invention is characterized by being equipped with a semi-transparent reflective layer, instead of the reflective layer of the liquid crystal device of the above described fifth embodiment.

For a liquid crystal device which is equipped with a semi-transparent reflective layer as well, the present invention is as effective as in the case of performing reflective display, and, just as in the case of the previously described structure, the azimuth angle $\phi 2$ when the minimum transmission ratio for the parallel transmitted light is exhibited becomes the direction of the angle of incidence, and the azimuth angle $\phi 1$ when the maximum transmission ratio for the parallel transmitted light is exhibited becomes the direction of the observer. When a directional frontal scattering film arranged in this manner is incorporated, since the light which is incident upon the directional frontal scattering film is strongly scattered upon incidence, but the amount by which the light which has been reflected by the reflective layer within the liquid crystal panel and has passed through the directional frontal scattering film is scattered is small, accordingly a sharp display is obtained which has little blurring of the pattern which is displayed on the display. Furthermore, with a liquid crystal display device of the semi-transparent type which incorporates a directional frontal scattering film arranged in this manner, by arranging the directional frontal scattering film so that the azimuth angle $\phi 2$ direction which yields the minimum transmission ratio for the parallel transmitted light (the maximum transmission ratio for the diffused transmitted light) which has passed through the directional frontal scattering film and the long axis direction of the nematic liquid crystal molecules which are positioned at the central portion of the liquid crystal layer when the applied voltage between the base plates has been cancelled match one another, thereby, normally, the long axis direction of the nematic liquid crystal molecules which are positioned at the central portion of the liquid crystal layer is the direction in which the contrast is high, and this direction in which the contrast is high and the viewing direction in which there is little blurring of the pattern which is displayed on the display match one another. As a result a high contrast display is obtained which has no blurring, and it is possible to obtain a sharp display, and to enhance the quality of the display.

Furthermore, with the liquid crystal device of the present invention, it is acceptable for the directional frontal scattering film to be arranged so that the direction of the azimuth angle $\phi 2$ for which the parallel transmitted light which has passed through the directional frontal scattering film exhibits the minimum transmission ratio, ±30°, and the long axis direction of the nematic crystal molecules which are positioned in the central portion of the liquid crystal layer when the voltage applied between the base plates is cancelled, match one another.

Furthermore, with the liquid crystal device of the present invention, the nematic liquid crystal molecules of the liquid crystal layer are set to a twist angle of approximately 60° to 80°, and, when the voltage applied between the base plates has been cancelled, the nematic liquid crystal molecules which are positioned at the central portion of the liquid crystal layer are twisted with respect to the nematic liquid crystal molecules which are disposed at the base plate surfaces by 30° to 40°.

Furthermore, with the liquid crystal device of the present invention, the nematic liquid crystal molecules of the liquid crystal layer are set to a twist angle of approximately 240° to 255°, and, when the voltage applied between the base plates has been cancelled, the nematic liquid crystal molecules which are positioned at the central portion of the liquid crystal layer are twisted with respect to the nematic liquid crystal molecules which are disposed at the base plate surfaces by 120° to 127.5°.

Furthermore, the seventh embodiment of the liquid crystal device of the present invention is characterized in being provided with a liquid crystal panel which comprises a pair of base plates, a liquid crystal layer which is sandwiched between these base plates, a reflective layer which is provided on the liquid crystal layer side of one of the base plates, and a directional frontal scattering film which is provided on the side of the other one of the base plates opposite to its liquid crystal layer side; in that when light from a light source which is arranged on the one surface side of the directional frontal scattering film is illuminated thereupon, and the parallel transmitted light, which excludes the diffused transmitted light from the entire transmitted light which has passed through the directional frontal scattering film, is observed by a light receiving portion which is arranged on the other surface side of the directional frontal scattering film and when the angle of incidence of the incident light with respect to the normal to the directional frontal scattering film is defined as the polar angle $\theta n$, the incident light angle of the in-plane direction of the directional frontal scattering film is defined as the azimuth angle $\phi m$, the maximum transmission ratio of the parallel transmitted light is defined as Tmax($\phi 1$, $\theta 1$), and the minimum transmission ratio of the parallel transmitted light is defined as Tmin($\phi 2$, $\theta 2$), then the directional frontal scattering film is arranged upon the liquid crystal panel so that the incident light side when the polar angle and the azimuth angle yield the minimum transmission ratio is upon the light reception side of the liquid crystal panel, and so that the incident light side when the polar angle and the azimuth angle yield the maximum transmission ratio is upon the observation direction side of the liquid crystal panel; and furthermore the directional frontal scattering film is arranged so that the azimuth angle $\phi 2$ direction which yields the minimum transmission ratio for the parallel transmitted light which has passed through the directional frontal scattering film, and the in-plane direction in which the contrast of the liquid crystal panel is high for incident light of which the incident light angle is from 10° to 30° from the polar angle direction, match one another.

With the liquid crystal device according to the seventh embodiment of the present invention, just as with the operation of the liquid crystal device according to the first embodiment of the present invention, the influence upon blurring of the pattern which is displayed on the display is small, and a sharp display is obtained which has little blurring of the pattern which is displayed on the display.

Furthermore, with a reflective type liquid crystal display device incorporating a directional frontal scattering film which is arranged as described, by arranging the directional frontal scattering film so that the azimuth angle $\phi 2$ direction which yields the minimum transmission ratio for the parallel transmitted light which has passed through the directional frontal scattering film and the in-plane direction in which the contrast of the liquid crystal panel is high for incident light of which the incident light angle is from 10° to 30° from the polar angle direction match one another, thereby the direction in which the contrast of the liquid crystal panel is high and the viewing direction in which there is little blurring of the pattern which is displayed on the display match one another. As a result a high contrast display is obtained which has no blurring, and it is possible to obtain a sharp display, and to enhance the quality of the display.

The eighth embodiment of the liquid crystal device of the present invention is characterized by being equipped with a semi-transparent reflective layer, instead of the reflective layer of the liquid crystal device of the above described seventh embodiment.

For a liquid crystal device which is equipped with a semi-transparent reflective layer as well, the present invention is as effective as in the case of performing reflective display. Just as in the case of the previously described structure, the azimuth angle $\phi 2$ when the minimum transmission ratio for the parallel transmitted light is exhibited becomes the direction of the angle of incidence, and the azimuth angle $\phi 1$ when the maximum transmission ratio for the parallel transmitted light is exhibited becomes the direction of the observer. When a directional frontal scattering film arranged in this manner is incorporated, since the light which is incident upon the directional frontal scattering film is strongly scattered upon incidence, but the amount by which the light which has been reflected by the reflective layer within the liquid crystal panel and has passed through the directional frontal scattering film is scattered is small, accordingly a sharp display is obtained which has little blurring of the pattern which is displayed on the display.

Furthermore, with a liquid crystal display device of the semi-transparent type which incorporates a directional frontal scattering film arranged in this manner, by arranging the directional frontal scattering film so that the azimuth angle $\phi 2$ direction which yields the minimum transmission ratio for the parallel transmitted light which has passed through the directional frontal scattering film and the in-plane direction in which the contrast of the liquid crystal panel is high for incident light of which the incident light angle is from 10° to 30° from the polar angle direction match one another, thereby the direction in which the contrast of the liquid crystal panel is high and the viewing direction in which there is little blurring of the pattern which is displayed on the display match one another. As a result a high contrast display is obtained which has no blurring, and it is possible to obtain a sharp display, and to enhance the quality of the display.

Furthermore, with the liquid crystal device of the present invention, the directional frontal scattering film may acceptably be arranged so that the direction of the azimuth angle $\phi 2$ for which the parallel transmitted light which has passed through the directional frontal scattering film exhibits the minimum transmission ratio, ±30°, and the in-plane direction for which the contrast of the liquid crystal panel is high for incident light whose angle of light incidence from the polar angle direction is from 10° to 30°, match one another.

Furthermore, with the liquid crystal device of the present invention, it is possible to satisfy the relationship (Tmax/Tmin)≧2 for the ratio between the maximum transmission ratio Tmax and the minimum transmission ratio Tmin of the parallel transmitted light.

Since, by satisfying the relationship (Tmax/Tmin)≧2, sufficient scattering is provided for the directional frontal scattering film when the light is incident upon it, accordingly a brighter and sharper (clearer) display is obtained than with a liquid crystal device which is equipped with an isotropic frontal scattering film according to the prior art.

The ninth embodiment of the liquid crystal device of the present invention is characterized in being provided with a liquid crystal panel which comprises a pair of base plates, a liquid crystal layer which is sandwiched between these base plates, a reflective layer which is provided on the liquid crystal layer side of one of the base plates, and a directional frontal scattering diffraction film which is provided on the side of the other one of the base plates opposite to its liquid crystal layer side; and in that when light from a light source which is arranged on the one surface side of the directional frontal scattering diffraction film is illuminated thereupon, and the parallel transmitted light, which excludes the diffused transmitted light from the entire transmitted light which has passed through the directional frontal scattering diffraction film, is observed by a light receiving portion which is arranged on the other surface side of the directional frontal scattering diffraction film: when the angle of incidence of the incident light with respect to the normal to the directional frontal scattering diffraction film is defined as the polar angle $\theta n$, the incident light angle of the in-plane direction of the directional frontal scattering film is defined as the azimuth angle $\phi m$, the maximum transmission ratio of the parallel transmitted light is defined as Tmax($\phi 1$, $\theta 1$), and the minimum transmission ratio of the parallel transmitted light is defined as Tmin($\phi 2$, $\theta 2$), then the directional frontal scattering diffraction film is arranged upon the liquid crystal panel so that the incident light side when the polar angle and the azimuth angle yield the minimum transmission ratio is upon the light reception side of the liquid crystal panel, and so that the incident light side when the polar angle and the azimuth angle yield the maximum transmission ratio is upon the observation direction side of the liquid crystal panel.

In other words, the liquid crystal device according to the ninth embodiment of the present invention is characterized by being equipped with a directional frontal scattering diffraction film, instead of the directional frontal scattering film of the previously described liquid crystal device according to the first embodiment of the present invention.

For a liquid crystal device (a reflective type liquid crystal device) which is equipped with a directional frontal scattering diffraction film, by arranging the directional frontal scattering diffraction film to the liquid crystal device so that the incident light side when the polar angle and the azimuth angle which yield the minimum transmission ratio are exhibited becomes the light reception side of the liquid crystal panel, and the incident light side when the polar angle and the azimuth angle which yield the maximum transmission ratio are exhibited becomes the observation direction side of the liquid crystal panel, thereby the azimuth angle $\phi 2$ when the minimum transmission ratio for the parallel transmitted light is exhibited becomes the direction of the angle of incidence, and the azimuth angle $\phi 1$ when the maximum transmission ratio for the parallel transmitted light is exhibited becomes the direction of the observer. With a liquid crystal panel in which a directional frontal scattering diffraction film arranged in this manner is incorporated, the light which is incident upon the directional frontal scattering diffraction film is strongly scattered and diffracted upon incidence, but the amount by which the light is scattered and diffracted when it passes through the directional frontal scattering diffraction film after having been reflected by the reflective layer within the liquid crystal panel is small. As a result, little influence is exerted upon blurring of the pattern which is displayed on the display, and a sharp display is obtained which has little blurring of the pattern which is displayed on the display.

Furthermore, according to a liquid crystal device of this type of structure, simply by providing the above described type of directional frontal scattering diffraction film to the liquid crystal panel, the influence upon blurring of the pattern which is displayed on the display is reduced, and a sharp display is obtained which has little blurring of the pattern which is displayed on the display. Due to this, it is possible to manage without concavities and convexities formed upon the reflective layer such as in a liquid crystal device of the internal scattering type according to the prior art, and it is possible to reduce the cost of production.

The tenth embodiment of the liquid crystal device of the present invention is characterized by being equipped with a semi-transparent reflective layer, instead of the reflective layer of the liquid crystal device of the above described ninth embodiment.

For a liquid crystal device which is equipped with a semi-transparent reflective layer as well, the present invention is as effective as in the case of performing reflective display. Just as in the case of the previously described structure, the azimuth angle $\phi 2$ when the minimum transmission ratio for the parallel transmitted light is exhibited becomes the direction of the angle of incidence, and the azimuth angle $\phi 1$ when the maximum transmission ratio for the parallel transmitted light is exhibited becomes the direction of the side of the observer. With a liquid crystal panel in which a directional frontal scattering diffraction film arranged in this manner is incorporated, the light which is incident upon the directional frontal scattering diffraction film is strongly (greatly) scattered and diffracted upon incidence, but the amount by which the light which is reflected by the reflective layer within the liquid crystal panel and passes through the directional frontal scattering diffraction film is scattered and diffracted is small (it is hardly scattered or diffracted at all). As a result, a sharp display with little blurring of the pattern which is displayed on the display is obtained.

Furthermore, according to a liquid crystal device of this type of structure, simply by providing the above described type of directional frontal scattering diffraction film to the liquid crystal panel, the influence upon blurring of the pattern which is displayed on the display is reduced, and a sharp display is obtained which has little blurring of the pattern which is displayed on the display. Due to this, it is possible to manage without concavities and convexities formed upon the semi-transparent reflective layer such as in a liquid crystal device of the internal scattering type according to the prior art, and it is possible to reduce the cost of production.

Furthermore, the present invention is characterized in that, when the maximum transmission ratio of the parallel transmitted light is taken as Tmax($\phi 1$, $\theta 1$) and the minimum transmission ratio of the parallel transmitted light is taken as Tmax($\phi 2$, $\theta 2$), then the relationship $\phi 1 = \phi 2 \pm 180°$ is satisfied.

With a liquid crystal device of the reflective type or the semi reflective type which is equipped with a directional frontal scattering diffraction film, by satisfying the relationship $\phi 1 = \phi 2 \pm 180°$, the azimuth angle $\phi 2$ when the minimum transmission ratio of the parallel transmitted light is exhibited becomes the direct incident angular direction of the liquid crystal panel, and the azimuth angle $\phi 1$ when the maximum transmission ratio of the parallel transmitted light is exhibited becomes the central observer direction. In the case of 180°, this arrangement relationship becomes the most ideal one. Since the light which is incident upon the directional frontal scattering diffraction film is strongly scattered and diffracted upon incidence, and the amount by which the light which is reflected by the reflective layer or the semi-transparent reflective layer internal to the liquid crystal panel and which then passes through the directional frontal scattering diffraction film for the second time is scattered and diffracted is small, therefore a sharp display is obtained which has little blurring of the pattern which is displayed on the display.

Furthermore, the present invention may be characterized in that, in the previously described reflective type or semi-transparent type liquid crystal device which is equipped with a directional frontal scattering diffraction film, when the angle of incidence of incident light which is illuminated upon the directional frontal scattering diffraction film from the light reception side with respect to the normal to the film is defined as $\theta$, and the angle of diffraction of diffracted light which has been diffracted when the incident light has passed through the directional frontal scattering diffraction film with respect to the normal to the film is defined as $\alpha$, then the incident light and the diffracted light satisfy the relationship $|\alpha| < |\theta|$.

With the previously described reflective type or semi-transparent type liquid crystal device, by equipping it with the above described directional frontal scattering diffraction film such as is capable of making the above described incident light and the above described diffracted light satisfy the relationship $|\alpha| < |\theta|$, it is possible to enhance the brightness when observing roughly from the normal direction to the liquid crystal panel, which is deviated from the surface reflection direction of the panel, so that a sharp display is obtained. This is because, when the diffraction angle $|\alpha|$ of the diffracted light which is diffracted when the above described incident light passes through the above described directional frontal scattering diffraction film is less than the angle of incidence $|\theta|$ of the incident light, it is possible to cause the emitted light which is emitted to the exterior when the reflected light from this diffracted light which has been reflected by the above described reflective layer or the above described semi-transparent reflective layer passes through the above described directional frontal scattering diffraction film, to be emitted strongly over an angular range smaller than the regular reflection direction of the above described incident light. In other words, it is possible to cause the reflected light of the above described diffracted light to be emitted strongly (in great quantity) in a direction close to the normal of the above described directional frontal scattering diffraction film (to put it in another way, the it is possible to shift the range over which the reflected light of the above described diffracted light is emitted towards the normal direction). Due to this, a bright and sharp display is obtained when the brightness of the incident light in an angular range smaller than the regular reflection direction becomes high, and the user (observer) observes from roughly the normal direction to the liquid crystal panel, which is deviated from the surface reflection direction of the panel. It should be understood that by an angle being small here, is meant that the absolute value of the angle from the normal direction is small.

Furthermore, the present invention may be characterized in that, in the previously described reflective type or semi-transparent type liquid crystal device which is equipped with a directional frontal scattering diffraction film, when the angle of incidence of incident light which is illuminated upon the directional frontal scattering diffraction film from the light reception side with respect to the normal to the film is defined as $\theta$, and the angle of diffraction of diffracted light which has been diffracted when the incident light has passed through the directional frontal scattering diffraction film with respect to the normal to the film is defined as a, the incident light and the diffracted light satisfy the relationship $5° \leq |\theta| - |\alpha| \leq 20°$.

With the previously described reflective type or semi-transparent type liquid crystal device, by providing an above described directional frontal scattering diffraction film such as is capable of satisfying the relationship $5° \leq |\theta|-|\alpha| \leq 20°$ between the above described incident light and the above described diffracted light, it is possible reliably to enhance the brightness when observing from roughly the direction normal to the liquid crystal panel which is deviated from the surface reflection direction of the panel, and a sharp display is obtained.

This is because, when the observation angle (the angle from the normal of the liquid crystal panel) at which the user (the observer) observes the display of the liquid crystal device is termed γ, then normally the absolute value of the above described observation angle γ is smaller than the absolute value of the angle of incidence θ (the angle from the normal to the liquid crystal panel) of the incident light which falls upon the liquid crystal panel; and, furthermore, it is often the case that the absolute value $|\gamma|$ of the above described observation angle is from 5° to 20° less than the absolute value $|\theta|$ of the angle of incidence. When the difference between the above described $|\theta|$ and the above described $|\alpha|$ is in the range from 5° to 20°, then it is possible to cause the above described diffracted light and reflected light to be emitted strongly at from 5° to 20° towards the normal direction from the regular reflection direction of the above described incident light, and a bright and sharp display is obtained when observing the display at an observation angle $|\gamma|$ which is from 5° to 20° less than $|\theta|$.

The above described directional frontal scattering diffraction film may be one which is made from a hologram The liquid crystal device of the present invention is characterized in that electrodes for driving the liquid crystal are provided upon the liquid crystal layer side of the one of the base plates and upon the liquid crystal layer side of the other of the base plates.

It is possible to control the orientation state of the liquid crystal layer via the electrodes which sandwich the liquid crystal, and to perform changing over between display, no display, and half tone display.

With the present invention, it is also beneficial for, in the liquid crystal device, a color filter to be provided on the liquid crystal layer side of one or the other of the pair of base plates.

It is possible to enable color display by providing a color filter, and, by employing any one of the structures previously described, it is possible to obtain a sharp color display in which there is little blurring of the pattern which is displayed on the display.

With the present invention, when the reflective layer or the semi-transparent reflective layer has minute concavities and convexities, since the incident light is strongly scattered and is conducted to the reflective layer or the semi-transparent reflective layer, it is possible to alleviate the blurring caused due to the fact that the reflective layer or the semi-transparent reflective layer has minute concavities and convexities. Furthermore it is possible to obtain a sharp display with little blurring of the pattern which is displayed on the display, since the reflected light due to the reflective layer or the semi-transparent reflective layer is not subjected to strong scattering by the directional frontal scattering film.

Furthermore, the directional frontal scattering film is characterized by having the function of causing scattering and also diffraction of light incident from the azimuth angle side which yields the minimum transmission ratio Tmin(φ2, θ2).

According to this means, it is possible to obtain a clear reflective display, wit the exception of in the regular reflection direction (the surface reflection direction) of the incident light, since, while causing scattering of the incident light, it is possible also simultaneously to cause diffraction as well. Furthermore, when at least one of a transparent protective plate, a light conducting element of a front light illumination device, and a touch key is provided upon the observation side of the liquid crystal device, then it becomes difficult to see the reflected display, since there is some surface reflection generated by these surfaces or rear surfaces. However it is possible to obtain a bright and easily visible reflective display in directions other than the surface reflection direction, since the directional frontal scattering film is endowed with the function of diffraction.

The electronic apparatus of the present invention is characterized by being equipped with the liquid crystal device of the present invention as a display means.

In the case of such an electronic apparatus which is equipped with a liquid crystal device according to the above described excellent display, the blurring of the pattern which is displayed on the display is small, and it is possible to obtain a device which is fitted with a display which has a sharp display.

BRIEF DESCRIPTION OF THE DRAWINGS

FIG. 27A is a figure showing the case of performing reflective display without using any front light, while FIG. 27B is a figure showing the case of performing reflective display using a front light.

FIG. 33A is a perspective view showing a portable type telephone unit; FIG. 33B is a perspective view showing an example of a portable type information processing device; and FIG. 33C is a perspective view showing an example of a wristwatch type electronic apparatus.

FIG. 34A is a schematic sectional view showing an example of a reflective type liquid crystal device which incorporates a scattering film, while FIG. 34B is a schematic sectional view showing an example of a reflective type liquid crystal device which incorporates an internal surface diffusion plate.

DETAILED DESCRIPTION OF THE PREFERRED EMBODIMENTS

First Embodiment of the Liquid Crystal Device

Figure 1:
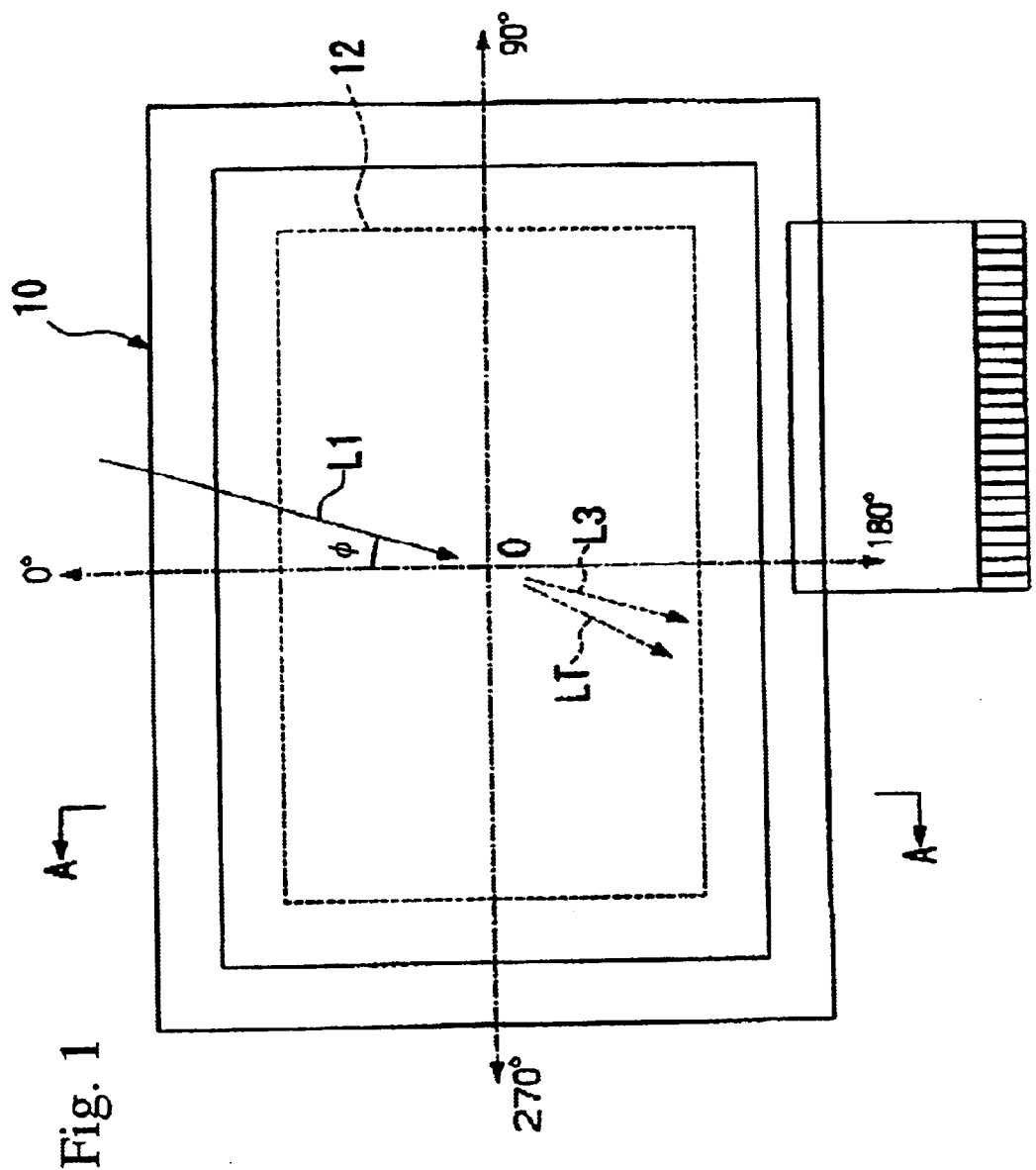
FIG. 1 is a plan view of a liquid crystal panel according to the first, fifth, eighth, and eleventh embodiments of the present invention.
Figure 2:
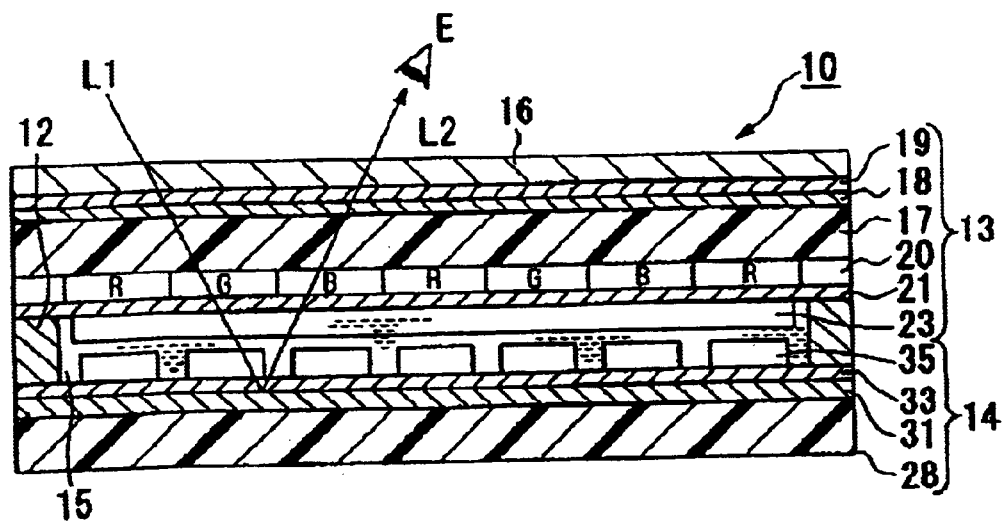
FIG. 2 is a partial sectional schematic view of the liquid crystal panel shown in FIG. 1, taken along the lines A—A.
Figure 3:
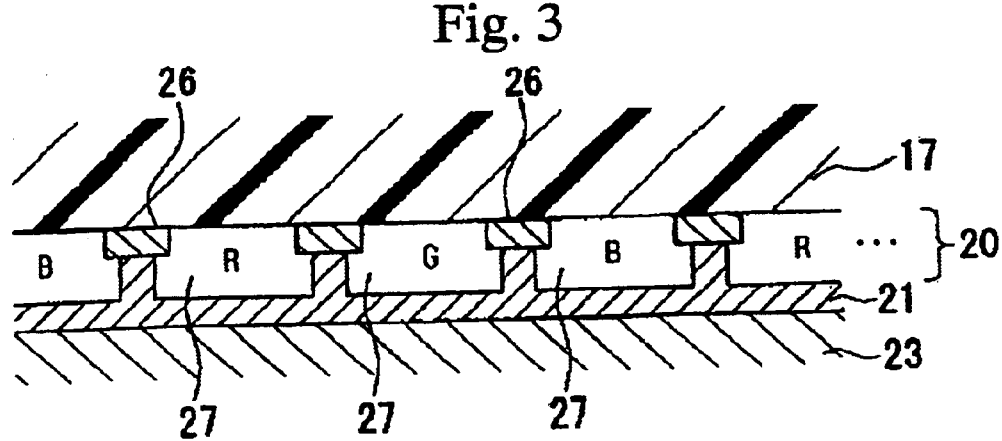
FIG. 3 is an enlarged sectional view of a portion of FIG. 2, showing a color filter portion of the liquid crystal panel.

The first embodiment of the liquid crystal device according to the present invention will be described below with reference to FIGS. 1 through 3. FIG. 1 is a plan view showing a first embodiment in which the present invention is applied to a reflective type liquid crystal panel of a simple matrix type; FIG. 2 is a partial sectional schematic view taken along the lines A—A of the liquid crystal panel shown in FIG. 1; and FIG. 3 is an enlarged sectional view of a color filter portion housed in the liquid crystal panel. As a finished product, a liquid crystal display device (liquid crystal device) is constituted by peripheral equipment such as an IC for liquid crystal driving, a support member and the like being fitted to the liquid crystal panel 10 of this embodiment.

The liquid crystal panel 10 of this embodiment comprises as main elements a pair of base plate units 13 and 14 which are rectangular in plan view and which are adhered together so as mutually to oppose one another with a cell gap being opened between them via a seal member 12 which is roughly rectangular in plan view and moreover is annular, a liquid crystal layer 15 which is sandwiched between these and is also surrounded by the seal member 12, and a directional frontal scattering film 18, a phase difference plate 19, and a polarization plate 16, which are provided upon the upper surface side of one of the base plate units 13 (in FIG. 2, the upper side one). Among the base plate units 13 and 14, the base plate unit 13 is that base plate unit on the display side (the upper side) which is provided to face towards the side of the observer, while the base plate unit 14 is the base plate unit on the opposite side, or to put it in other words, is provided on the rear side (the lower side).

The base plate unit 13 on the upper side comprises: a base plate 17 which is made of a transparent material such as for example glass or the like; a directional frontal scattering film 18, a phase difference plate 19 and a polarization plate 16 provided in that order upon the display side (the upper surface side in FIG. 2, i.e. the observer side) of the base plate 17; and a color filter layer 20, an overcoat layer 21, and a plurality of electrode layers 23 formed upon the liquid crystal layer 15 side of the surface of the overcoat layer 21 in stripe form for driving the liquid crystal, formed in that order upon the rear side (in other words, the liquid crystal layer 15 side) of the base plate 17. Moreover, in an actual liquid crystal device, orientation films are formed as coatings upon the liquid crystal layer 15 side of the electrode layers 23, and upon the liquid crystal layer 15 side of stripe form electrode layers 35 upon the lower base plate side as will be more explained hereinafter. However, these orientation films are omitted from FIG. 2 and explanation thereof is also omitted; and in the other embodiments explained below in order, such orientation films are also omitted from the explanation and from the drawings. Furthermore, in the illustrations of the cross sectional structure of the liquid crystal devices given in FIG. 2 and the various subsequent figures, the thickness of the various layers is shown as adjusted to make them easier to see in the drawings, and they are different from those in an actual liquid crystal device.

The electrode layers 23 for driving on the side of the upper base plate are formed in a stripe form in plan view from, in this embodiment, a transparent electroconductive material such as ITO (Indium Tin Oxide) or the like, and they are formed in the required number of lines to correspond to the number of display regions and of pixels of the liquid crystal panel 10.

In this embodiment, the color filter layer 20 is formed by forming a black mask 26 for light interception and RGB patterns 27 for color display upon the lower surface of the upper side base plate 17 (or, to put it in other words, on its surface towards the liquid crystal layer 15), as shown enlarged in FIG. 3. Furthermore, an overcoat layer 21 is coated as a transparent protective planarizing film which protects the RGB pattern 27.

The black mask 26 is formed, for example by a spattering method or a vacuum vapor deposition method, as a patterned metallic thin film of chrome or the like of approximately 100 to 200 nm in thickness. In the RGB patterns 27, a red color pattern (R), a green color pattern (G), and a blue color pattern (B) are formed so as to be aligned in a desired pattern arrangement by one of various methods such as, for example, a pigment scattering method using photosensitive resin which includes a specified coloring material, or various printing methods, electrodeposition methods, transcription methods, dyeing methods, or the like.

On the other hand, the base plate unit 14 on the lower side comprises a base plate 28 which is made from a transparent material such as glass or the like or from some other non transparent material, and, formed in order upon the surface side of the base plate 28 (the upper surface side in FIG. 2, or to put it in other words, the side of the liquid crystal layer 15), a reflective layer 31, an overcoat layer 33, and a plurality of electrode layers 35 for driving of stripe form which are formed upon the surface of the overcoat layer 33 towards the liquid crystal layer 15. These electrode layers 35, just like the previous electrode layers 23, are formed in the required number of lines to correspond to the number of display regions and of pixels of the liquid crystal panel 10.

Next, the reflective layer 31 of this embodiment is made of a light reflective and moreover electroconductive metallic material such as Ag or Al or the like, and it is formed upon the base plate 28 by a vapor deposition method or a spattering method or the like. However, it is not essential for the reflective layer 31 to be made from an electroconductive material, and it makes no difference when a structure is utilized in which an electrode layer for driving made of an electroconductive material different from the reflective layer 31 is provided, so that the reflective layer 31 and the drive electrodes are provided separately.

Next, the details of the above described directional frontal scattering film 18 which is attached to the base plate unit 13 on the upper side will be explained in the following.

As the directional frontal scattering film 18 which is utilized in this embodiment, from the point of view of its basic structure, a frontal scattering film endowed with directivity such as disclosed in Japanese Patent Application, Unexamined First Publication Nos. 2000-035506, 2000-066026, or 2000-180607 or the like may appropriately be employed. For example, as disclosed in Japanese Patent Application, Unexamined First Publication No. 2000-035506, upon a resin sheet which is a mixture of two or more types of monomer or oligomer capable of photopolymerization and having different indexes of refraction which mutually differ, a material endowed with the function of causing scattering with good efficiency only in a specified wide direction when illuminated from a slanting direction with ultraviolet rays, or, as an on line holographic scattering sheet which is disclosed in Japanese Patent Application, Unexamined First Publication No. 2000-066026, a material made so as to have a layer structure of regions which partially differ in index of refraction by illuminating a laser upon a photosensitive material for use as a hologram, or the like, may appropriately be employed.

Here, the directional frontal scattering film 18 used for this embodiment is a material which is made by adjusting various parameters such as parallel beam transmission ratio or the like in a suitable specified positional relationship to the liquid crystal display device as will be explained hereinafter.

Figure 4:
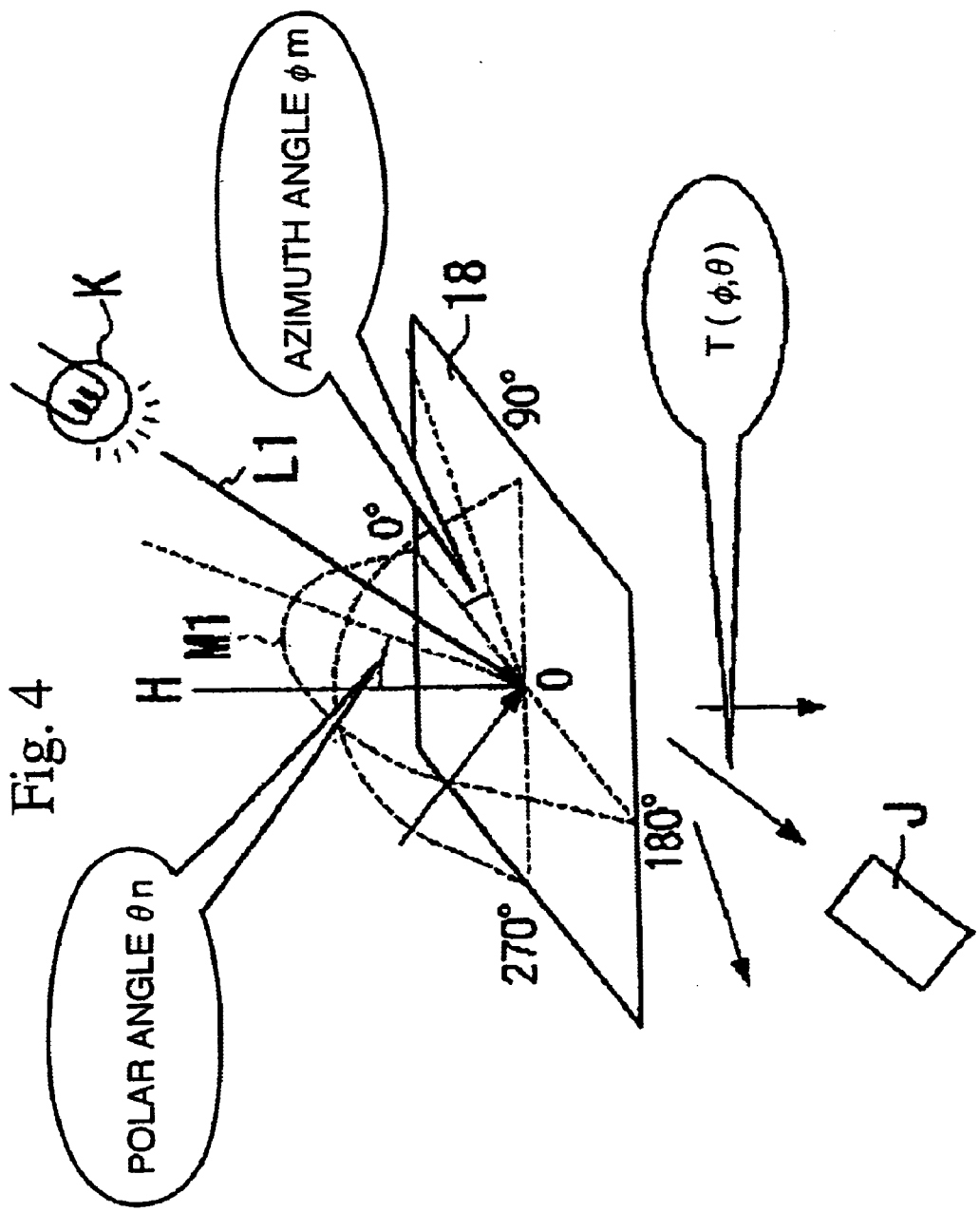
FIG. 4 is an explanatory figure showing the positional relationship between a directional frontal scattering film, a light source, a light receiving portion, a polar angle, an azimuth angle, and the parallel transmitted light.

First, the directional frontal scattering film 18 of rectangular shape in plan view as shown in FIG. 4 is arranged horizontally. It should be understood that, although the horizontal arrangement state is explained in FIG. 4 since the horizontal arrangement state is easy to explain, the direction in which the directional frontal scattering film 18 is arranged is not limited to the horizontal direction, and any direction will be acceptable, with the main point being that the positional relationship (a polar angle θ and an azimuth angle φ which will be described hereinafter) of a light source K, a light receiving portion J, and the directional frontal scattering film 18 can be determined precisely. In the explanation of this embodiment, the horizontal direction arrangement of the directional frontal scattering film 18 will be explained, by way of example, as an easily comprehensible direction.

In FIG. 4, the case will be supposed that the incident light L1 is incident from the light source K towards an origin O at the central portion of the directional frontal scattering film 18 at a sloping direction from an area right and diagonally above the directional frontal scattering film 18. And a measurement system will be assumed in which transmitted light which passes directly through the origin O of the directional frontal scattering film 18 is received by the light receiving portion J which is a light sensor or the like.

Here, in order to specify the direction of the incident light L1 upon the directional frontal scattering film 18, coordinates will be hypothesized which, as shown in FIG. 4, pass through the origin O at the central portion and divide the directional frontal scattering film 18 into four equal rectangular shapes by coordinate axes at 0°, 90°, 180° and 270° (or, to put it in other words, the directional frontal scattering film 18 is divided into four equal portions in such a way that the one end of each of the coordinate axes passes through the central point of one of its sides). And the rotational angle of the incident light L1 about the horizontal direction projected vertically upon the surface of this directional frontal scattering film 18 is defined as the azimuth angle φ (angles turning rightwards from the 0° coordinate axis are considered as + while angles turning leftwards from the 0° coordinate axis are considered as −). Next, the angle subtended with respect to the normal H to the directional frontal scattering film 18 with respect to the direction of the incident light L1 projected horizontally into a vertical plane which contains the coordinate axes 0° and 180° (the plane shown in FIG. 4 by the reference symbol M1) will be defined as the polar angle θ of the incident light L1. To put it in other words, the polar angle θ means the angle of incidence of the incident light L1 in a vertical plane with respect to the directional frontal scattering film 18 when the film is arranged horizontally, and the azimuth angle φ corresponds to the rotational angle within the horizontal plane of the incident light L1.

Figure 5:
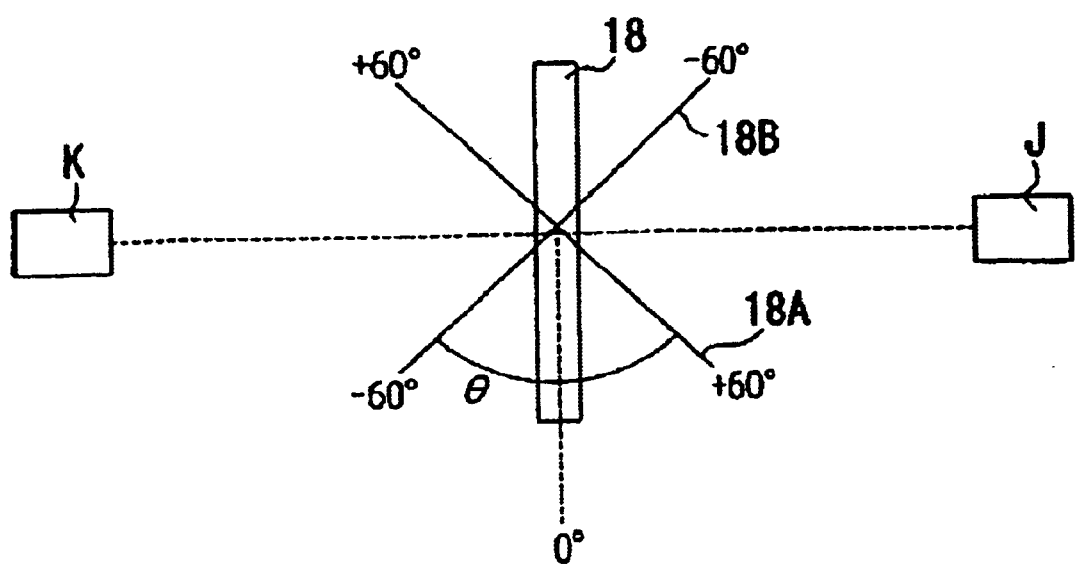
FIG. 5 is an explanatory figure showing the positional relationship between a directional frontal scattering film, a light source, and a light receiving portion.

In this state, when for example the polar angle of the incident light L1 is supposed to be 0° and the azimuth angle is also supposed to be 0°, then the incident light L1 comes to be incident at a right angle upon the directivity frontal film 18 as shown in FIG. 5 (i.e. is incident from the direction of the normal H), and the directional frontal scattering film 18 comes to be in the state shown in FIG. 5 by the reference symbol 18. When the polar angle θ is supposed to be +60°, then this means that the positional relationship between the light source K, the light receiving portion J, and the directional frontal scattering film 18 comes to be the state in which the directional frontal scattering film 18 is arranged as shown by the reference symbol 18A in FIG. 5. When the polar angle θ is supposed to be −60°, then this means that the positional relationship between the light source K, the light receiving portion J, and the directional frontal scattering film 18 comes to be the state in which the directional frontal scattering film 18 is arranged as shown by the reference symbol 18B.

Figure 6A:
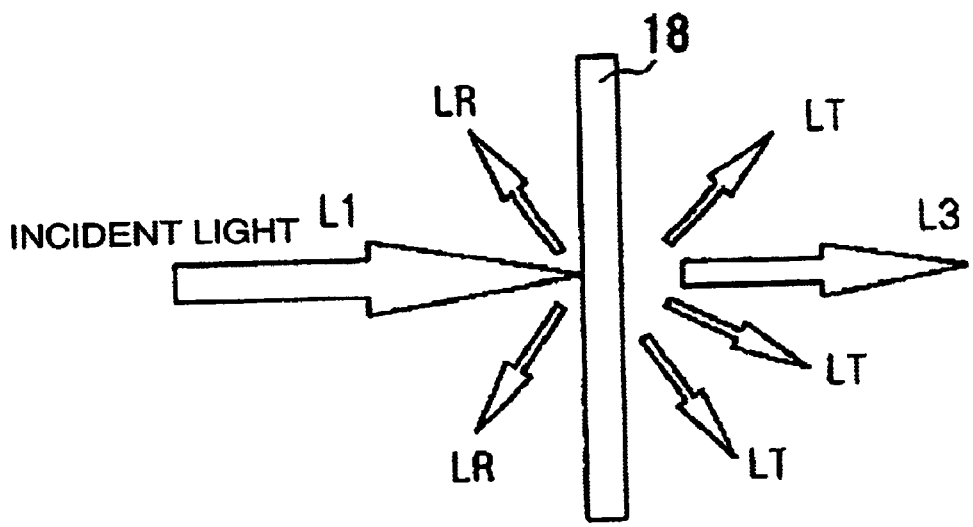
FIG. 6A is an explanatory figure showing, for a directional frontal scattering film, the relationship between the incident light, the parallel transmitted light, the scattered transmitted light, the backward scattered light, and the forward scattered light.

Next, when incident light L1 generated from a light source which is arranged upon one side surface (in FIG. 6A, the left side) of the directional frontal scattering film 18 as shown in FIG. 6A passes through the directional frontal scattering film 18 and emerges at the other side surface (in FIG. 6B, the right side) of the directional frontal scattering film 18, it will be supposed that the light which is scattered on the one side surface (the left side) of the directional frontal scattering film 18 will be termed the backward scattered light LR, while the light which passes through the directional frontal scattering film 18 will be termed the forward scattered light. And, with respect to the forward scattered light which has passed through the directional frontal scattering film 18, the proportion which the light intensity of the forward scattered light L3 which proceeds directly in the same direction at an angular error within ±2° with respect to the direction of progression of the incident light L1 bears with respect to the light intensity of the incident light L1 will be defined as the parallel beam transmission ratio. Furthermore, the proportion which the light intensity of the forward scattered light which is diffuse slantingly to the sides at an angle of greater than ±2° bears to the light intensity of the incident light L1 will be defined as the diffusion transmission ratio, while the proportion which the entire amount of the transmitted light bears to the incident light will be defined as the entire light beam transmission ratio. From the above definitions, it is possible to define that the result of subtracting the diffusion transmission ratio from the entire light beam transmission ratio is the parallel beam transmission ratio. In order to make the above explanation even simpler to understand, the relationship between the incident light L1, the azimuth angle φ, and the parallel transmitted light L3 is also shown in FIG. 1.

It should be understood that, although a transmission ratio scale which is termed "haze" is also generally known in the optical field, haze is a value which is expressed as a percentage by dividing the diffusion transmission ratio by the entire light beam transmission ratio, and the parallel beam transmission ratio which is used in this embodiment is a completely different concept.

Next, when expressing the maximum transmission ratio of the parallel beam transmission ratio using the previous polar angle θ and azimuth angle φ, it is defined as being expressed as Tmax (φ1, θ1), and the minimum transmission ratio of the parallel beam transmission ratio is defined as being expressed as Tmin (φ2, θ2). Furthermore, to put it in other words, from the nature of the directional frontal scattering film 18, the condition for exhibiting the maximum transmission ratio is the condition that the scattering is weakest; and the condition for exhibiting the minimum transmission ratio is the condition that the scattering is strongest.

For example, when hypothetically the maximum transmission ratio is exhibited when the polar angle θ=0° and the azimuth angle φ=0°, then this is expressed as Tmax(0, 0). (This means that the parallel beam transmission ratio is maximum along the normal direction to the directional frontal scattering film. To put it in other words, it means that the scattering is weakest along the direction of the normal 14 to the directional frontal scattering film.) Furthermore, when the minimum transmission ratio is exhibited when the polar angle θ=10° and the azimuth angle φ=45°, then this is expressed as Tmin(10, 45), and this means that in this case the scattering in this direction is the strongest.

Based upon the above definitions, the characteristics of the directional frontal scattering film 18 which are desirable for application to a liquid crystal display device will be explained in the following.

As described above, for the directional frontal scattering film 18, the angle at which the parallel beam transmission ratio exhibits the maximum transmission ratio is the angle at which the scattering is the weakest, and the angle at which it exhibits the minimum transmission ratio is the angle at which the scattering is the strongest.

Accordingly, to put it in other words, for a reflective type liquid crystal display device as shown in FIG. 2 which employs the ambient light as the incident light L1 upon the liquid crystal panel 10, when it is considered that the observer perceives the light reflected from the reflective layer 31 as the reflected light, when, in terms of the coordinate axes of FIG. 4, the incident light enters into the liquid crystal panel 10 from a direction in which the scattering is strong when the light is incident (to put it in other words, a direction in which the parallel beam transmission ratio is low), and when the reflected light is being observed by an observer it is seen from a direction in which the scattering is weak (to put it in other words, a direction in which the parallel beam transmission ratio is high), then it is considered that it is possible to obtain a state in which blurring of the pattern which is displayed on the display is low. This is a matter based upon the knowledge that has become known to the present inventors, that, although it is difficult for the scattering when the light is incident upon the directional frontal scattering film 18 for the first time to exert influence upon blurring of the pattern which is displayed on the display, nevertheless, when it, as reflected light, passes through the directional frontal scattering film 18 for the second time, the influence of the scattering upon blurring of the pattern which is displayed on the display is great.

In other words, in this embodiment, for the objective of preventing regular reflection (mirror reflection) from the reflective layer 31 and of making it possible to obtain a clear display over a wide angle of field of view, it is desirable more to scatter the light when the incident light L1 passes through the forward directivity scattering film 18 for the first time (so that the diffused transmitted light is greater). Moreover, this is because it is considered to be desirable in view of the fact that the lower amount of scattering when the light which has been reflected by the reflective layer 31 in the interior of the liquid crystal device passes through the directional frontal scattering film 18 for the second time reduces the blurring of the pattern which is displayed on the display. Accordingly, as a characteristic for the directional frontal scattering film 18, it is desirable to orient the polar angle and azimuth angle which exhibit the minimum transmission ratio, or to put it in other words, the polar angle and the azimuth angle direction of the incident light for which the scattering is strongest, towards the light reception side of the liquid crystal panel 10; or, to put it in other words, to orient them towards the opposite side from that of the observer. And it is necessary to orient the polar angle and azimuth angle for which the parallel beam transmission ratio exhibits the maximum transmission ratio, or, to put it in other words, the incident light angle and incidence direction for which the scattering is weakest, towards the side of the observer of the liquid crystal panel 10.

Figure 6B:
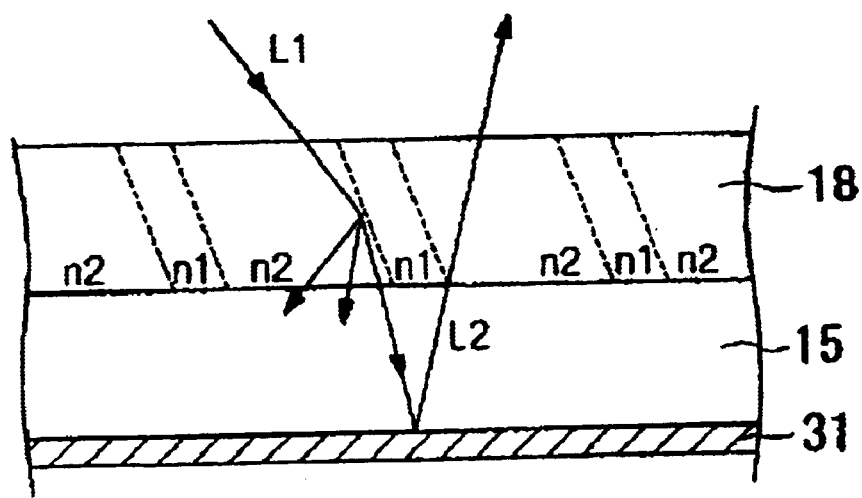
FIG. 6B is an explanatory figure showing a sectional view of an example of the structure of a directional frontal scattering film, and the relationship between the incident light and the reflected light.

Below, the cross sectional structure of the directional frontal scattering film 18 which is utilized in this embodiment is shown in FIG. 6B, and the state as described above of the polar angle and azimuth angle will be explained.

The cross sectional structure model of the directional frontal scattering film 18 which is utilized in this embodiment, as shown in FIG. 6B, is structured so that portions of index of refraction n1 and portions of index of refraction n2 are arranged alternately in the form of layers in a slanting direction having a predetermined angle with respect to the cross sectional structure of the directional frontal scattering film 18. When it is supposed that incident light L1 having a suitable polar angle is incident from a slanting direction upon the directional frontal scattering film 18 of this structure, then when, along with being scattered at the boundary portions between the various layers which have different indexes of refraction, a portion of the scattered light passes through the liquid crystal layer 15 and is reflected by the reflective layer 31, this reflected light R1 passes through the liquid crystal layer 15 for a second time and attempts to pass through the directional frontal scattering film 18 at a different polar angle from that of the previous incident light L1. The reflected light R1 here is able to pass through the directional frontal scattering film 18 in a state in which the scattering is lower.

And, in order to satisfy this type of relationship, it is most desirable that $\phi 1 = \phi 2 \pm 180°$ as a relationship between the azimuth angles $\phi 1$ and $\phi 2$. This means that $\phi 2$ is adjusted to the incident angle direction and $\phi 1$ is adjusted to the direction of observation, and when applied to an actual liquid crystal device these angles are different from 180°. In this case, a sharp display is obtained with no blurring of the pattern which is displayed on the display, since the light which is incident upon the liquid crystal device is strongly scattered when it is incident, and it is hard for the light which is reflected by the reflective layer 31 to be scattered. However in consideration of the fact that this directional frontal scattering film 18, in which the layers which have different indexes of refraction are arranged alternately in layer form in a slanting direction and have a predetermined angle such as described above, is not absolutely structurally uniform, $\phi 1 = \phi 2 \pm 180°$ is ideal as a relationship between the azimuth angles $\phi 1$ and $\phi 2$. However, based upon the relationship $\phi 1 = \phi 2 \pm 180°$, it will be presumed that cases up to a deviation of approximately $\pm 10°$ from these angles still fall within the ambit of the present invention. It becomes difficult to obtain a sharp display with no blurring of the pattern on the display with structures in which the deviation from these angles exceeds $\pm 10°$.

Next, it is desirable for the value of the above (Tmax/Tmin) to satisfy the relationship (Tmax/Tmin)$\geq 2$. By satisfying this relationship, sufficient scattering is obtained upon incidence, and a bright and sharp reflection display is obtained. Furthermore, by this relationship being satisfied, it is possible to implement a clearer reflective display than in the case of utilizing an isotropic scattering film such as is known from the prior art.

Next, to consider each of the polar angles $\theta 1$ and $\theta 2$, in order to obtain a clearer display than with an isotropic scattering film, ranges of $-40° \leq \theta 1 < 0°$ and $0° < \theta 2 \leq 40°$ are desirable; and ranges of $-30° \leq \theta 1 \leq -10°$ and $10° \leq \theta 2 \leq 30°$ are more desirable.

Next, when the parallel beam transmission ratio in the normal direction to the directional frontal scattering film 18 (directly in front thereof) is defined as $T(0, 0)$, then, in order to obtain a clearer display than with an isotropic scattering film such as is known from the prior art, in the case of $\theta 1 = \theta 2 = 20°$, it is desirable for $T(0, 0)$ to be greater than or equal to 3% and to be less than or equal to 50%. Furthermore, it is more desirable for $T(0, 0)$ to be greater than or equal to 5% and to be less than or equal to 40%. When $T(0, 0)$ falls below 3% then the scattering is too strong and the pattern on the display becomes blurred, while when $T(0, 0)$ exceeds 40% then the frontal scattering is too weak and the situation becomes close to mirror reflection.

Next, when a range of azimuth angle $\phi$ of the directional frontal scattering film 18 of $\phi 1 \pm 60°$ ($\phi 2 \pm 60°$) is specified, it is desirable for the absolute maximum (maximum) of the parallel beam transmission ratio to be always attained at $\theta 1$ and the absolute minimum value (minimum value) of the parallel beam transmission ratio to be always attained at $\theta 2$, and also for the ratio between the absolute maximum value (maximum value) and the absolute minimum value (minimum value) to be greater than or equal to 1.5. When these characteristic are satisfied, since it is possible to scatter the light, not only in a single direction of $\phi 2$ but also up to an azimuth angle of $\pm 60°$, thereby it becomes easy to cope with various environments, and it is possible to implement a clear display.

Next, when the polar angle $\theta$ of the direction which is orthogonal to the azimuth angle $\phi 1$ which gives the maximum transmission ratio and to the azimuth angle $\phi 2$ which gives the minimum transmission ratio is varied from $-40°$ to $+40°$, when over this range the parallel beam transmission ratio is equal to or is greater than the transmission ratio in the normal direction of the directional frontal scattering film, then it is possible to obtain a sharp display with no blurring of the pattern on the display, even when the liquid crystal device is observed from a sidewise direction. In other words, it is desirable for it to be arranged to satisfy the relationship $T(0, 0) \leq T(\phi 1 \pm 90, \theta)$, and to satisfy the relationship $T(0, 0) \leq T(\phi 2 \pm 90, \theta)$.

Next, in the range of polar angle of $-60° \leq \theta \leq +60°$, it is desirable for the parallel beam transmission ratio $T(\phi, \theta)$ to be greater than or equal to 2%, and to be less than or equal to 50%. In other words, it is desirable for the relationship $2\% \leq T(\phi, \theta) \leq 50\%$ to be satisfied, provided that $-60° \leq \theta \leq +60°$.

By establishing this type of relationship, it is possible to obtain a sharp display which is bright and which has no blurring of the pattern on the display.

Second Embodiment of the Liquid Crystal Device

Figure 7:
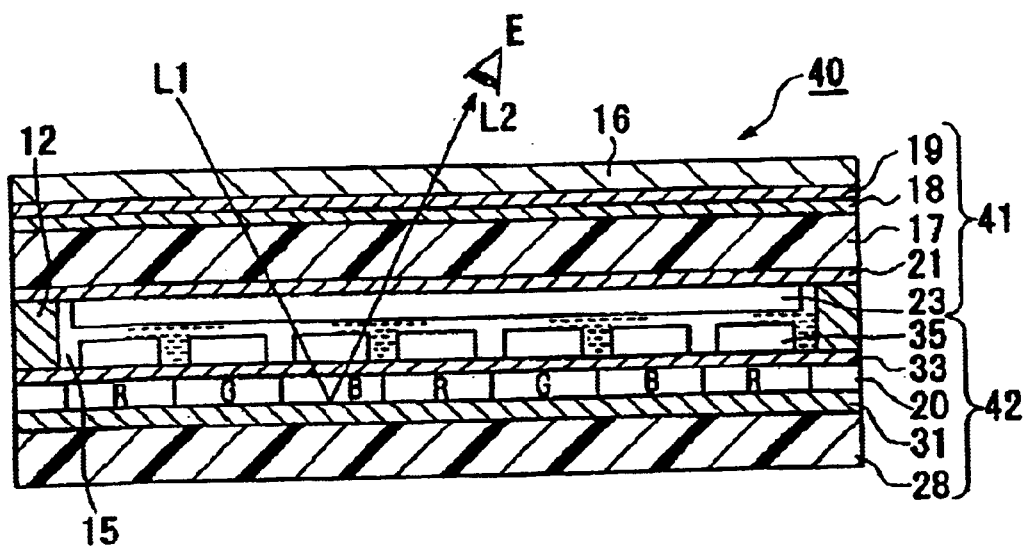
FIG. 7 is a sectional view of a liquid crystal panel according to the second, sixth, and ninth embodiments of the present invention.

FIG. 7 is a partial sectional view of the liquid crystal panel 40 of the second embodiment of the liquid crystal device according to the present invention.

The liquid crystal panel 40 of this embodiment is one of a simple matrix structure of the reflective type, which comprises a directional frontal scattering film 18 the same as the liquid crystal panel 10 of the previously described first embodiment which was explained based upon FIG. 1 through FIG. 3 above. Since the basic structure is the same as the first embodiment, the same reference symbols will be affixed to the same structural elements and the explanation of those structural elements will be curtailed, and in the following principally the differing structural elements will be explained.

The liquid crystal panel 40 of this embodiment is made up by sandwiching a liquid crystal layer 15 which is surrounded by a seal member 12 between a base plate unit 41 and a base plate unit 42 which are opposed to one another. In the upper side base plate unit 41, since the color filter layer 20 in the base plate unit 13 of the previously described first embodiment has been curtailed, a color filter layer 20 is layered over the reflective layer 31 of the lower side base plate unit 42 on the opposite side, and thus the structure of this portion differs from the structure of the previously described first embodiment. In other words, the liquid crystal panel 40 shown in FIG. 7 is structured with the color filter layer 20, which in the previously described first embodiment was provided on the base plate unit 13 side on the upper side (the observer side), being provided on the base plate unit 42 side on the lower side (the opposite side to the observer side) of the liquid crystal layer 15. Although the structure of the color filter layer 20 is the same as the structure of the first embodiment, since the color filter layer 20 is formed upon the upper surface side of the base plate 28, accordingly the up and down direction of the lamination structure of the color filter layer 20 is reversed with respect to the state of FIG. 3.

In the structure of this second embodiment as well, since the directional frontal scattering film 18 is provided identically to the structure of the previously described first embodiment, it is possible to obtain the identical beneficial results to the structure of the previously described first embodiment, with relation to blurring of the pattern which is displayed on the reflective display.

Furthermore, with the liquid crystal device 40 shown in FIG. 7, there is the particular characteristic that it is difficult for any problem of color deviation to occur, since the color filter layer 20 is formed directly over the reflective layer 31, and since the light which is incident upon the liquid crystal device 40 arrives at the reflective layer 31 via the liquid crystal layer 15, and passes through the color filter 32 directly after being reflected.

In this embodiment the reflective layer 31 is in the mirror (specular surface) state, but it will be no problem when it has minute convexities and concavities of approximately 1 to 20 μm.

Third Embodiment of the Liquid Crystal Device

Figure 8:
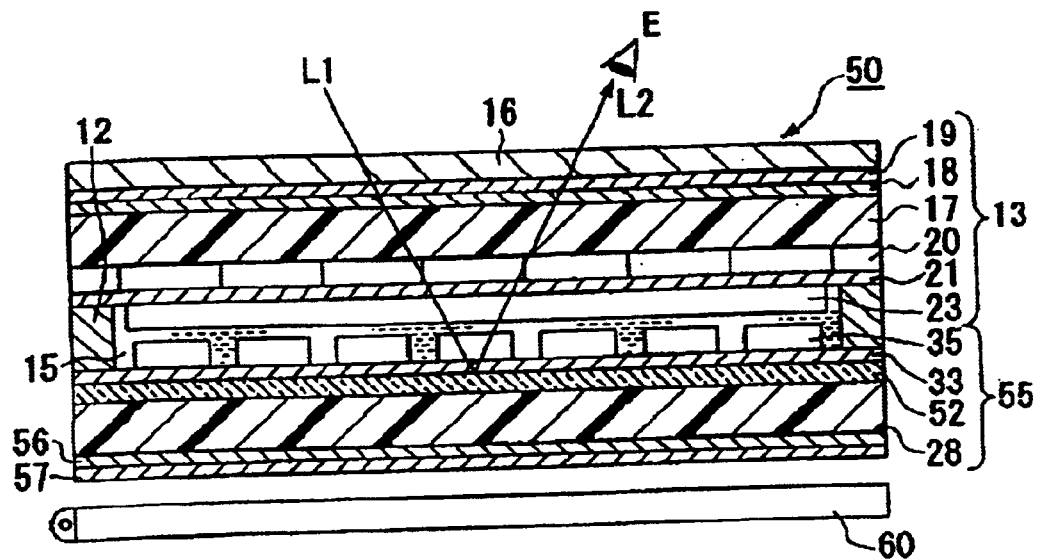
FIG. 8 is a sectional view of a liquid crystal panel according to the third, seventh, and tenth embodiments of the present invention.

In FIG. 8 there is given a sectional figure showing a liquid crystal panel 50 of a third embodiment of the liquid crystal device according to the present invention.

The liquid crystal panel 50 of this embodiment is one of a simple matrix structure of the semi-transparent reflective type comprising a base plate unit 55 which is provided with a semi-transparent reflective layer 52, instead of the reflective layer 31 which was provided to the liquid crystal panel 10 of the previously described first embodiment which was explained based upon FIG. 1 through FIG. 3 above. In the other basic structures, the same reference symbols will be affixed to the same portions as in the first embodiment, and the explanation of those structural elements will be curtailed, and in the following principally the differing structural elements will be explained.

It should be noted that, when a liquid crystal display device of the transparent type is used, the base plate 28' on the lower side is required to be made from a transparent base plate such as glass or the like.

In the liquid crystal panel 50, the differences from the structure of the first embodiment are: the point that the semi-transparent reflective layer 52 is provided; the point that a light source 60 such as a back light or the like is additionally disposed at the back side (the lower side in FIG. 8) of the liquid crystal panel 50; and the point that a phase difference plate 56 and a polarization plate 57 are added.

For the semi-transparent reflective layer 52, an element which is widely used in liquid crystal devices of the semi-transparent reflective type may appropriately be employed, such as a semi-transparent reflective layer (for example, a thin Al film or a thin Ag film or the like of film thickness of several hundred angstroms) of sufficient thickness in order to pass the transmitted light which is generated by the light source 60 such as a back light or the like on the back side (the lower side in FIG. 8), or a structure with enhanced optical transparency in which a large number of minute through holes are formed through one portion of the reflective layer, or the like.

With this liquid crystal device of the third embodiment, it operates as a liquid crystal display of a transparent type when transmitted light from the light source 60 such as a back light or the like is employed; while, when light from the light source is not employed, it can be employed as a reflective type liquid crystal display device by using ambient light to perform reflective display. And, when this display is employed as a reflective type liquid crystal display device, in the same manner as in the case of the previously described first embodiment, due to the existence of the directional frontal scattering film 18, it is possible to obtain a display of a sharp reflective type in which blurring of the pattern on the display is eliminated.

Although, in the explanation of the first, second, and third embodiments up until this point, applications of the present invention to reflective type liquid crystal display devices of the simple matrix type have been explained by way of example, it should be noted that, of course, it would also be acceptable to apply the present invention to a reflective type liquid crystal display device, or a semi-transparent reflective type liquid crystal display device, of an active matrix type comprising a two terminal type switching element or a three terminal type switching element.

When the present invention is applied to those active matrix type liquid crystal display devices, instead of the stripe form electrodes shown in FIGS. 2, 7, and 8, of course it could be applied to a liquid crystal display device which is made as a TFT (thin film transistor) drive type in which a common electrode is provided on the side of one of the base plates, and a large number of pixel electrodes are provided on the side of the other base plate for each pixel, and which is driven by thin film transistors for each of the pixel electrodes which are three terminal type switching elements; or to one which is made as a two terminal type linear element drive type in which electrodes in stripe form are provided on the side of one of the base plates, and a pixel electrode for each pixel is provided on the side of the other base plate, and which is driven by thin film diodes for each of these pixel electrodes which are two terminal type linear elements. The present invention has the special characteristic that it can be applied to the liquid crystal display devices of the various embodiments extremely easily, since it can be applied to either of these types of liquid crystal display device as well, only by directive the scattering film being arranged in the specified direction described above upon the liquid crystal panel.

Fourth Embodiment of the Liquid Crystal Device

Figure 9:
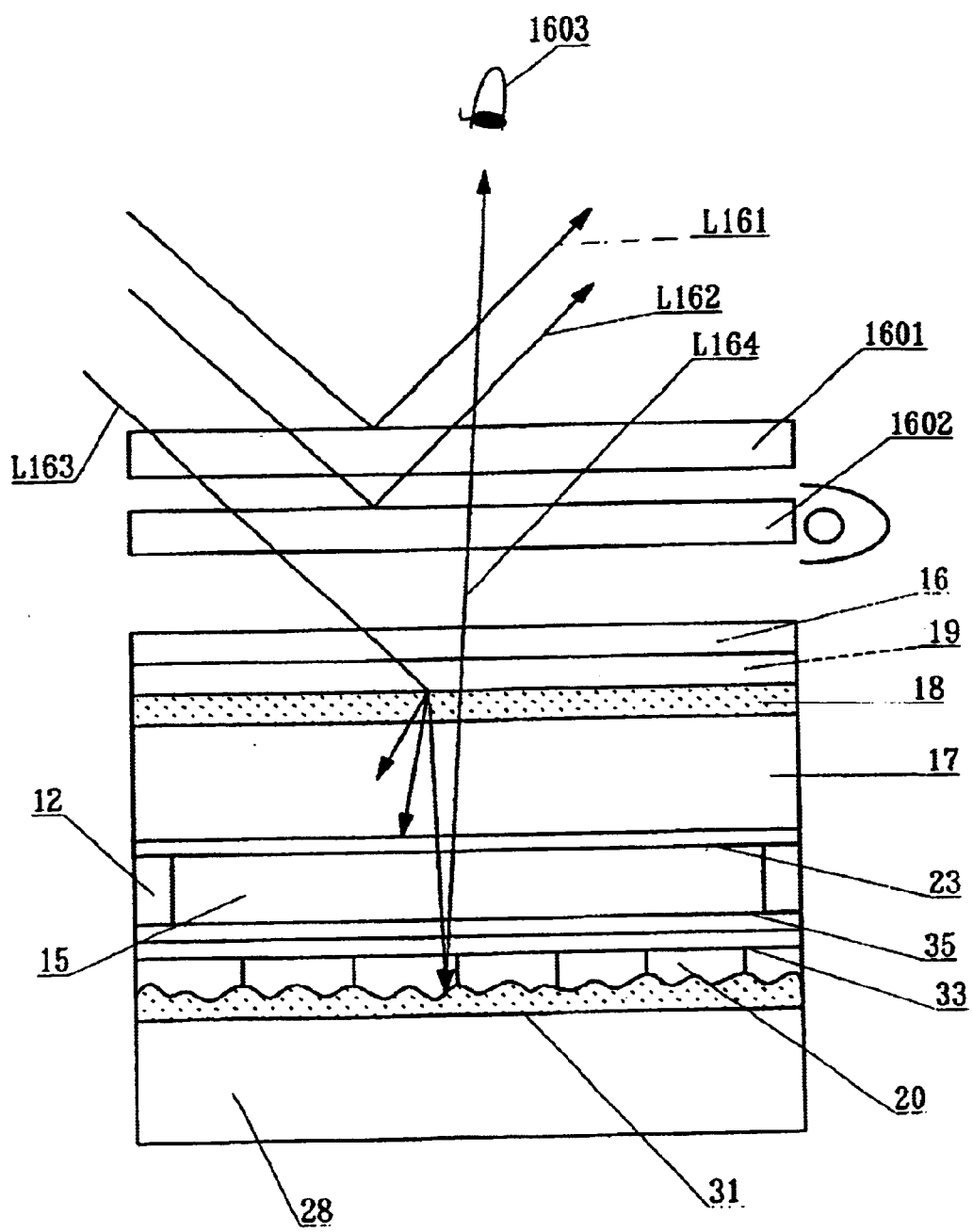
FIG. 9 is a sectional view of a liquid crystal panel according to the fourth embodiment of the present invention.

In FIG. 9 there is presented a sectional figure which shows a liquid crystal panel of a fourth embodiment of the liquid crystal device according to the present invention.

The liquid crystal panel of this embodiment mainly comprises: a pair of base plates 17 and 28 which are shaped as rectangular in plan view and which are adhered together via an annular seal member 12 which is shaped as rectangular in plan view so as mutually to confront one another with a cell gap being opened between them; a liquid crystal layer 15 which is sandwiched between these members while being surrounded by the seal member 12; a directional frontal scattering film 18 which is provided upon the upper surface side of one of the base plates 17; and a phase difference plate 19 and a polarization plate 16.

The base plate unit on the upper side comprises: the base plate 17 which is made of a transparent material such as for example glass or the like; provided in order on the display side of the base plate 17, (in FIG. 9, the upper surface side or the observer side), the directional frontal scattering film 18, the phase difference plate 19, and the polarization plate 16; and, formed on the rear side of the base plate 17 (or to put it in other words, on its liquid crystal layer 15 side), a plurality of electrode layers 23 of stripe form for liquid crystal driving. It should be understood that although, in an actual liquid crystal device, orientation films are formed as coatings upon the liquid crystal layer 15 side of the electrode layers 23 and on the liquid crystal layer 15 side of an electrode layer in stripe form on the lower base plate side which will be described hereinafter, in FIG. 9 these orientation films are omitted, and the explanation is also abbreviated. Upon the liquid crystal layer 15 side of the lower side base plate 28 there are formed, in order, a reflective layer 31 which is endowed with convexities and concavities, a color filter layer 20, an overcoat layer 33, and an electrode layer 35. Furthermore, the cross sectional structure of the liquid crystal device shown in FIG. 9 is displayed with the thicknesses of the layers adjusted so that they are easier to see as displayed in the figure, thus being different from those in an actual liquid crystal device.

The electrode layers for driving on the side of the upper base plate are, in this embodiment, formed in stripe form in plan view from a transparent electroconductive material such as ITO (Indium Tin Oxide) or the like, and these stripes are formed in the required number to correspond to the number of display regions and pixels on the liquid crystal panel.

The reflective layer 31 of this embodiment is made from a metallic material coating which is endowed with light reflectivity and also electroconductivity such as Ag or Al or the like, and it is formed by a vapor deposition method or a spattering method or the like after convexities and concavities have been formed upon the base plate 28 with acrylic resin or by etching the glass base plate with hydrofluoric acid. Moreover, employing this reflective layer 31 as a drive electrode will not cause any problem.

In the case of the embodiment of FIG. 9, a front light transmission plate 1602 and a touch key input device 1601 are disposed on the observer 1603 side of the liquid crystal device.

Since surface reflections L161 and L162 are present upon the surfaces of the front light transmission plate 1602 and the touch key input device 1601 as shown in FIG. 9, the liquid crystal device is not normally observed from this direction. Since the liquid crystal device of the present invention has the function of dispersing the incident light L163 by diffraction as shown in FIG. 6B, it is possible for the observer 1603 to obtain a clear display, without any relationship to the surface reflections L161 and L162.

Furthermore, since the light is strongly scattered when it is incident but is not strongly scattered when it is emitted, a clear display is obtained. It is possible to alleviate the dazzling of the reflective layer which has the convexities and concavities by the scattering when the light is incident.

TEST EXAMPLE 1

Measurement tests were performed using a directional frontal scattering film manufactured by a transparent type hologram technique.

Figure 10:
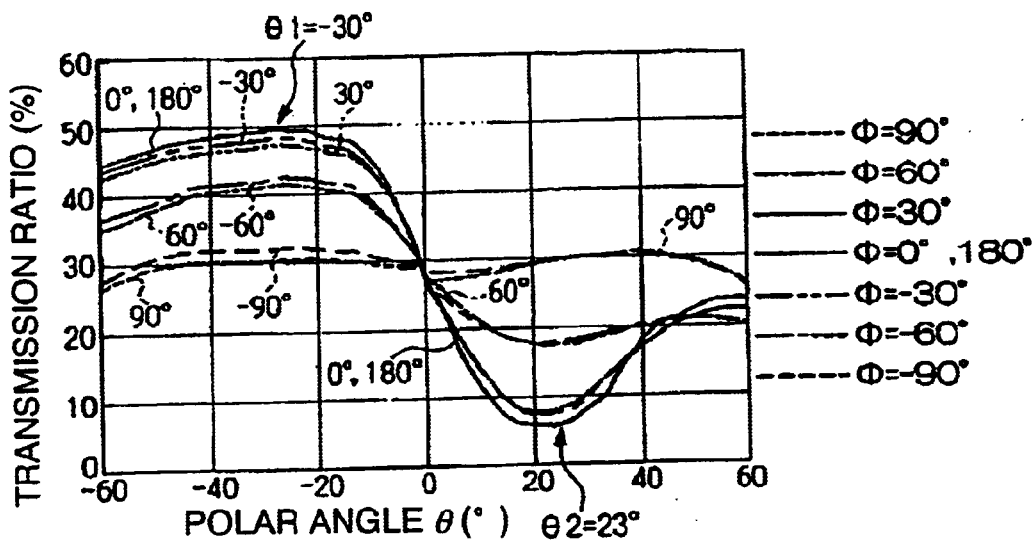
FIG. 10 is a figure showing the results of measuring, for various azimuth angles, examples of a first relationship between polar angle and transmission ratio, as measured in the embodiment.

Light from a halogen lamp light source (disposed at a position separated by 300 mm from the directional frontal scattering film) was illuminated upon the central portion of the surface of a directional frontal scattering film of 50 mm×40 mm rectangular form in plan view arranged horizontally, and a light receiving portion (disposed at a position separated by 300 mm from the directional frontal scattering film) which had a light receiving element made from CCDs was set up upon the rear surface side of the directional frontal scattering film in various directions which were squarely opposed with respect to the incident light from the light source. The polar angle and azimuth angle of the light source were regulated as shown in FIG. 4, and the parallel beam transmission ratio at an angular error within ±2° was measured by the light receiving portion. The polar angle ($\theta$ of the light source (the angle of incidence of the incident light with respect to the normal to the frontal scattering film) was adjusted within a range of ±60°, and the results of measuring the parallel beam transmission ratio (in %) for each polar angle are shown in FIG. 10. Furthermore, with regard to the azimuth angle, the data were also measured for each of 0°,+30°, +60°, +90°, and +180° (which are all the rightwards rotational direction as shown in FIG. 4) and for each of −30°, −60°, −90°, and −180° (which are all the leftwards rotational direction as shown in FIG. 4), and these are shown all together in FIG. 10.

From the results shown in FIG. 10, the measurement results in the cases of 0° and +180° give exactly the same curve, and the relationship between the maximum transmission ratio Tmax and the minimum transmission ratio Tmin of the parallel transmitted light becomes (Tmax/Tmin) ≈50:6≈8.33, thus yielding a value which exceeds the value of 2 which is desired for the present invention.

Figure 11:
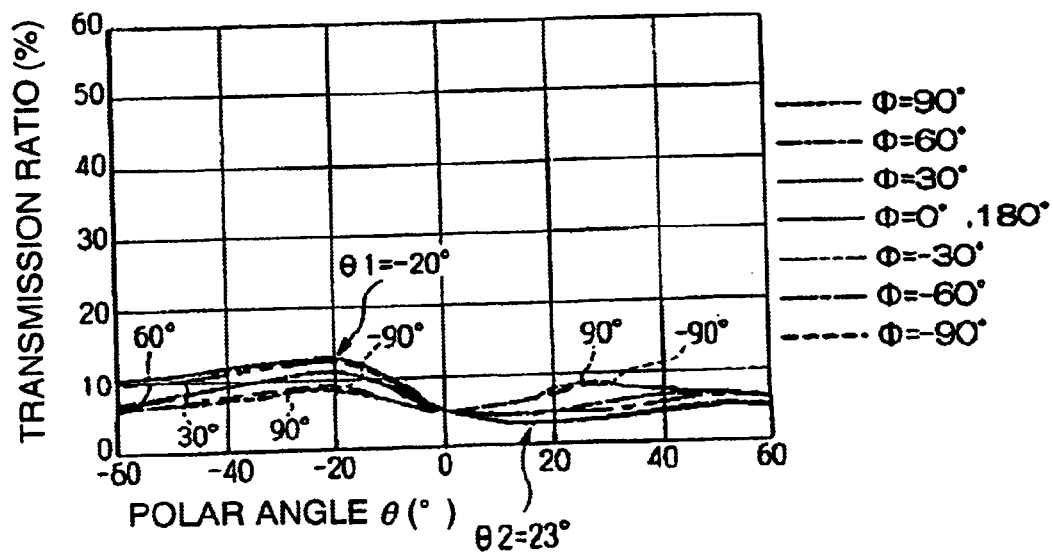
FIG. 11 is a figure showing the results of measuring, for various azimuth angles, examples of a second relationship between polar angle and transmission ratio, for the case of the ratio between the absolute minimum value and the absolute maximum value of the parallel ray transmission ratio being 4, as measured in the embodiment.

Next, the results of performing the same measurement tests of transmission ratio using a different directional frontal scattering film which was made by a transparent type hologram technique are shown in FIG. 11. Furthermore, the results of performing the same measurement tests of transmission ratio using a directional frontal scattering film which was made by a different transparent type hologram technique are shown in FIG. 12.

When the characteristic shown in FIG. 11 is considered, the relationship between the maximum transmission ratio Tmax and the minimum transmission ratio Tmin of the parallel transmitted light becomes (Tmax/Tmin)≈12:3≈4, thus yielding a value which exceeds the value of 2 which is desired for the present invention.

Figure 12:
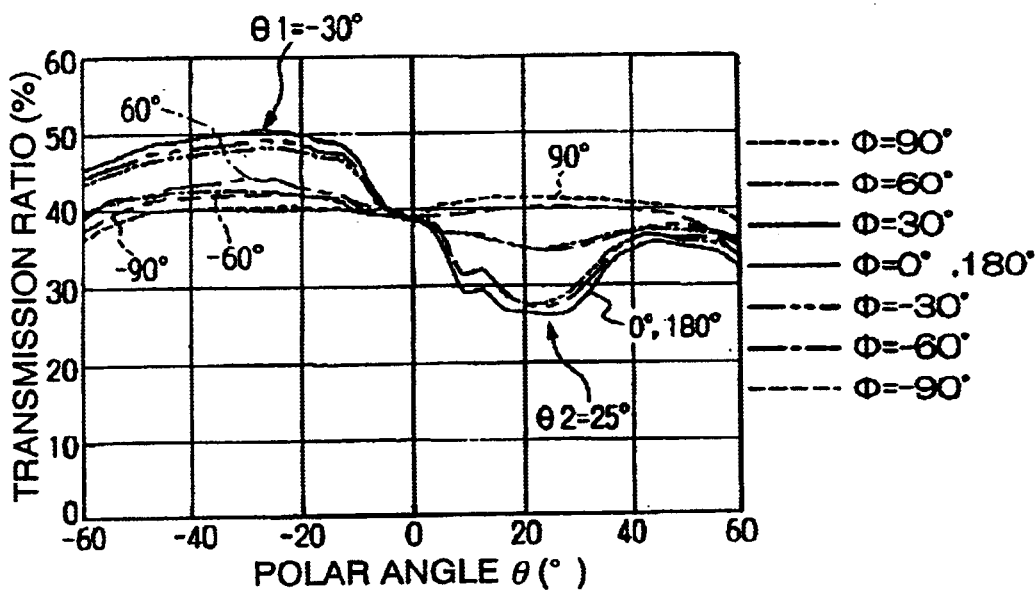
FIG. 12 is a figure showing the results of measuring, for various azimuth angles, examples of a third relationship between polar angle and transmission ratio, for the case of the ratio between the absolute minimum value and the absolute maximum value of the parallel ray transmission ratio being 2, as measured in the embodiment.

When the characteristic shown in FIG. 12 is considered, the relationship between the maximum transmission ratio Tmax and the minimum transmission ratio Tmin of the parallel transmitted light becomes (Tmax/Tmin)≈52:26≈2, thus yielding the value of 2 which is desired for the present invention.

Furthermore, with any one of the directional frontal scattering films shown by way of example in FIG. 10, FIG. 11, and FIG. 12, in the range of ±60°, it was clear that, the maximum, and minimum numerical values were at almost the same angle. For example, in the results shown in FIG. 10, the absolute maximum value was at the polar angle of −30° and the absolute minimum value was at the polar angle of +23°. In FIG. 11, the absolute maximum value was at the polar angle of −20° and the absolute minimum value was at the polar angle of +18°. In FIG. 12, the absolute maximum value was at the polar angle of −30° and the absolute minimum value was at the polar angle of +25°.

Next, for the directional frontal scattering films shown by way of example in FIG. 10, FIG. 11, and FIG. 12, when $\phi$ was ±90°, in any of the examples, it was ascertained that the transmission ratio was the lowest for the polar angle $\theta$ of 0. Furthermore, for the directional frontal scattering films shown by way of example in FIG. 10, FIG. 11, and FIG. 12, it was also clear that for the transmission ratio in all conditions, it was always within the range of 2% to 50%.

Figure 13:
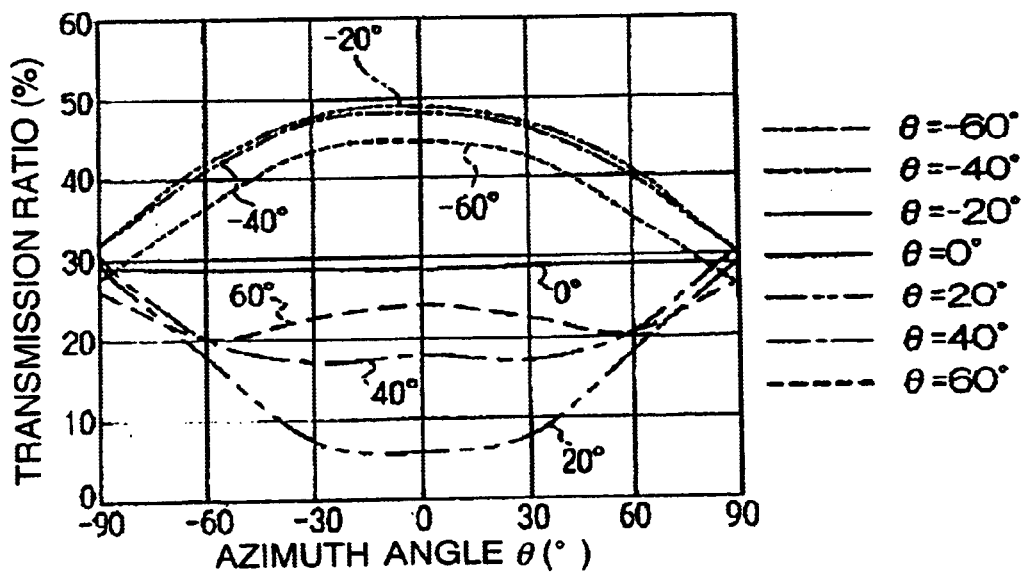
FIG. 13 is a figure showing the results of measuring, for various polar angles, the relationship between azimuth angle and transmission ratio, as measured in the embodiment.

Next, the transmission ratio of the directional frontal scattering film was measured while varying the azimuth angle $\phi$ while keeping the polar angle $\theta$ fixed, or to put it in other words, while rotating only the directional frontal scattering film in the horizontal plane, and the results are shown in FIG. 13.

According to the results shown in FIG. 13, although the state for the condition $\theta=0°$ in which the light was incident in the normal direction to the directional frontal scattering film is shown, almost the same transmission ratio was exhibited, while in the case of $\theta=-20°$, −40°, and −60°, over the range 0±90° of azimuth angle, the transmission ratio followed a curve which was convex to the upper side and attained a maximum. Furthermore, in the case of $\theta=+20°$, +40°, and +60°, over the range 0±90° of azimuth angle, the transmission ratio showed a tendency to follow a curve which was convex to the lower side (convex to the upper side) and attained a minimum. From this fact it is vividly shown that the directional frontal scattering film which was used in this embodiment exhibited maxima and minima of transmission ratio, according to polar angle and azimuth angle.

It should be understood that, when analyzing the transmission ratio relationships shown in FIG. 13, for negative polar angles $\theta$ (−20°, −40°, and −60°), within azimuth angle $\phi=\pm30°$, in other words, in the range $\phi=-30°$ to +30°, the maximum value of the transmission ratio was constrained to vary within 5%, while for positive polar angles $\theta$ (+20°, +40°, and +60°), within azimuth angle $\phi=\pm30°$, in other words, in the range $\phi=-30°$ to +30°, the minimum value of the transmission ratio was constrained to vary within 5%.

Figure 14:
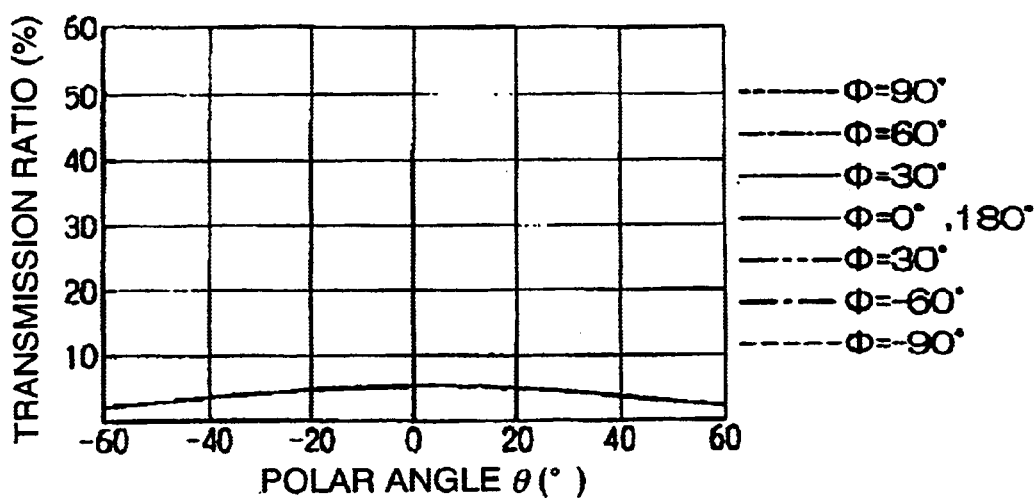
FIG. 14 is a figure showing the results of measuring, for various azimuth angles, the relationship between polar angle and transmission ratio, as measured in a comparison example.

FIG. 14 is a figure showing the results of measurement of the relationship between polar angle and transmission ratio, for each azimuth angle, in tests of a liquid crystal device which was manufactured using a prior art isotropic frontal scattering film (product name IDS-16K, made by Dainippon Printing Co. Ltd.). In these tests, a liquid crystal device the same as in the previously described first test example was utilized, and these are the results of measurements obtained by changing the anisotropic frontal scattering film for an isotropic scattering film which is in current use.

From the results shown in FIG. 14, it is clear that almost no variation was seen in the transmission ratio of the parallel transmitted light for any azimuth angle, and that, along with almost overlapping into a single curve, it attained its maximum when the polar angle was 0°, and only varied by approximately a few percent even when the polar angle was varied through the + region or through the − region. From these results, it is clear that the beneficial results of the present invention were not obtained even when an isotropic frontal scattering film was used in the liquid crystal device.

TEST EXAMPLE 2

Next, the brightness of a reflective type color liquid crystal display device in an office under lighting by fluorescent lamps was compared, as the polar angle $\theta1$ and the polar angle $\theta2$ of the previously described test were varied. For this brightness, comparison was made with a reflective type color liquid crystal display device which employed an isotropic frontal scattering film according to the prior art (the reflective type color liquid crystal display device employing an isotropic scattering film which was used for the measurements shown in the previously described FIG. 14), and those which could be perceived as brighter than the reflective type color liquid crystal display device according to the prior art are shown in the following Table 1 by "○", those which were the same by "Δ", and those which were darker by "X".

TABLE 1

| $\theta1$ (°) | −80 | −70 | −60 | −50 | −40 | −30 | −20 | −10 | 0 |
|---|---|---|---|---|---|---|---|---|---|
| $\theta2$ (°) | 0 | 0 | 0 | 0 | 0 | 0 | 0 | 0 | 0 |
| Results of Evaluation | x | x | x | x | x | Δ | Δ | Δ | x |
| $\theta1$ (°) | −80 | −70 | −60 | −50 | −40 | −30 | −20 | −10 | 0 |
| $\theta2$ (°) | 10 | 10 | 10 | 10 | 10 | 10 | 10 | 10 | 10 |
| Results of Evaluation | x | x | x | x | Δ | ○ | ○ | ○ | x |
| $\theta1$ (°) | −80 | −70 | −60 | −50 | −40 | −30 | −20 | −10 | 0 |
| $\theta2$ (°) | 20 | 20 | 20 | 20 | 20 | 20 | 20 | 20 | 20 |
| Results of Evaluation | x | x | x | x | Δ | ○ | ○ | ○ | x |
| $\theta1$ (°) | −80 | −70 | −60 | −50 | −40 | −30 | −20 | −10 | 0 |
| $\theta2$ (°) | 30 | 30 | 30 | 30 | 30 | 30 | 30 | 30 | 30 |
| Results of Evaluation | x | x | x | x | Δ | ○ | ○ | ○ | x |
| $\theta1$ (°) | −80 | −70 | −60 | −50 | −40 | −30 | −20 | −10 | 0 |
| $\theta2$ (°) | 40 | 40 | 40 | 40 | 40 | 40 | 40 | 40 | 20 |
| Results of Evaluation | x | x | x | x | x | Δ | Δ | Δ | x |

As is clear from the results of measurement shown in Table 6, it will be understood that, when the polar angle when the parallel transmitted light attains its maximum (the diffused transmitted light attains its minimum) is within the range of $-40° \leq \theta1 < 0°$ and the polar angle when the parallel transmitted light attains its minimum (the diffused transmitted light attains its maximum) is within the range of $0° \leq \theta2 \leq 40°$, then it is possible to ensure brightness of approximately the same as the prior art; while, when they are within the range of $-30° \leq \theta1 \leq 0°$ and the range $0° \leq \theta2 \leq 30°$, then a liquid crystal display device is obtained which is superior in brightness over the prior art.

TEST EXAMPLE 3

Directional frontal scattering films were prepared by varying the parallel beam transmission ratio T(0, 0) in the normal direction to the directional frontal scattering film over various values, and the brightness of liquid crystal display devices which were equipped with these directional frontal scattering films was compared in an office under lighting by fluorescent lamps. The prior art product with which comparison was performed was the same as the one used in the previously described test example. The cases which could be perceived as brighter than the reflective type color liquid crystal display device according to the prior art are shown in the following Table 2 by "○", those which were the same by "Δ", and those which were darker by "X"

TABLE 2

| T (0, 0) | 3% | 5% | 10% | 20% | 30% | 40% | 50% | 60% |
|---|---|---|---|---|---|---|---|---|
| Results of Evaluation | Δ | ○ | ○ | ○ | ○ | ○ | Δ | x |

As is clear from the results of measurement shown in Table 2, it is clear that, when the range is $3\% \leq T(\mathbf{0, 0}) \leq 60\%$, and more desirably is $5\% \leq T(\mathbf{0, 0}) \leq 40\%$, then it is possible to provide a reflective type color liquid crystal display device which is clearer than the prior art in an environment of actual use.

Next, from the results shown in FIG. 10, FIG. 11, and FIG. 12, it is also clear that, when the azimuth angles φ for the directional frontal scattering film are regulated to be in the ranges of φ1 ±60° and moreover φ2 ±60°, then the maximum of the parallel beam transparency is always exhibited for θ1, while minimum of the parallel beam transmission ratio is always exhibited for θ2.

TEST EXAMPLE 4

Next, a large number of directional frontal scattering films manufactured by a transparent type hologram technique were prepared, and the results of comparing the brightnesses of the reflective type color display devices when the value of (Tmax/Tmin) was adjusted to various values with a liquid crystal display device according to the previously described prior art are given in the following Table 3. The cases which could be perceived as twice as bright or more as compared with the reflective type color liquid crystal display device according to the prior art are shown in the following Table 3 by "⊚", those which were perceived as brighter than the prior art product by "○", those which were the same by "Δ", and those which were darker by "X".

TABLE 3

| Tmax/Tmin | 10 | 5 | 3 | 2 | 1.8 | 1.5 | 1 |
|---|---|---|---|---|---|---|---|
| Results of Evaluation | ⊚ | ⊚ | ⊚ | ⊚ | ○ | Δ | Δ |

From the results shown in Table 3, it is clear that particularly bright viewing was possible when the ratio between the absolute minimum value and the absolute maximum value of the parallel beam transmission ratio explained previously was greater than or equal to 2.

TEST EXAMPLE 5

With the azimuth angle when the parallel beam transmission ratio attained its minimum value or its maximum value being taken to be φ2 or φ1, the ratio between the absolute maximum value and the absolute minimum value of the transmitted light characteristic which was measured by varying the polar angle θ was measured in the ranges φ2 ±60° and φ1 ±60°. The brightness of the reflective type color liquid crystal display devices was compared in an office under lighting by fluorescent lamps while varying this ratio. The prior art product with which comparison was performed was the same as the one used in the previously described test examples. The cases which could be perceived as brighter than the reflective type color liquid crystal display device according to the prior art are shown in the following Table 4 by "○", those which were the same by "Δ", and those which were darker by "X".

TABLE 4

| absolute maximum value/ absolute minimum value | 5 | 3.5 | 2 | 1.5 | 1.2 | 1 |
|---|---|---|---|---|---|---|
| Results of Evaluation | ○ | ○ | ○ | ○ | Δ | Δ |

From the results shown in Table 4, it is clear that it is desirable for the absolute maximum value/the absolute minimum value to be greater than or equal to 1.5. In other words it is also clear that, when the azimuth angle φ of the directional frontal scattering film is regulated in the ranges of (φ1 ±60° and moreover φ2 ±60°, then the ratio between the absolute minimum value and the absolute maximum value of the parallel beam transmission ratio is greater than or equal to 1.5.

TEST EXAMPLE 6

When the polar angle θ was taken as $-60° \leq \theta \leq +60°$, the brightness of the reflective type color liquid crystal display device was compared in an office under lighting by fluorescent lamps while varying the maximum value and the minimum value of the parallel beam transmission ratio T. The prior art product with which comparison was performed was the same as the one used in the previously described test examples. The cases which could be perceived as brighter than the reflective type color liquid crystal display device according to the prior art are shown in the following Table 5 by "○", those which were the same by "Δ", and those which were darker by "X".

TABLE 5

| | | | | | | |
|---|---|---|---|---|---|---|
| maximum transmission ratio Tmax | 60% | 50% | 40% | 30% | 20% | 10% |
| minimum transmission ratio Tmin | 1% | 1% | 1% | 1% | 1% | 1% |
| Results of Evaluation | x | x | Δ | Δ | Δ | x |
| maximum transmission ratio Tmax | 60% | 50% | 40% | 30% | 20% | 10% |
| minimum transmission ratio Tmin | 2% | 2% | 2% | 2% | 2% | 2% |
| Results of Evaluation | x | ○ | ○ | ○ | ○ | ○ |
| maximum transmission ratio Tmax | 60% | 50% | 40% | 30% | 20% | 10% |
| minimum transmission ratio Tmin | 5% | 5% | 5% | 5% | 5% | 5% |
| Results of Evaluation | Δ | ○ | ○ | ○ | ○ | ○ |
| maximum transmission ratio Tmax | 60% | 50% | 40% | 30% | 20% | 10% |
| minimum transmission ratio Tmin | 10% | 10% | 10% | 10% | 10% | 10% |
| Results of Evaluation | Δ | ○ | ○ | ○ | ○ | Δ |
| maximum transmission ratio Tmax | 60% | 50% | 40% | 30% | 20% | 10% |
| minimum transmission ratio Tmin | 20% | 20% | 20% | 20% | 20% | 20% |
| Results of Evaluation | x | ○ | ○ | Δ | Δ | x |
| maximum transmission ratio Tmax | 60% | 50% | 40% | 30% | 20% | 10% |
| minimum transmission ratio Tmin | 30% | 30% | 30% | 30% | 30% | 30% |
| Results of Evaluation | x | Δ | Δ | x | x | x |
| maximum transmission ratio Tmax | 60% | 50% | 40% | 30% | 20% | 10% |
| minimum transmission ratio Tmin | 40% | 40% | 40% | 40% | 40% | 40% |
| Results of Evaluation | x | x | x | x | x | x |

From the results shown in Table 5, it will be understood that it is necessary for the maximum value/the minimum value to satisfy ≧2, and for the transmission ratio to be greater than or equal to 2% and less than or equal to 50%.

Fifth Embodiment of the Liquid Crystal Device

The first embodiment of the liquid crystal device according to the present invention will be described below with reference to FIGS. 1 through 3. FIG. 1 is a plan view showing this embodiment in which the present invention is applied to a reflective type liquid crystal panel of a simple matrix type; FIG. 2 is a partial sectional schematic view taken along the lines A—A of the liquid crystal panel shown in FIG. 1; and FIG. 3 is an enlarged sectional view of a color filter portion housed in the liquid crystal panel. As a finished product, a liquid crystal display device (liquid crystal device) is constituted by peripheral equipment such as an IC for liquid crystal driving, a support member and the like being fitted to the liquid crystal panel 10 of this embodiment.

The liquid crystal panel 10 of this embodiment comprises as main elements a pair of base plate units 13 and 14 which are rectangular in plan view and which are adhered together so as mutually to oppose one another with a cell gap being opened between them via a seal member 12 which is roughly rectangular in plan view and moreover is annular, a liquid crystal layer 15 which is sandwiched between these and is also surrounded by the seal member 12, and a directional frontal scattering film 18, a phase difference plate 19, and a polarization plate 16, which are provided upon the upper surface side of one of the base plate units 13 (in FIG. 2, the upper side one). Among the base plate units 13 and 14, the base plate unit 13 is that base plate unit on the display side (the upper side) which is provided to face towards the side of the observer, while the base plate unit 14 is the base plate unit on the opposite side, or to put it in other words, is provided on the rear side (the lower side).

The base plate unit 13 on the upper side comprises: a base plate 17 which is made of a transparent material such as for example glass or the like; a directional frontal scattering film 18, a phase difference plate 19 and a polarization plate 16 provided in that order upon the display side (the upper surface side in FIG. 2, i.e. the observer side) of the base plate 17; and a color filter layer 20, an overcoat layer 21, and a plurality of electrode layers 23 formed upon the liquid crystal layer 15 side of the surface of the overcoat layer 21 in stripe form for driving the liquid crystal, formed in that order upon the rear side (in other words, the liquid crystal layer 15 side) of the base plate 17. Moreover, in an actual liquid crystal device, orientation films are formed as coatings upon the liquid crystal layer 15 side of the electrode layers 23, and upon the liquid crystal layer 15 side of stripe form electrode layers 35 upon the lower base plate side as will be more explained hereinafter. However, these orientation films are omitted from FIG. 2 and explanation thereof is also omitted; and in the other embodiments explained below in order, such orientation films are also omitted from the explanation and from the drawings. Furthermore, in the illustrations of the cross sectional structure of the liquid crystal devices given in FIG. 2 and the various subsequent figures, the thickness of the various layers is shown as adjusted to make them easier to see in the drawings, and they are different from those in an actual liquid crystal device.

The electrode layers 23 for driving on the side of the upper base plate are formed in a stripe form in plan view from, in this embodiment, a transparent electroconductive material such as ITO (Indium Tin Oxide) or the like, and they are formed in the required number of lines to correspond to the number of display regions and of pixels of the liquid crystal panel 10.

In this embodiment, the color filter layer 20 is formed by forming a black mask 26 for light interception and RGB patterns 27 for color display upon the lower surface of the upper side base plate 17 (or, to put it in other words, on its surface towards the liquid crystal layer 15), as shown enlarged in FIG. 3. Furthermore, an overcoat layer 21 is coated as a transparent protective planarizing film which protects the RGB pattern 27.

The black mask 26 is formed, for example by a spattering method or a vacuum vapor deposition method, as a patterned metallic thin film of chrome or the like of approximately 100 to 200 nm in thickness. In the RGB patterns 27, a red color pattern (R), a green color pattern (G), and a blue color pattern (B) are formed so as to be aligned in a desired pattern arrangement by one of various methods such as, for example, a pigment scattering method using photosensitive resin which includes a specified coloring material, or various printing methods, electrodeposition methods, transcription methods, dyeing methods, or the like.

On the other hand, the base plate unit 14 on the lower side comprises a base plate 28 which is made from a transparent material such as glass or the like or from some other non transparent material, and, formed in order upon the surface side of the base plate 28 (the upper surface side in FIG. 2, or to put it in other words, the side of the liquid crystal layer 15), a reflective layer 31, an overcoat layer 33, and a plurality of electrode layers 35 for driving of stripe form which are formed upon the surface of the overcoat layer 33 towards the liquid crystal layer 15. These electrode layers 35, just like the previous electrode layers 23, are formed in the required number of lines to correspond to the number of display regions and of pixels of the liquid crystal panel 10.

Next, the reflective layer 31 of this embodiment is made of a light reflective and moreover electroconductive metallic material such as Ag or Al or the like, and it is formed upon the base plate 28 by a vapor deposition method or a spattering method or the like. However, it is not essential for the reflective layer 31 to be made from an electroconductive material, and it makes no difference when a structure is utilized in which an electrode layer for driving made of an electroconductive material different from the reflective layer 31 is provided, so that the reflective layer 31 and the drive electrodes are provided separately.

Next, the details of the above described directional frontal scattering film 18 which is attached to the base plate unit 13 on the upper side will be explained in the following.

As the directional frontal scattering film 18 which is utilized in this embodiment, from the point of view of its basic structure, a frontal scattering film endowed with directivity such as disclosed in Japanese Patent Application, Unexamined First Publication Nos. 2000-035506, 2000-066026, or 2000-180607 or the like may appropriately be employed. For example, as disclosed in Japanese Patent Application, Unexamined First Publication No. 2000-035506, upon a resin sheet which is a mixture of two or more types of monomer or oligomer capable of photopolymerization and having different indexes of refraction which mutually differ, a material endowed with the function of causing scattering with good efficiency only in a specified wide direction when illuminated from a slanting direction with ultraviolet rays, or, as an on line holographic scattering sheet which is disclosed in Japanese Patent Application, Unexamined First Publication No. 2000-066026, a material made so as to have a layer structure of regions which partially differ in index of refraction by illuminating a laser upon a photosensitive material for use as a hologram, or the like, may appropriately be employed.

Here, the directional frontal scattering film 18 used for this embodiment is a material which is made by adjusting various parameters such as parallel beam transmission ratio or the like in a suitable specified positional relationship to the liquid crystal display device as will be explained hereinafter.

First, it will be supposed that the directional frontal scattering film 18 of rectangular shape in plan view as shown in FIG. 4 is arranged horizontally. It should be understood that, although the horizontal arrangement state is explained in FIG. 4 since the horizontal arrangement state is easy to explain, the direction in which the directional frontal scattering film 18 is arranged is not limited to the horizontal direction, and any direction will be acceptable, with the main point being that the positional relationship (a polar angle $\theta$ and an azimuth angle $\phi$ which will be described hereinafter) of a light source K, a light receiving portion J, and the directional frontal scattering film 18 which will be explained hereinafter can be determined precisely; and that it is preferable for the hue of the diffused transmitted light which is incident upon and passes through the directional frontal scattering film 18 as expressed in the L*a*b* color system to satisfy b*<0. In the explanation of this embodiment, the horizontal direction arrangement of the directional frontal scattering film 18 will be explained, by way of example, as an easily comprehensible direction.

In FIG. 4, the case will be supposed that the incident light L1 is incident from the light source K towards an origin O at the central portion of the directional frontal scattering film 18 at a sloping direction from an area right and diagonally above the directional frontal scattering film 18. And a measurement system will be assumed in which transmitted light which passes directly through the origin O of the directional frontal scattering film 18 is received by the light receiving portion J which is a light sensor or the like.

Here, in order to specify the direction of the incident light L1 upon the directional frontal scattering film 18, coordinates will be hypothesized which, as shown in FIG. 4, pass through the origin O at the central portion and divide the directional frontal scattering film 18 into four equal rectangular shapes by coordinate axes at 0°, 90°, 180° and 270° (or, to put it in other words, the directional frontal scattering film 18 is divided into four equal portions in such a way that the one end of each of the coordinate axes passes through the central point of one of its sides). And the rotational angle of the incident light L1 about the horizontal direction projected vertically upon the surface of this directional frontal scattering film 18 is defined as the azimuth angle $\phi$ (angles turning rightwards from the 0° coordinate axis are considered as + while angles turning leftwards from the 0° coordinate axis are considered as -). Next, the angle subtended with respect to the normal H to the directional frontal scattering film 18 with respect to the direction of the incident light L1 projected horizontally into a vertical plane which contains the coordinate axes 0° and 180° (the plane shown in FIG. 4 by the reference symbol M1) will be defined as the polar angle $\theta$ of the incident light L1. To put it in other words, the polar angle $\theta$ means the angle of incidence of the incident light L1 in a vertical plane with respect to the directional frontal scattering film 18 when the film is arranged horizontally, and the azimuth angle $\phi$ corresponds to the rotational angle within the horizontal plane of the incident light L1.

In this state, when for example the polar angle of the incident light L1 is supposed to be 0° and the azimuth angle is also supposed to be 0°, then the incident light L1 comes to be incident at a right angle upon the directivity frontal film 18 as shown in FIG. 5 (i.e. is incident from the direction of the normal H), and the directional frontal scattering film 18 comes to be in the state shown in FIG. 5 by the reference symbol 18. When the polar angle $\theta$ is supposed to be +60°, then this means that the positional relationship between the light source K, the light receiving portion J, and the directional frontal scattering film 18 comes to be the state in which the directional frontal scattering film 18 is arranged as shown by the reference symbol 18A in FIG. 5. When the polar angle $\theta$ is supposed to be -60°, then this means that the positional relationship between the light source K, the light receiving portion J, and the directional frontal scattering film 18 comes to be the state in which the directional frontal scattering film 18 is arranged as shown by the reference symbol 18B.

Next, when incident light L1 generated from a light source which is arranged upon one side surface (in FIG. 6A, the left side) of the directional frontal scattering film 18 as shown in FIG. 6A passes through the directional frontal scattering film 18 and emerges at the other side surface (in FIG. 6B, the right side) of the directional frontal scattering film 18, it will be supposed that the light which is scattered on the one side surface (the left side) of the directional frontal scattering film 18 will be termed the backward scattered light LR, while the light which passes through the directional frontal scattering film 18 will be termed the forward scattered light. And, with respect to the forward scattered light which has passed through the directional frontal scattering film 18, the proportion which the light intensity of the forward scattered light L3 which proceeds directly in the same direction at an angular error within ±2° with respect to the direction of progression of the incident light L1 bears with respect to the light intensity of the incident light L1 will be defined as the parallel beam transmission ratio. Furthermore, the proportion which the light intensity of the forward scattered light which is diffuse slantingly to the sides at an angle of greater than ±2° bears to the light intensity of the incident light L1 will be defined as the diffusion transmission ratio, while the proportion which the entire amount of the transmitted light bears to the incident light will be defined as the entire light beam transmission ratio. From the above definitions, it is possible to define that the result of subtracting the diffusion transmission ratio from the entire light beam transmission ratio is the parallel beam transmission ratio. In order to make the above explanation even simpler to understand, the relationship between the incident light L1, the azimuth angle φ, and the parallel transmitted light L3 is also shown in FIG. 1.

It should be understood that, although a transmission ratio scale which is termed "haze" is also generally known in the optical field, haze is a value which is expressed as a percentage by dividing the diffusion transmission ratio by the entire light beam transmission ratio, and the parallel beam transmission ratio which is used in this embodiment is a completely different concept.

Next, when expressing the maximum transmission ratio of the parallel beam transmission ratio using the previous polar angle θ and azimuth angle φ, it is defined as being expressed as Tmax (φ1, θ1), and the minimum transmission ratio of the parallel beam transmission ratio is defined as being expressed as Tmin (φ2, θ2). Furthermore, to put it in other words, from the nature of the directional frontal scattering film 18, the condition for exhibiting the maximum transmission ratio is the condition that the scattering is weakest; and the condition for exhibiting the minimum transmission ratio is the condition that the scattering is strongest.

For example, when hypothetically the maximum transmission ratio is exhibited when the polar angle θ=0° and the azimuth angle φ=0°, then this is expressed as Tmax(0, 0). (This means that the parallel beam transmission ratio is maximum along the normal direction to the directional frontal scattering film. To put it in other words, it means that the scattering is weakest along the direction of the normal H to the directional frontal scattering film.) Furthermore, when the minimum transmission ratio is exhibited when the polar angle θ=10° and the azimuth angle φ=45°, then this is expressed as Tmin(10, 45), and this means that in this case the scattering in this direction is the strongest.

Based upon the above definitions, the characteristics of the directional frontal scattering film 18 which are desirable for application to a liquid crystal display device will be explained in the following.

As described above, for the directional frontal scattering film 18, the angle at which the parallel beam transmission ratio exhibits the maximum transmission ratio is the angle at which the scattering is the weakest, and the angle at which it exhibits the minimum transmission ratio is the angle at which the scattering is the strongest.

Accordingly, to put it in other words, for a reflective type liquid crystal display device as shown in FIG. 2 which employs the ambient light as the incident light L1 upon the liquid crystal panel 10, when it is considered that the observer perceives the light reflected from the reflective layer 31 as the reflected light, when, in terms of the coordinate axes of FIG. 4, the incident light enters into the liquid crystal panel 10 from a direction in which the scattering is strong when the light is incident (to put it in other words, a direction in which the parallel beam transmission ratio is low), and when the reflected light is being observed by an observer it is seen from a direction in which the scattering is weak (to put it in other words, a direction in which the parallel beam transmission ratio is high), then it is considered that it is possible to obtain a state in which blurring of the pattern on the display is low. This is a matter based upon the knowledge that has become known to the present inventors, that, although it is difficult for the scattering when the light is incident upon the directional frontal scattering film 18 for the first time to exert influence upon blurring of the pattern which is displayed on the display, nevertheless, when it, as reflected light, passes through the directional frontal scattering film 18 for the second time, the influence of the scattering upon blurring of the pattern on the display is great.

In other words, in this embodiment, for the objective of preventing regular reflection (mirror reflection) from the reflective layer 31 and of making it possible to obtain a clear display over a wide angle of field of view, it is desirable more to scatter the light when the incident light L1 passes through the forward directivity scattering film 18 for the first time (so that the diffused transmitted light is greater). Moreover, this is because it is considered to be desirable in view of the fact that the lower amount of scattering when the light which has been reflected by the reflective layer 31 in the interior of the liquid crystal device passes through the directional frontal scattering film 18 for the second time reduces the blurring of the pattern on the display. Accordingly, as a characteristic for the directional frontal scattering film 18, it is desirable to orient the polar angle and azimuth angle which exhibit the minimum transmission ratio, or, to put it in other words, the polar angle and the azimuth angle direction of the incident light for which the scattering is strongest, towards the light reception side of the liquid crystal panel 10; or, to put it in other words, to orient them towards the opposite side from that of the observer. And it is necessary to orient the polar angle and azimuth angle for which the parallel beam transmission ratio exhibits the maximum transmission ratio, or, to put it in other words, the incident light angle and incidence direction for which the scattering is weakest, towards the side of the observer of the liquid crystal panel 10.

Below, the cross sectional structure of the directional frontal scattering film 18 which is utilized in this embodiment is shown in FIG. 6B, and the state as described above of the polar angle and azimuth angle will be explained.

The cross sectional structure model of the directional frontal scattering film 18 which is utilized in this embodiment, as shown in FIG. 6B, is structured so that portions of index of refraction n1 and portions of index of refraction n2 are arranged alternately in the form of layers in a slanting direction having a predetermined angle with respect to the cross sectional structure of the directional frontal scattering film 18. When it is supposed that incident light L1 having a suitable polar angle is incident from a slanting direction upon the directional frontal scattering film 18 of this structure, then when, along with being scattered at the boundary portions between the various layers which have different indexes of refraction, a portion of the scattered light passes through the liquid crystal layer 15 and is reflected by the reflective layer 31, this reflected light R1 passes through the liquid crystal layer 15 for a second time and attempts to pass through the directional frontal scattering film 18 at a different polar angle from that of the previous incident light L1. The reflected light R1 here is able to pass through the directional frontal scattering film 18 in a state in which the scattering is lower.

And, in order to satisfy this type of relationship, it is most desirable that φ1=φ2±180° as a relationship between the azimuth angles φ1 and φ2. This means that φ2 is adjusted to the incident angle direction and $\phi 1$ is adjusted to the direction of observation, and when applied to an actual liquid crystal device these angles are different from 180°. In this case, a sharp display is obtained with no blurring of the pattern which is displayed on the display, since the light which is incident upon the liquid crystal device is strongly scattered when it is incident, and it is hard for the light which is reflected by the reflective layer 31 to be scattered. However in consideration of the fact that this directional frontal scattering film 18, in which the layers which have different indexes of refraction are arranged alternately in layer form in a slanting direction and have a predetermined angle such as described above, is not absolutely structurally uniform, $\phi 1=\phi 2\pm 180°$ is ideal as a relationship between the azimuth angles $\phi 1$ and $\phi 2$. However, based upon the relationship $\phi 1=\phi 2\pm 180°$, it will be presumed that cases up to a deviation of approximately ±10° from these angles still fall within the ambit of the present invention. It becomes difficult to obtain a sharp display with no blurring of the pattern on the display with structures in which the deviation from these angles exceeds ±10°.

Next, it is desirable for the value of the above (Tmax/Tmin) to satisfy the relationship (Tmax/Tmin)≧2. By satisfying this relationship, sufficient scattering is obtained upon incidence, and a bright and sharp reflection display is obtained. Furthermore, by this relationship being satisfied, it is possible to implement a clearer reflective display than in the case of utilizing an isotropic scattering film such as is known from the prior art.

Furthermore, that the relationship (Tmax/Tmin)≧2 being satisfied is particularly effective as means for ensuring that when the light from the light source K is incident upon the directional frontal scattering film 18 from the polar angle and azimuth angle direction which yield the minimum transmission ratio, the hue of the diffused transmitted light LT which has passed through it as expressed in the L*a*b* color system satisfies b*<0, and for ensuring that the hue of the parallel transmitted light L3 as expressed in the L*a*b* color system satisfies b*>0 (so that it is tinged with a yellow tinge). Satisfying the relationship (Tmax/Tmin)≧4, which is more desirable, enables the hue of the diffused transmitted light LT to satisfy b*<0, and is desirable from the point of view of making it possible further to enhance the display quality.

After the diffused transmitted light LT (of a bluish white color) whose hue satisfies b*<0 in this manner has been reflected by the reflective layer 28 within the liquid crystal panel which presents a yellow color (i.e., its hue as expressed in the L*a*b* color system satisfies b*>0), also is tinged with a bluish white color (i.e., its hue satisfies b*<0). Due to this, when the display is observed with reflected light L2 of this bluish white color (whose hue satisfies b*<0), the hues go into a cancelled state, and a display with no tinting (achromatic colour) is obtained, so that a sharp display is obtained, and it is possible to enhance the display quality.

Furthermore, the fact that the hue of the diffused transmitted light LT as expressed in the L*a*b* color system satisfies −6<b*<0 is desirable from the points of view of obtaining a display with no tinting (achromatic colour) and of making it possible to enhance the display quality. In order to make the diffused transmitted light LT exhibit this type of characteristic, it will be acceptable to ensure that the hue of the parallel transmitted light L3 satisfies the relationship 10≦b*.

Furthermore, the fact that the hue of the diffused transmitted light LT as expressed in the L*a*b* color system satisfies −10<a*<10 is desirable from the point of view of obtaining a display with no tinting (achromatic colour) and of making it possible to enhance the display quality.

Next, to consider each of the polar angles $\theta 1$ and $\theta 2$, in order to obtain a clearer display than with an isotropic scattering film, ranges of $-40°\leq\theta 1<0$ and $0°<\theta 2\leq 40°$ are desirable; and ranges of $-30°\leq\theta 1\leq -10°$ and $10°\leq\theta 2\leq 30°$ are more desirable.

Next, when the parallel beam transmission ratio in the normal direction to the directional frontal scattering film 18 (directly in front thereof) is defined as T(0, 0), then, in order to obtain a clearer display than with an isotropic scattering film such as is known from the prior art, in the case of $\theta 1=\theta 2=20°$, it is desirable for T(0, 0) to be greater than or equal to 3% and to be less than or equal to 50%. Furthermore, it is more desirable for T(0, 0) to be greater than or equal to 5% and to be less than or equal to 40%. When T(0, 0) falls below 3% then the scattering is too strong and the pattern on the display becomes blurred, while when T(0, 0) exceeds 40% then the frontal scattering is too weak and the situation becomes close to mirror reflection.

Next, when a range of azimuth angle $\phi$ of the directional frontal scattering film 18 of ($\phi 1 \pm 60°$ ($\phi 2 \pm 60°$) is specified, it is desirable for the absolute maximum (maximum) of the parallel beam transmission ratio to be always attained at $\theta 1$ and the absolute minimum value (minimum value) of the parallel beam transmission ratio to be always attained at $\theta 2$, and also for the ratio between the absolute maximum value (maximum value) and the absolute minimum value (minimum value) to be greater than or equal to 1.5. When these characteristic are satisfied, since it is possible to scatter the light, not only in a single direction of $\phi 2$ but also up to an azimuth angle of ±60°, thereby it becomes easy to cope with various environments, and it is possible to implement a clear display.

Next, when the polar angle $\theta$ of the direction which is orthogonal to the azimuth angle $\phi 1$ which gives the maximum transmission ratio and to the azimuth angle $\phi 2$ which gives the minimum transmission ratio is varied from −40° to +40°, when over this range the parallel beam transmission ratio is equal to or is greater than the transmission ratio in the normal direction of the directional frontal scattering film, then it is possible to obtain a sharp display with no blurring of the pattern on the display, even when the liquid crystal device is observed from a sidewise direction. In other words, it is desirable for it to be arranged to satisfy the relationship T(0, 0)≦T($\phi 1\pm 90$, $\theta$), and to satisfy the relationship T(0, 0)≦T($\phi 2\pm 90$, $\theta$).

Next, in the range of polar angle of $-60°\leq\theta\leq +60°$, it is desirable for the parallel beam transmission ratio T($\phi$, $\theta$) to be greater than or equal to 2%, and to be less than or equal to 50%. In other words, it is desirable for the relationship 2%≦T($\phi$, $\theta$)≦50% to be satisfied, provided that $-60°\leq\theta\leq +60°$.

By establishing this type of relationship, it is possible to obtain a sharp display which is bright and which has no blurring of the pattern on the display.

Sixth Embodiment of the Liquid Crystal Device

FIG. 7 is a partial sectional view of the liquid crystal panel 40 of the sixth embodiment of the liquid crystal device according to the present invention.

The liquid crystal panel 40 of this embodiment is one of a simple matrix structure of the reflective type, which comprises a directional frontal scattering film 18 the same as the liquid crystal panel 10 of the previously described fifth embodiment which was explained based upon FIG. 1 through FIG. 3 above. Since the basic structure is the same as the fifth embodiment, the same reference symbols will be affixed to the same structural elements and the explanation of those structural elements will be curtailed, and in the following principally the differing structural elements will be explained.

The liquid crystal panel 40 of this embodiment is made up by sandwiching a liquid crystal layer 15 which is surrounded by a seal member 12 between a base plate unit 41 and a base plate unit 42 which are opposed to one another. In the upper side base plate unit 41, since the color filter layer 20 in the base plate unit 13 of the previously described fifth embodiment has been curtailed, a color filter layer 20 is layered over the reflective layer 31 of the lower side base plate unit 42 on the opposite side, and thus the structure of this portion differs from the structure of the previously described fifth embodiment. In other words, the liquid crystal panel 40 shown in FIG. 7 is structured with the color filter layer 20, which in the previously described fifth embodiment was provided on the base plate unit 13 side on the upper side (the observer side), being provided on the base plate unit 42 side on the lower side (the opposite side to the observer side) of the liquid crystal layer 15. Although the structure of the color filter layer 20 is the same as the structure of the fifth embodiment, since the color filter layer 20 is formed upon the upper surface side of the base plate 28, accordingly the up and down direction of the lamination structure of the color filter layer 20 is reversed with respect to the state of FIG. 3.

In the structure of this sixth embodiment as well, since the directional frontal scattering film 18 is provided identically to the structure of the previously described fifth embodiment, it is possible to obtain the identical beneficial results to the structure of the previously described fifth embodiment, with relation to blurring of the pattern which is displayed on the reflective display.

Furthermore, with the liquid crystal device 40 shown in FIG. 7, there is the particular characteristic that it is difficult for any problem of color deviation to occur, since the color filter layer 20 is formed directly over the reflective layer 31, and since the light which is incident upon the liquid crystal device 40 arrives at the reflective layer 31 via the liquid crystal layer 15, and passes through the color filter 32 directly after being reflected.

In this embodiment the reflective layer 31 is in the mirror (specular surface) state, but it will be no problem when it has minute convexities and concavities of approximately 1 to 20 μm.

Seventh Embodiment of the Liquid Crystal Device

In FIG. 8 there is shown a partial sectional view of the liquid crystal panel 50 of the seventh embodiment of the liquid crystal device according to the present invention.

The liquid crystal panel 40 of this embodiment is one of a simple matrix structure of the semi-transparent reflective type which comprises a base plate unit 55 which is provided with a semi-transparent reflective layer 52, instead of the reflective layer 31 which was provided to the liquid crystal panel 10 of the previously described fifth embodiment which was explained based upon FIG. 1 through FIG. 3; and, with regard to its other basic structures, to portions which are identical to ones of the fifth embodiment the same reference symbols will be affixed and the explanation of those structural elements will be curtailed, and in the following principally the differing structural elements will be explained.

The features in which the structure of this liquid crystal panel 50 differs from that of the fifth embodiment, are: that the semi-transparent reflective layer 52 is provided; furthermore, that a light source 60 such as a back light or the like is provided at the back side (the lower side in FIG. 8) of the liquid crystal panel 50; and that a phase difference plate 56 and a polarization plate 57 are provided.

It should be understood that, in the case of use for a transparent type liquid crystal device, it is necessary for the base plate 28' on the lower side to be made from a transparent base plate such as glass or the like.

For the semi-transparent reflective layer 52, it is possible to employ an appropriate one such as is widely used in semi-transparent reflective type liquid crystal display devices, such as a semi-transparent reflective layer of sufficient thickness for allowing the passage of the transmitted light which is generated by the light source 60 such as a back light or the like on the back side (the lower side in FIG. 8), or a structure whose optical transparency is enhanced by the formation of a large number of minute through holes in a portion of the reflective layer, or the like.

With this liquid crystal device of the seventh embodiment, it operates as a liquid crystal display of a transparent type when transmitted light from the light source 60 such as a back light or the like is employed; while, when light from the light source is not employed, it can be employed as a reflective type liquid crystal display device by using ambient light to perform reflective display. And, when this display is employed as a reflective type liquid crystal display device, in the same manner as in the case of the previously described first embodiment, due to the existence of the directional frontal scattering film 18, it is possible to obtain a display of a sharp reflective type in which blurring of the pattern on the display is eliminated.

Although, in the explanation of the fifth, sixth, and seven embodiments up until this point, applications of the present invention to reflective type liquid crystal display devices of the simple matrix type have been explained by way of example, it should be noted that, of course, it would also be acceptable to apply the present invention to a reflective type liquid crystal display device, or a semi-transparent reflective type liquid crystal display device, of an active matrix type comprising a two terminal type switching element or a three terminal type switching element.

When the present invention is applied to those active matrix type liquid crystal display devices, instead of the stripe form electrodes shown in FIGS. 2, 7, and 8, of course it could be applied to a liquid crystal display device which is made as a TFT (thin film transistor) drive type in which a common electrode is provided on the side of one of the base plates, and a large number of pixel electrodes are provided on the side of the other base plate for each pixel, and which is driven by thin film transistors for each of the pixel electrodes which are three terminal type switching elements; or to one which is made as a two terminal type linear element drive type in which electrodes in stripe form are provided on the side of one of the base plates, and a pixel electrode for each pixel is provided on the side of the other base plate, and which is driven by thin film diodes for each of these pixel electrodes which are two terminal type linear elements. For either of these types of liquid crystal display device, the present invention has the distinguishing feature that it can extremely easily be applied to any one of the embodiments of the liquid crystal display device, since it can be applied only by arranging the directivity the scattering film, which has been manufactured so that the hue as expressed in the L*a*b* color system of the diffused light which has been transmitted satisfies the condition b*<0, upon the liquid crystal panel in the above described specified direction so that the incident light is incident upon the directional frontal scattering film from the polar angle and azimuth angle direction which exhibit the minimum transmission ratio.

TEST EXAMPLE 7

Measurement tests were performed using a directional frontal scattering film manufactured by a transparent type hologram technique.

Light from a halogen lamp light source (disposed at a position separated by 300 mm from the directional frontal scattering film) was illuminated upon the central portion of the surface of a directional frontal scattering film of 50 mm×40 mm rectangular form in plan view arranged horizontally, and a light receiving portion (disposed at a position separated by 300 mm from the directional frontal scattering film) which had a light receiving element made from CCDs was set up upon the rear surface side of the directional frontal scattering film in various directions which were squarely opposed with respect to the incident light from the light source. The polar angle and azimuth angle of the light source were regulated as shown in FIG. 4, and the parallel beam transmission ratio at an angular error within ±2° was measured by the light receiving portion. The polar angle θ of the light source (the angle of incidence of the incident light with respect to the normal to the frontal scattering film) was adjusted within a range of ±60°, and the results of measuring the parallel beam transmission ratio (in %) for each polar angle are shown in FIG. 10. Furthermore, with regard to the azimuth angle, the data were also measured for each of 0°, +30°, +60°, +90°, and +180° (which are all the rightwards rotational direction as shown in FIG. 4) and for each of −30°, −60°, −90°, and −180° (which are all the leftwards rotational direction as shown in FIG. 4), and these are shown all together in FIG. 10.

From the results shown in FIG. 10, the measurement results in the cases of 0° and +180° give exactly the same curve, and the relationship between the maximum transmission ratio Tmax and the minimum transmission ratio Tmin of the parallel transmitted light becomes (Tmax/Tmin) ≈50:6≈8.33, thus yielding a value which exceeds the value of 2 which is desired for the present invention.

Next, the results of performing the same measurement tests of transmission ratio using a different directional frontal scattering film which was made by a transparent type hologram technique are shown in FIG. 11. Furthermore, the results of performing the same measurement tests of transmission ratio using a directional frontal scattering film which was made by a different transparent type hologram technique are shown in FIG. 12.

When the characteristic shown in FIG. 11 is considered, the relationship between the maximum transmission ratio Tmax and the minimum transmission ratio Tmin of the parallel transmitted light becomes (Tmax/Tmin)≈12:3≈4, thus yielding a value which exceeds the value of 2 which is desired for the present invention.

When the characteristic shown in FIG. 12 is considered, the relationship between the maximum transmission ratio Tmax and the minimum transmission ratio Tmin of the parallel transmitted light becomes (Tmax/Tmin)≈52:26≈2, thus yielding the value of 2 which is desired for the present invention.

Furthermore, with any one of the directional frontal scattering films shown by way of example in FIG. 10, FIG. 11, and FIG. 12, in the range of ±60, it was clear that, the maximum, and minimum numerical values were at almost the same angle. For example, in the results shown in FIG. 10, the absolute maximum value was at the polar angle of −30° and the absolute minimum value was at the polar angle of +23°. In FIG. 11, the absolute maximum value was at the polar angle of −20° and the absolute minimum value was at the polar angle of +18°. In FIG. 12, the absolute maximum value was at the polar angle of −30° and the absolute minimum value was at the polar angle of +25°.

Next, for the directional frontal scattering films shown by way of example in FIG. 10, FIG. 11, and FIG. 12, when φ was ±90°, in any of the examples, it was ascertained that the transmission ratio was the lowest for the polar angle θ of 0, to put it in another way, it was ascertained that the scattering upon incidence was the strongest (the amount of diffused transmitted light was the greatest). Furthermore, for the directional frontal scattering films shown by way of example in FIG. 10, FIG. 11, and FIG. 12, it was also clear that for the transmission ratio in all conditions, it was always within the range of 2% to 50%.

Next, the transmission ratio of the directional frontal scattering film was measured while varying the azimuth angle φ while keeping the polar angle θ fixed, or to put it in other words, while rotating only the directional frontal scattering film in the horizontal plane, and the results are shown in FIG. 13.

According to the results shown in FIG. 13, although the state for the condition θ=0° in which the light was incident in the normal direction to the directional frontal scattering film is shown, almost the same transmission ratio was exhibited, while in the case of θ=−20°, −40°, and −60°, over the range 0±90° of azimuth angle, the transmission ratio followed a curve which was convex to the upper side and attained a maximum. Furthermore, in the case of θ=+20°, +40°, and +60°, over the range 0±90° of azimuth angle, the transmission ratio showed a tendency to follow a curve which was convex to the lower side (convex to the upper side) and attained a minimum. From this fact it is vividly shown that the directional frontal scattering film which was used in this embodiment exhibited maxima and minima of transmission ratio, according to polar angle and azimuth angle.

It should be understood that, when analyzing the transmission ratio relationships shown in FIG. 13, for negative polar angles θ (−20°, −40°, and −60°), within azimuth angle φ=±30°, in other words, in the range φ=−30° to +30°, the maximum value of the transmission ratio was constrained to vary within 5%, while for positive polar angles θ (+20°, +40°, and +60°), within azimuth angle φ=±30°, in other words, in the range φ=−30° to +30°, the minimum value of the transmission ratio was constrained to vary within 5%.

FIG. 14 is a figure showing the results of measurement of the relationship between polar angle and transmission ratio, for each azimuth angle, in tests of a liquid crystal device which was manufactured using a prior art isotropic frontal scattering film (product name IDS-16K, made by Dainippon Printing Co. Ltd.). In these tests, a liquid crystal device the same as in the previously described first test example was utilized, and these are the results of measurements obtained by changing the anisotropic frontal scattering film for an isotropic scattering film which is in current use.

From the results shown in FIG. 14, it is clear that almost no variation was seen in the transmission ratio of the parallel transmitted light for any azimuth angle, and that, along with almost overlapping into a single curve, it attained its maximum when the polar angle was 0°, and only varied by approximately a few percent even when the polar angle was varied through the + region or through the − region. From these results, it is clear that the beneficial results of the present invention were not obtained even when an isotropic frontal scattering film was used in the liquid crystal device.

TEST EXAMPLE 8

Next, the brightness of a reflective type color liquid crystal display device which utilized a directional frontal scattering film (which satisfied the relationship (Tmax/Tmin)≈12:3≈4) in an office under lighting by fluorescent lamps was compared, as the polar angle θ1 and the polar angle θ2 of the previously described test were varied. For this brightness, comparison was made with a reflective type color liquid crystal display device which employed an isotropic frontal scattering film according to the prior art (the reflective type color liquid crystal display device employing an isotropic scattering film which was used for the measurements shown in the previously described FIG. 14), and those which could be perceived as brighter than the reflective type color liquid crystal display device according to the prior art are shown in the following Table 6 by "○", those which were the same by "Δ", and those which were darker by "X".

and more desirably is 5%≦T(0, 0)≦40%, then it is possible to provide a reflective type color liquid crystal display device which is clearer than the prior art in an environment of actual use.

Next, from the results shown in FIG. 10, FIG. 11, and FIG. 12, it is also clear that, when the azimuth angles φ of the directional frontal scattering film are regulated to be in the ranges of φ1 ±60° and moreover φ2 ±60°, then a maximum of the parallel beam transparency (or, to put it in another way, a minimum of the diffusion transmission ratio) is always exhibited for θ1, while a minimum of the parallel beam transmission ratio (or, to put it in another way, a maximum of the diffusion transmission ratio) is always exhibited for θ2.

TABLE 6

| θ1 (°) | −80 | −70 | −60 | −50 | −40 | −30 | −20 | −10 | 0 |
|---|---|---|---|---|---|---|---|---|---|
| θ2 (°) | 0 | 0 | 0 | 0 | 0 | 0 | 0 | 0 | 0 |
| Results of Evaluation | x | x | x | x | x | Δ | Δ | Δ | x |
| θ1 (°) | −80 | −70 | −60 | −50 | −40 | −30 | −20 | −10 | 0 |
| θ2 (°) | 10 | 10 | 10 | 10 | 10 | 10 | 10 | 10 | 10 |
| Results of Evaluation | x | x | x | x | Δ | ○ | ○ | ○ | x |
| θ1 (°) | −80 | −70 | −60 | −50 | −40 | −30 | −20 | −10 | 0 |
| θ2 (°) | 20 | 20 | 20 | 20 | 20 | 20 | 20 | 20 | 20 |
| Results of Evaluation | x | x | x | x | Δ | ○ | ○ | ○ | x |
| θ1 (°) | −80 | −70 | −60 | −50 | −40 | −30 | −20 | −10 | 0 |
| θ2 (°) | 30 | 30 | 30 | 30 | 30 | 30 | 30 | 30 | 30 |
| Results of Evaluation | x | x | x | x | Δ | ○ | ○ | ○ | x |
| θ1 (°) | −80 | −70 | −60 | −50 | −40 | −30 | −20 | −10 | 0 |
| θ2 (°) | 40 | 40 | 40 | 40 | 40 | 40 | 40 | 40 | 20 |
| Results of Evaluation | x | x | x | x | x | Δ | Δ | Δ | x |

As is clear from the results of measurement shown in Table 6, it will be understood that, when the polar angle when the parallel transmitted light attains its maximum (the diffused transmitted light attains its minimum) is within the range of −40°≦θ1≦0° and the polar angle when the parallel transmitted light attains its minimum (the diffused transmitted light attains its maximum) is within the range of 0°≦θ2≦40°, then it is possible to ensure brightness of approximately the same as the prior art; while, when they are within the range of −30°≦θ1≦0° and the range 0°≦θ2≦30°, then a liquid crystal display device is obtained which is superior in brightness over the prior art.

TEST EXAMPLE 9

Directional frontal scattering films were prepared by varying the parallel beam transmission ratio T(0, 0) in the normal direction to the directional frontal scattering film over various values, and the brightness of liquid crystal display devices which was equipped with these directional frontal scattering films were compared in an office under lighting by fluorescent lamps. The prior art product with which comparison was performed was the same as the one used in the previously described test example. The cases which could be perceived as brighter than the reflective type color liquid crystal display device according to the prior art are shown in the following Table 7 by "○", those which were the same by "Δ", and those which were darker by "X".

TABLE 7

| T (0, 0) | 3% | 5% | 10% | 20% | 30% | 40% | 50% | 60% |
|---|---|---|---|---|---|---|---|---|
| Results of Evaluation | Δ | ○ | ○ | ○ | ○ | ○ | Δ | x |

As is clear from the results of measurement shown in Table 7, it is clear that, when the range is 3%≦T(0, 0)≦60%,

TEST EXAMPLE 10

Next, a large number of directional frontal scattering films manufactured by a transparent type hologram technique were prepared, and the results of comparing the brightnesses of the reflective type color display devices when the value of (Tmax/Tmin) was adjusted to various values with a liquid crystal display device according to the previously described prior art are given in the following Table 8. The cases which could be perceived as twice as bright or more as compared with the reflective type color liquid crystal display device which used an isotropic scattering film according to the prior art are shown in the following Table 8 by "⊚", those which were perceived as brighter than the prior art product by "○", those which were the same by "Δ", and those which were darker by "X".

TABLE 8

| Tmax/Tmin | 10 | 5 | 3 | 2 | 1.8 | 1.5 | 1 |
|---|---|---|---|---|---|---|---|
| Results of Evaluation | ⊚ | ⊚ | ⊚ | ⊚ | ○ | Δ | Δ |

From the results shown in Table 8, it is clear that particularly bright viewing was possible when the ratio between the absolute minimum value and the absolute maximum value of the parallel beam transmission ratio explained previously was greater than or equal to 2.

TEST EXAMPLE 11

With the azimuth angle when the parallel beam transmission ratio attained its minimum value (or, to put it in another way, the diffusion transmission ratio attained its maximum value) and when the parallel beam transmission ratio attained its maximum value (or, to put it in another way, the diffusion transmission ratio attained its minimum value) being taken to be φ2 and φ1, the ratio between the absolute maximum value and the absolute minimum value of the transmitted light characteristic which was measured by varying the polar angle θ was measured in the ranges φ2 ±60° and (φ1 ±60°. The brightness of the reflective type color liquid crystal display devices was compared in an office under lighting by fluorescent lamps while varying this ratio. The prior art product with which comparison was performed was the same as the one used in the previously described test examples. The cases which could be perceived as brighter than the reflective type color liquid crystal display device according to the prior art are shown in the following Table 9 by "○", those which were the same by "Δ", and those which were darker by "X".

TABLE 9

| absolute maximum value/ absolute minimum value | 5 | 3.5 | 2 | 1.5 | 1.2 | 1 |
|---|---|---|---|---|---|---|
| Results of Evaluation | ○ | ○ | ○ | ○ | Δ | Δ |

From the results shown in Table 9, it is clear that it is desirable for the absolute maximum value/the absolute minimum value to be greater than or equal to 1.5. In other words it is also clear that, when the azimuth angles φ of the directional frontal scattering film are regulated in the ranges of (φ1 ±60° and moreover φ2 ±60°, then the ratio between the absolute minimum value and the absolute maximum value of the parallel beam transmission ratio is greater than or equal to 1.5.

TEST EXAMPLE 12

When, for the directional frontal scattering film, the polar angle θ was taken as −60°≦θ≦+60°, the brightness of the reflective type color liquid crystal display device was compared in an office under lighting by fluorescent lamps while varying the maximum value and the minimum value of the parallel beam transmission ratio T. The prior art product with which comparison was performed was the same as the one used in the previously described test examples. The cases which could be perceived as brighter than the reflective type color liquid crystal display device according to the prior art which utilized an isotropic frontal scattering film are shown in the following Table 10 by "○", those which were the same by "Δ", and those which were darker by "X".

TABLE 10

| maximum transmission ratio Tmax | 60% | 50% | 40% | 30% | 20% | 10% |
|---|---|---|---|---|---|---|
| minimum transmission ratio Tmin | 1% | 1% | 1% | 1% | 1% | 1% |
| Results of Evaluation | x | x | Δ | Δ | Δ | x |
| maximum transmission ratio Tmax | 60% | 50% | 40% | 30% | 20% | 10% |
| minimum transmission ratio Tmin | 2% | 2% | 2% | 2% | 2% | 2% |
| Results of Evaluation | x | ○ | ○ | ○ | ○ | ○ |
| maximum transmission ratio Tmax | 60% | 50% | 40% | 30% | 20% | 10% |
| minimum transmission ratio Tmin | 5% | 5% | 5% | 5% | 5% | 5% |
| Results of Evaluation | Δ | ○ | ○ | ○ | ○ | ○ |
| maximum transmission ratio Tmax | 60% | 50% | 40% | 30% | 20% | 10% |
| minimum transmission ratio Tmin | 10% | 10% | 10% | 10% | 10% | 10% |
| Results of Evaluation | Δ | ○ | ○ | ○ | ○ | Δ |
| maximum transmission ratio Tmax | 60% | 50% | 40% | 30% | 20% | 10% |
| minimum transmission ratio Tmin | 20% | 20% | 20% | 20% | 20% | 20% |
| Results of Evaluation | x | ○ | ○ | Δ | Δ | x |
| maximum transmission ratio Tmax | 60% | 50% | 40% | 30% | 20% | 10% |
| minimum transmission ratio Tmin | 30% | 30% | 30% | 30% | 30% | 30% |
| Results of Evaluation | x | Δ | Δ | x | x | x |
| maximum transmission ratio Tmax | 60% | 50% | 40% | 30% | 20% | 10% |
| minimum transmission ratio Tmin | 40% | 40% | 40% | 40% | 40% | 40% |
| Results of Evaluation | x | x | x | x | x | x |

From the results shown in Table 10, it will be understood that it is necessary for the maximum value/the minimum value to satisfy ≧2, and for the transmission ratio to be greater than or equal to 2% and less than or equal to 50%.

TEST EXAMPLE 13

The reflectance spectral characteristics were investigated using a directional frontal scattering film which exhibits a characteristic as shown in FIG. 11 (the relationship between the maximum transmission ratio Tmax and the minimum transmission ratio Tmin satisfies (Tmax/Tmin)≈12:3≈4).

Figure 15:
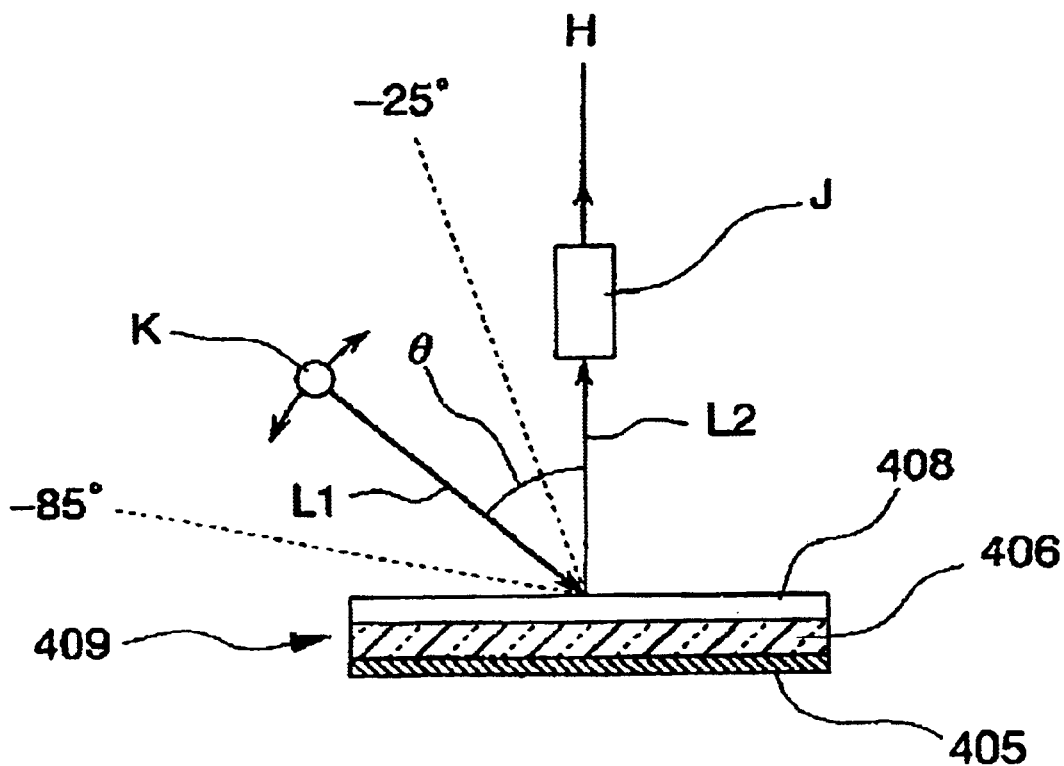
FIG. 15 is an explanatory figure showing a method for measuring the reflectance spectral characteristic of a test sample.
Figure 16:
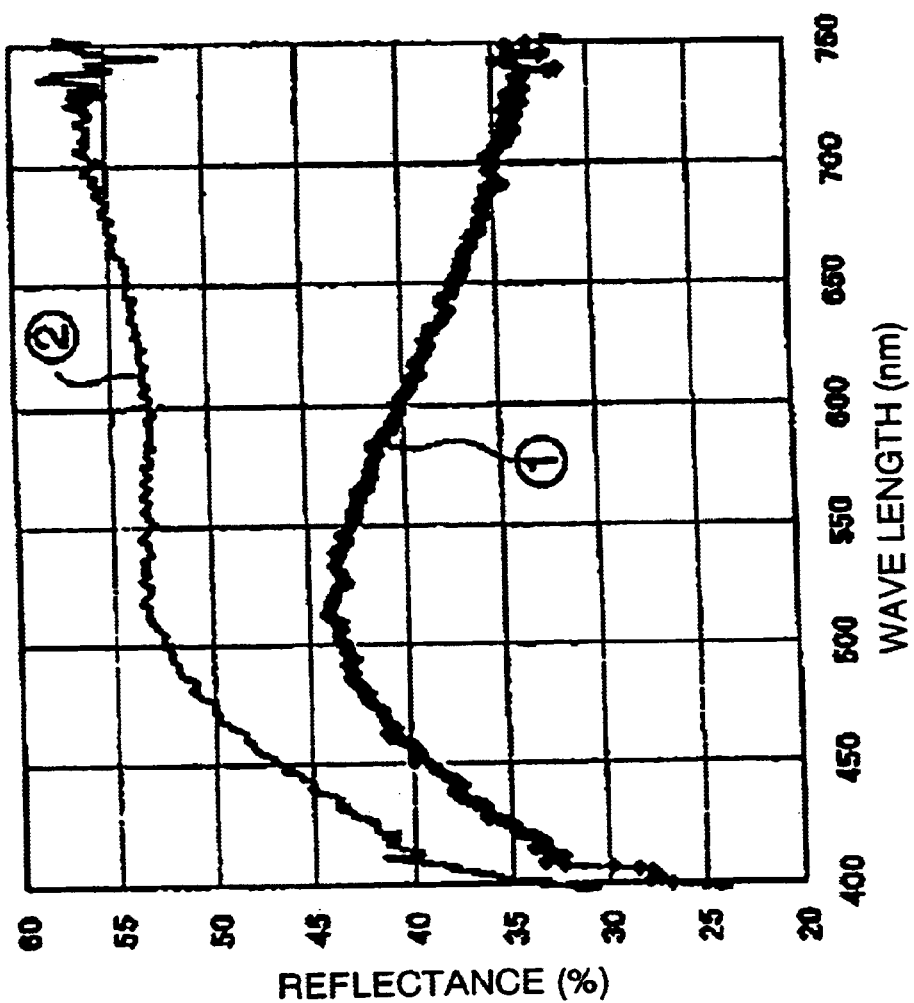
FIG. 16 is a figure showing the reflectance spectral characteristic when the incident light is incident at an angle of −30° and the reflected light reception angle is 0°, for an embodiment and for a comparison example.

For the reflectance spectral characteristic here, as shown in FIG. 15: a laminated body 409, in which a directional frontal scattering film 408 (the directional frontal scattering film of the embodiments) which exhibited the characteristic and which was of rectangular form in plan view and was of dimension (50×40) mm was provided upon the upper surface of a glass base plate 406 which was provided upon its lower surface with an Al reflective layer 405, was arranged horizontally; light from a (halogen) lamp light source K which was disposed on its side on the surface of which was provided the directional frontal scattering film 408 (and was arranged at a position separated by 300 mm from the directional frontal scattering film) was illuminated upon the central portion of the surface of the directional frontal scattering film 408 at a polar angle θ=−30° and an azimuth angle φ=−90°; the reflected light which passed through this directivity film 408 and the glass base plate 406 and was reflected from the reflective layer 405 was received at a reception angle of 0° (a polar angle θ=0 and an azimuth angle φ=0°) by a light receiving portion J (arranged at a position which was separated from the directional frontal scattering film by 300 mm in the normal direction to the directional frontal scattering film) comprising a light reception element made from a CCD which was arranged at the side of the central portion of the frontal scattering film; and then the relationship between the wavelength of the reflected light L2 which was received by this light receiving portion and the intensity of reflection was investigated using a spectroscope. The results thereof are shown in FIG. 16. In FIG. 16, ① is the reflectance spectral characteristic of such a laminate provided with the directional frontal scattering firm of the embodiment.

Furthermore, for the sake of comparison, the relationship between wavelength and reflection intensity were investigated using a spectroscope when light from the light source K was illuminated by the same method as before upon a laminated body to which was provided an isotropic frontal scattering film according to the prior art, instead of the directional frontal scattering film. The results are shown in FIG. 16 as well. In FIG. 16, ② is the reflectance spectral characteristic of such a laminate provided with the isotropic frontal scattering firm of the comparison example.

From FIG. 16 it will be understood that, for the laminate which used the isotropic frontal scattering film according to the prior art, the peak of the reflection intensity was to the long wavelength side and exceeded 650 nm, and that the reflected light was tinged with a yellow color or an orange color (i.e., as expressed in the L*a*b* color system, its hue satisfied b*>0). By contrast to this, for the laminate which used the directional frontal scattering film of the embodiment, it will be understood that the peak of the reflection intensity was to the short wavelength side in the vicinity of 500 nm, and that the reflected light in the normal direction was tinged with a blue color (i.e., as expressed in the L*a*b* color system, its hue satisfied b*<0).

TEST EXAMPLE 14

The reflectance spectral characteristics were investigated using a large number of directional frontal scattering films which exhibited a characteristic as shown in FIG. 11 (the relationship between the maximum transmission ratio Tmax and the minimum transmission ratio Tmin satisfied (Tmax/Tmin)≈12:3≈4).

For the reflectance spectral characteristic here, using the same device as shown in FIG. 15: a laminated body 409, in which a directional frontal scattering film 408 (the directional frontal scattering film of the embodiment) which exhibited the characteristic and which was of rectangular form in plan view and was of dimension (50×40) mm was provided upon the upper surface of a glass base plate 406, was arranged horizontally (it should be understood that no Al reflective layer was provided upon the lower surface of the laminated body which was used here); light from a (halogen) lamp light source K which was disposed on its side on the surface of which was provided the directional frontal scattering film 408 (and which was arranged at a position separated by 300 mm from the directional frontal scattering film) was illuminated upon the central portion of the surface of the directional frontal scattering film 408 at a polar angle θ=−30° and an azimuth angle φ=−90°; the parallel transmitted light which passed through this directivity film 408 and the glass base plate 406 was received by a light receiving portion J (arranged at a position which was separated from the directional frontal scattering film by 300 mm in the normal direction to the directional frontal scattering film) comprising a light reception element made from a CCD which was arranged on the rear surface side of the directional frontal scattering film at the squarely opposed direction with respect to the incident light L1 from the light source K; and then the relationship between the wavelength of the parallel transmitted light L2 which was received by this light receiving portion and its intensity of transmission was investigated using a spectroscope. The results thereof are shown in FIG. 17.

Figure 17:
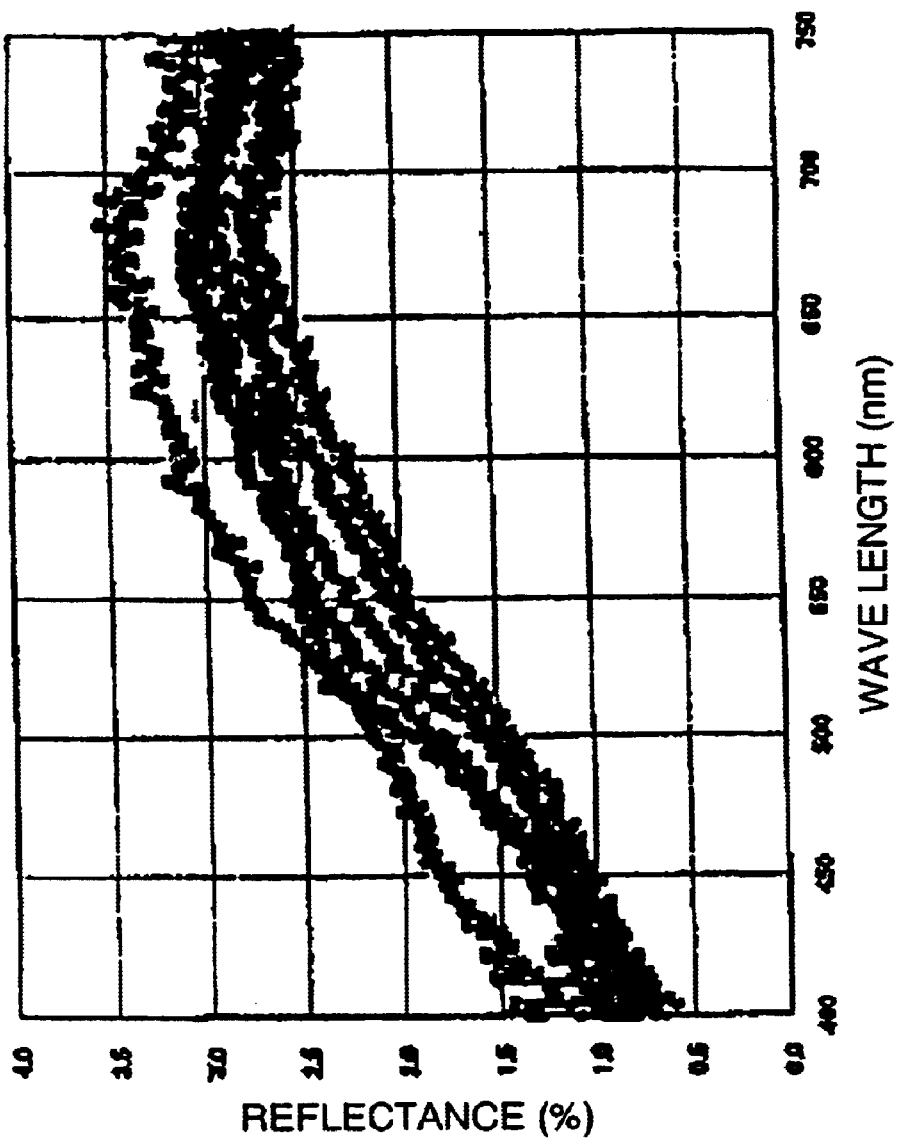
FIG. 17 is a figure showing, for an embodiment, the transmission spectral characteristic for the parallel transmitted light when the incident light is incident at an angle of −30°.

From FIG. 17 it will be understood that, for the laminates which used the directional frontal scattering film according to the embodiment, in each case, the peak of the parallel transmitted light was to the long wavelength side and exceeded 650 nm, and that the parallel transmitted light was tinged with a yellow color or an orange color. When there was a reflective layer, the parallel transmitted light was regular reflected, so that it will be understood that the regular reflection light was tinged with a yellow color or an orange color. Since normally, when observing the liquid crystal display device, the observer observes the display from a direction deviated from the regular reflection direction, therefore it is considered that, when it is arranged for the display to be observed with reflected light which is tinged with a blue color in the direction deviated from the regular reflection direction, then the display will not be seen as being tinged with a yellowish cast, so that it will be possible to enhance the quality of the display.

TEST EXAMPLE 15

Using a large number of directional frontal scattering films which exhibited a characteristic as shown in FIG. 11 (the relationship between the maximum transmission ratio Tmax and the minimum transmission ratio Tmin satisfied (Tmax/Tmin)≈12:3≈4), the hues were measured.

For the measurement of hues here, using the same device as shown in FIG. 15: a laminated body 409, in which a directional frontal scattering film 408 (the directional frontal scattering film of the embodiments) which exhibited the characteristic and which was of rectangular form in plan view and was of dimension (50×40) mm was provided upon the upper surface of a glass base plate 406 which had an Al reflective layer on its lower surface, was arranged horizontally; light from a (halogen) lamp light source K which was disposed on its side on the surface of which was provided the directional frontal scattering film 408 (and which was arranged at a position separated by 300 mm from the directional frontal scattering film) was illuminated upon the central portion of the surface of the directional frontal scattering film 408 at a polar angle θ=−25° and an azimuth angle φ=−90°; the parallel transmitted light which passed through the directivity film 408 and the glass base plate 406 and was reflected by the reflective layer 405 was received by a light receiving portion J (arranged at a position which was separated from the directional frontal scattering film by 300 mm in the normal direction to the directional frontal scattering film) comprising a light reception element made from a CCD which was arranged on the surface side of the directional frontal scattering film at a reception angle of from 0° to 60° (a polar angle θ=from 0° to 60° and an azimuth angle φ=90°); then the relationship between the angle of reception of the reflected light which was received by this light receiving portion and its hue (its hue as expressed in the L*a*b* color system) was investigated. The results thereof are shown in FIG. 18.

Figure 18:
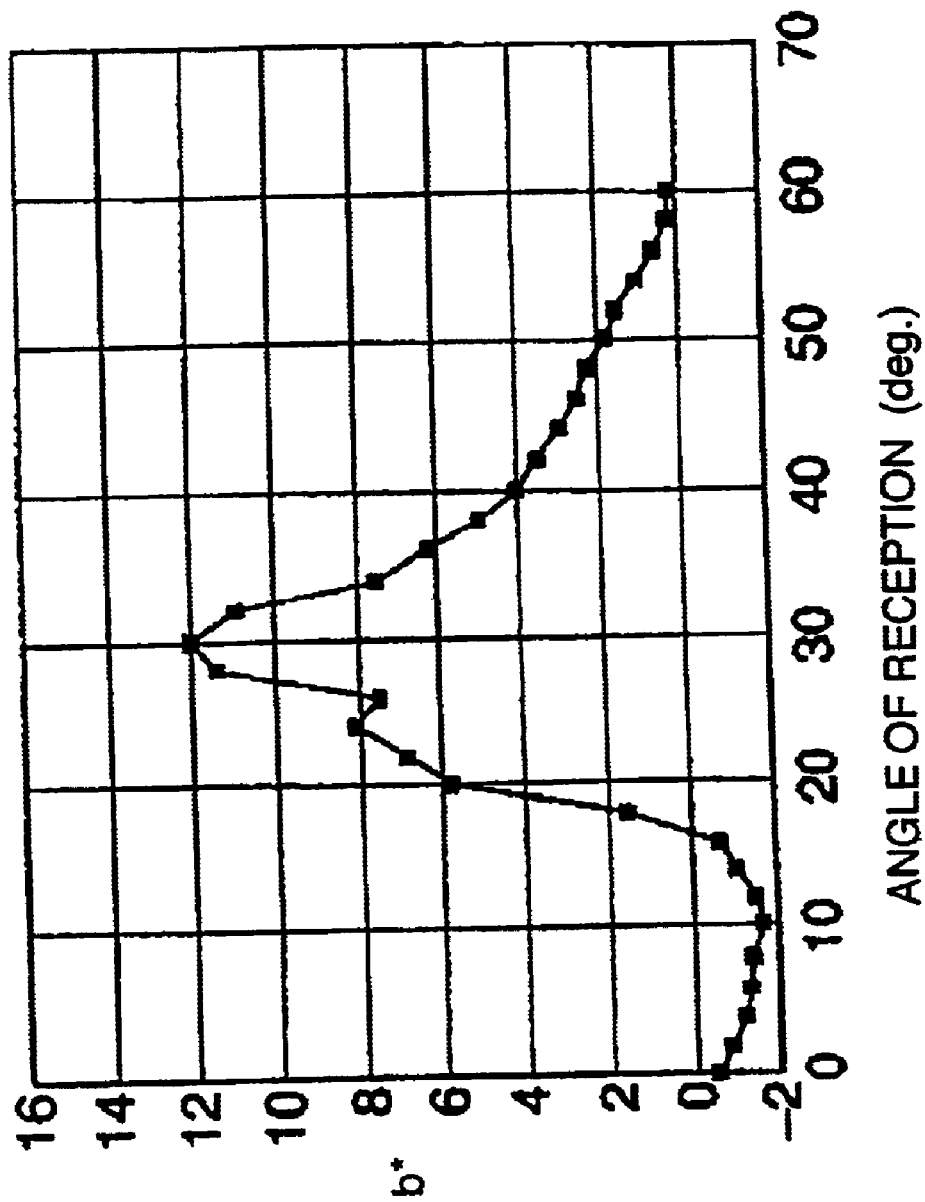
FIG. 18 is a figure showing, for an embodiment, the relationship between the reflected light reception angle and the hue when the incident light is incident at an angle of −25°.

From FIG. 18 it will be understood that, for the laminates which used the directional frontal scattering film according to the embodiment, in each case, the hue of the reflected light in the vicinity of the regular reflection direction of 25° satisfied b*>6, and that in particular the hue of the reflected light in the range of reception angle from 20° to 40° satisfied b*>4, so that it was tinged with a yellowish cast. By contrast to this, it will be understood that the hue of the reflected light in the range of reception angle from 0° to 17°, in each case, satisfied b*<0. Since normally, when observing the liquid crystal display device, the observer observes the display from a direction deviated from the regular reflection direction, therefore it is considered that, when it is arranged for the display to be observed with reflected light which is tinged with a blue color in a direction deviated from the regular reflection direction, and particularly in the normal direction (at a reception angle from 0° to 17°), then the display will not be seen as being tinged with a yellowish cast, so that it will be possible to enhance the quality of the display.

TEST EXAMPLE 16

A large number of directional frontal scattering films which exhibited a characteristic as shown in FIG. 11 (the relationship between the maximum transmission ratio Tmax and the minimum transmission ratio Tmin satisfied (Tmax/Tmin)≈12:3≈4) were prepared, and the hues were measured.

For the measurement of hues here, using the same device as shown in FIG. 15: a laminated body 409, in which a directional frontal scattering film 408 (the directional frontal scattering film of the embodiment) which exhibited the characteristic and which was of rectangular form in plan view and was of dimension (50×40) mm was provided upon the upper surface of a glass base plate 406 which had an Al reflective layer 405 on its lower surface, was arranged horizontally; light from a (halogen) lamp light source K which was disposed on its side on the surface of which was provided the directional frontal scattering film 408 (and which was arranged at a position separated by 300 mm from the directional frontal scattering film) was illuminated upon the central portion of the surface of the directional frontal scattering film 408 at a polar angle θ=−30° and an azimuth angle φ=−90°; the parallel transmitted light which passed through this directivity film 408 and the glass base plate 406 and was reflected by the reflective layer 405 was received by a light receiving portion J (arranged at a position which was separated from the directional frontal scattering film by 300 mm in the normal direction to the directional frontal scattering film) comprising a light reception element made from a CCD which was arranged on the central surface portion side of the directional frontal scattering film at a reception angle of 0° (a polar angle θ=0° and an azimuth angle φ=0°); and then the relationship between the hues of the reflected light L2 which was received by this light receiving portion (its hue as expressed in the L*a*b* color system) was investigated. The results thereof are shown in FIG. 19.

Furthermore, a large number of liquid crystal panels identical to the one of FIG. 2 except that no directional frontal scattering films were provided to them were prepared, and their hues were measured by the same method as the above. The results thereof are also shown in FIG. 19.

Figure 19:
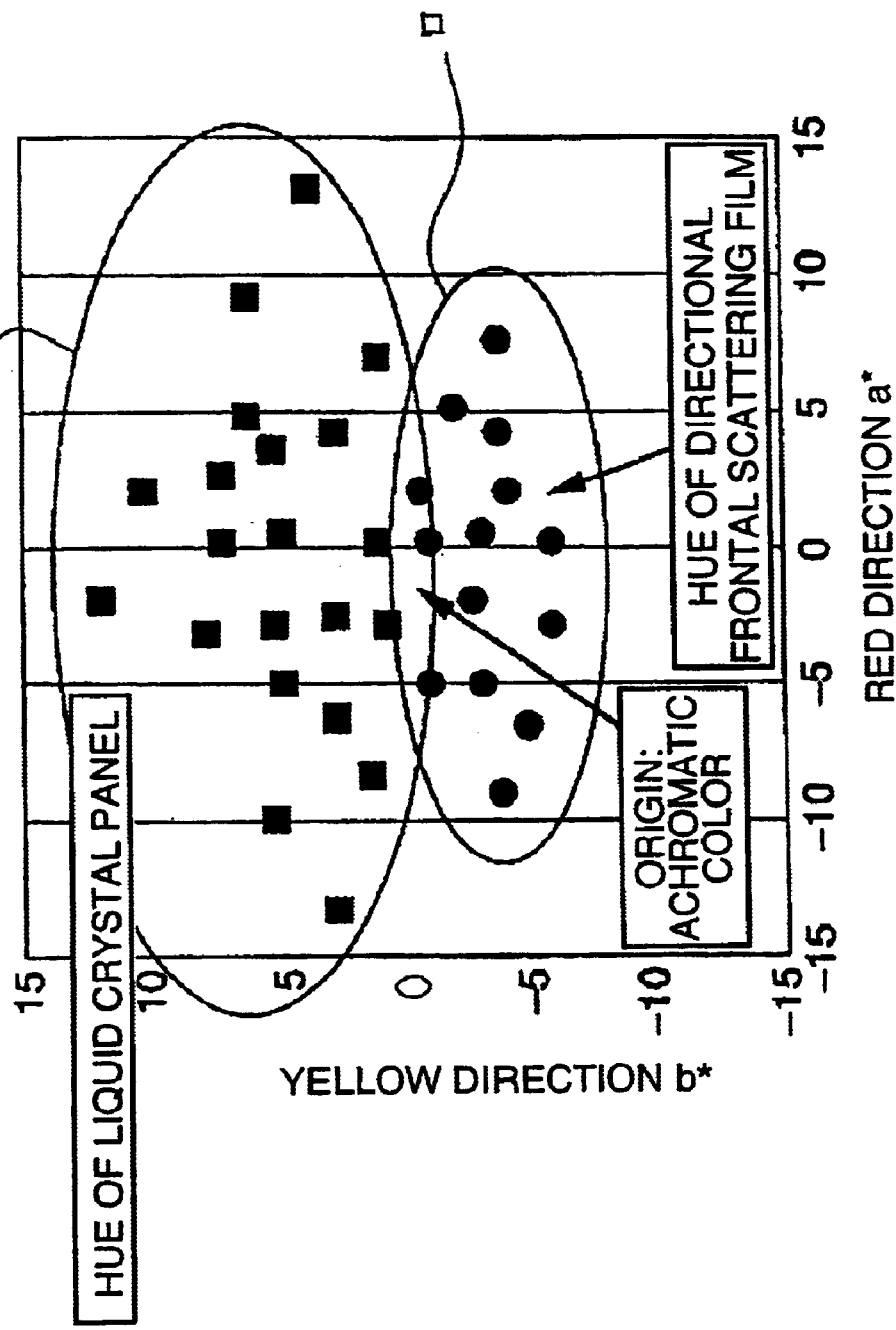
FIG. 19 is a figure showing, for an embodiment, the reflected light of a directional frontal scattering film and the hue of a liquid crystal panel.

From FIG. 19 it will be understood the hue of the liquid crystal panels, in each case, satisfied b*>0, and was tinged with a yellow color. Furthermore, it will be understood that the hue of the reflected light of the directional frontal scattering film of the embodiment, in every case, satisfied b*<0 and was tinged with a bluish cast, and in particular, it was a hue within the ranges of −6<b*<0 and −10<a*<10. Accordingly, when a directional frontal scattering film of this type of embodiment is provided to a liquid crystal panel, then, since the diffused transmitted light which is incident upon this directional frontal scattering film and passes through it and whose hue satisfies b*<0 as expressed in the L*a*b* color display system is strongly scattered upon incidence so that the diffused transmitted light exhibits a bluish color, therefore the diffused transmitted light of this type of bluish color (its hue satisfies b*<0) is tinged with a bluish white color (its hue satisfies b*<0), even after it is reflected by the reflective layer in the interior of the liquid crystal panel which presents a yellow color (its hue satisfies b*>0 as expressed in the L*a*b* color system). Due to this, when the display is observed by this bluish reflected light (whose hue satisfies b*<0), the hue comes to be in the vicinity of the origin (both a* and b* are in the vicinity of 0), or, to put it in another way, the state becomes that in which the hues cancel one another, and the display does not appear to be tinged, and accordingly it is possible to obtain a sharp display, and to enhance the quality of the display.

Furthermore, when it is arranged that the incident light side in the case of the polar angle and the azimuth angle which yield the maximum transmission ratio when arranging the directional frontal scattering film upon the liquid crystal display panel (i.e., in the case of the angles for which the diffused transmitted light is the weakest) is on the light reception side of the liquid crystal panel, and the incident light side in the case of the polar angle and the azimuth angle which yield the minimum transmission ratio when arranging the directional frontal scattering film upon the liquid crystal display panel (i.e., in the case of the angles for which the diffused transmitted light is the strongest) is on the observation direction side of the liquid crystal panel, then the amount of diffused transmitted light whose hue satisfies b*<0 becomes great, and the influence upon blurring of the pattern which is displayed on the display and upon tinting of the display is small, so that a sharp display is obtained which has little blurring or tinting of the display.

Eighth Embodiment of the Liquid Crystal Device

The eighth embodiment of the liquid crystal device according to the present invention will be described below with reference to FIGS. 1 through 3. FIG. 1 is a plan view showing this embodiment in which the present invention is applied to a reflective type liquid crystal panel of a simple matrix type; FIG. 2 is a partial sectional schematic view taken along the lines A—A of the liquid crystal panel shown in FIG. 1; and FIG. 3 is an enlarged sectional view of a color filter portion housed in the liquid crystal panel. As a finished product, a liquid crystal display device (liquid crystal device) is constituted by peripheral equipment such as an IC for liquid crystal driving, a support member and the like being fitted to the liquid crystal panel 10 of this embodiment.

The liquid crystal panel 10 of this embodiment comprises as main elements a pair of base plate units 13 and 14 which are rectangular in plan view and which are adhered together so as mutually to oppose one another with a cell gap being opened between them via a seal member 12 which is roughly rectangular in plan view and moreover is annular, a liquid crystal layer 15 which is sandwiched between these and is also surrounded by the seal member 12, and a directional frontal scattering film 18, a phase difference plate 19, and a polarization plate 16, which are provided upon the upper surface side of one of the base plate units 13 (in FIG. 2, the upper side one). Among the base plate units 13 and 14, the base plate unit 13 is that base plate unit on the display side (the upper side) which is provided to face towards the side of the observer, while the base plate unit 14 is the base plate unit on the opposite side, or to put it in other words, is provided on the rear side (the lower side).

The base plate unit 13 on the upper side comprises: a base plate 17 which is made of a transparent material such as for example glass or the like; a directional frontal scattering film 18, a phase difference plate 19 and a polarization plate 16 provided in that order upon the display side (the upper surface side in FIG. 2, i.e. the observer side) of the base plate 17; and a color filter layer 20, an overcoat layer 21, and a plurality of electrode layers 23 formed upon the liquid crystal layer 15 side of the surface of the overcoat layer 21 in stripe form for driving the liquid crystal, formed in that order upon the rear side (in other words, the liquid crystal layer 15 side) of the base plate 17.

The liquid crystal layer 15 is made from nematic liquid crystal molecules whose twist angle θt is from 240° to 255°.

Moreover, in an actual liquid crystal device, orientation films are formed as coatings upon the liquid crystal layer 15 side of the electrode layers 23, and upon the liquid crystal layer 15 side of stripe form electrode layers 35 upon the lower base plate side as will be more explained hereinafter. However, these orientation films are omitted from FIG. 2 and explanation thereof is also omitted; and in the other embodiments explained below in order, such orientation films are also omitted from the explanation and from the drawings. Furthermore, in the illustrations of the cross sectional structure of the liquid crystal devices given in FIG. 2 and the various subsequent figures, the thickness of the various layers is shown as adjusted to make them easier to see in the drawings, and they are different from those in an actual liquid crystal device.

The electrode layers 23 for driving on the side of the upper base plate are formed in a stripe form in plan view from, in this embodiment, a transparent electroconductive material such as ITO (Indium Tin Oxide) or the like, and they are formed in the required number of lines to correspond to the number of display regions and of pixels of the liquid crystal panel 10.

In this embodiment, the color filter layer 20 is formed by forming a black mask 26 for light interception and RGB patterns 27 for color display upon the lower surface of the upper side base plate 17 (or, to put it in other words, on its surface towards the liquid crystal layer 15), as shown enlarged in FIG. 3. Furthermore, an overcoat layer 21 is coated as a transparent protective planarizing film which protects the RGB pattern 27.

The black mask 26 is formed, for example by a spattering method or a vacuum vapor deposition method, as a patterned metallic thin film of chrome or the like of approximately 100 to 200 nm in thickness. In the RGB patterns 27, a red color pattern (R), a green color pattern (G), and a blue color pattern (B) are formed so as to be aligned in a desired pattern arrangement by one of various methods such as, for example, a pigment scattering method using photosensitive resin which includes a specified coloring material, or various printing methods, electrodeposition methods, transcription methods, dyeing methods, or the like.

On the other hand, the base plate unit 14 on the lower side comprises a base plate 28 which is made from a transparent material such as glass or the like or from some other non transparent material, and, formed in order upon the surface side of the base plate 28 (the upper surface side in FIG. 2, or to put it in other words, the side of the liquid crystal layer 15), a reflective layer 31, an overcoat layer 33, and a plurality of electrode layers 35 for driving of stripe form which are formed upon the surface of the overcoat layer 33 towards the liquid crystal layer 15. These electrode layers 35, just like the previous electrode layers 23, are formed in the required number of lines to correspond to the number of display regions and of pixels of the liquid crystal panel 10.

Next, the reflective layer 31 of this embodiment is made of a light reflective and moreover electroconductive metallic material such as Ag or Al or the like, and it is formed upon the base plate 28 by a vapor deposition method or a spattering method or the like. However, it is not essential for the reflective layer 31 to be made from an electroconductive material, and it makes no difference when a structure is utilized in which an electrode layer for driving made of an electroconductive material different from the reflective layer 31 is provided, so that the reflective layer 31 and the drive electrodes are provided separately.

Next, the details of the above described directional frontal scattering film 18 which is attached to the base plate unit 13 on the upper side will be explained in the following.

As the directional frontal scattering film 18 which is utilized in this embodiment, from the point of view of its basic structure, a frontal scattering film endowed with directivity such as disclosed in Japanese Patent Application, Unexamined First Publication Nos. 2000-035506, 2000-066026, or 2000-180607 or the like may appropriately be employed. For example, as disclosed in Japanese Patent Application, Unexamined First Publication No. 2000-035506, upon a resin sheet which is a mixture of two or more types of monomer or oligomer capable of photopolymerization and having different indexes of refraction which mutually differ, a material endowed with the function of causing scattering with good efficiency only in a specified wide direction when illuminated from a slanting direction with ultraviolet rays, or, as an on line holographic scattering sheet which is disclosed in Japanese Patent Application, Unexamined First Publication No. 2000-066026, a material made so as to have a layer structure of regions which partially differ in index of refraction by illuminating a laser upon a photosensitive material for use as a hologram, or the like, may appropriately be employed.

Here, the directional frontal scattering film 18 used for this embodiment is a material which is made by adjusting various parameters such as parallel beam transmission ratio or the like in a suitable specified positional relationship to the liquid crystal display device as will be explained hereinafter.

First, it will be supposed that the directional frontal scattering film 18 of rectangular shape in plan view as shown in FIG. 4 is arranged horizontally. It should be understood that the horizontal arrangement state is explained in FIG. 4 since the horizontal arrangement state is easy to explain. However, the direction in which the directional frontal scattering film 18 is arranged is not limited to the horizontal direction, and any direction will be acceptable, provided: that the positional relationship (a polar angle θ and an azimuth angle φ which will be described hereinafter) which will be explained hereinafter of a light source K, a light receiving portion J, and the directional frontal scattering film 18 is able to be determined precisely; that it is possible for the azimuth angle φ2 direction for which the parallel transmitted light exhibits the minimum transmission ratio (the diffused transmitted light exhibits the maximum transmission ratio) and the long axis direction of the nematic liquid crystal molecules which are located at the central portion of the liquid crystal layer 15 to be aligned; and that the azimuth angle φ2 direction for which the parallel transmitted light exhibits the minimum transmission ratio (the diffused transmitted light exhibits the maximum transmission ratio) and the in-plane direction in which the contrast of the liquid crystal panel is high for incident light for which the incident light angle is from 10° to 30° with respect to the polar angle direction, to match one another. In the explanation of this embodiment, the horizontal direction arrangement of the directional frontal scattering film 18 will be explained, by way of example, as an easily comprehensible direction.

In FIG. 4, the case will be supposed that the incident light L1 is incident from the light source K towards an origin O at the central portion of the directional frontal scattering film 18 at a sloping direction from an area right and diagonally above the directional frontal scattering film 18. And a measurement system will be assumed in which transmitted light which passes directly through the origin O of the directional frontal scattering film 18 is received by the light receiving portion J which is a light sensor or the like.

Here, in order to specify the direction of the incident light L1 upon the directional frontal scattering film 18, coordinates will be hypothesized which, as shown in FIG. 4, pass through the origin O at the central portion and divide the directional frontal scattering film 18 into four equal rectangular shapes by coordinate axes at 0°, 90°, 180° and 270° (or, to put it in other words, the directional frontal scattering film 18 is divided into four equal portions in such a way that the one end of each of the coordinate axes passes through the central point of one of its sides). And the rotational angle of the incident light L1 about the horizontal direction projected vertically upon the surface of this directional frontal scattering film 18 is defined as the azimuth angle φ (angles turning rightwards from the 0° coordinate axis are considered as + while angles turning leftwards from the 0° coordinate axis are considered as −). Next, the angle subtended with respect to the normal H to the directional frontal scattering film 18 with respect to the direction of the incident light L1 projected horizontally into a vertical plane which contains the coordinate axes 0° and 180° (the plane shown in FIG. 4 by the reference symbol M1) will be defined as the polar angle θ of the incident light L1. To put it in other words, the polar angle θ means the angle of incidence of the incident light L1 in a vertical plane with respect to the directional frontal scattering film 18 when the film is arranged horizontally, and the azimuth angle φ corresponds to the rotational angle within the horizontal plane of the incident light L1.

In this state, when for example the polar angle of the incident light L1 is supposed to be 0° and the azimuth angle is also supposed to be 0°, then the incident light L1 comes to be incident at a right angle upon the directivity frontal film 18 as shown in FIG. 5 (i.e. is incident from the direction of the normal H), and the directional frontal scattering film 18 comes to be in the state shown in FIG. 5 by the reference symbol 18. When the polar angle θ is supposed to be +60°, then this means that the positional relationship between the light source K, the light receiving portion J, and the directional frontal scattering film 18 comes to be the state in which the directional frontal scattering film 18 is arranged as shown by the reference symbol 18A in FIG. 5 When the polar angle θ is supposed to be −60°, then this means that the positional relationship between the light source K, the light receiving portion J, and the directional frontal scattering film 18 comes to be the state in which the directional frontal scattering film 18 is arranged as shown by the reference symbol 18B.

Next, when incident light L1 generated from a light source which is arranged upon one side surface (in FIG. 6A, the left side) of the directional frontal scattering film 18 as shown in FIG. 6A passes through the directional frontal scattering film 18 and emerges at the other side surface (in FIG. 6B, the right side) of the directional frontal scattering film 18, it will be supposed that the light which is scattered on the one side surface (the left side) of the directional frontal scattering film 18 will be termed the backward scattered light LR, while the light which passes through the directional frontal scattering film 18 will be termed the forward scattered light. And, with respect to the forward scattered light which has passed through the directional frontal scattering film 18, the proportion which the light intensity of the forward scattered light L3 which proceeds directly in the same direction at an angular error within ±2° with respect to the direction of progression of the incident light L1 bears with respect to the light intensity of the incident light L1 will be defined as the parallel beam transmission ratio. Furthermore, the proportion which the light intensity of the forward scattered light which is diffuse slantingly to the sides at an angle of greater than ±2° bears to the light intensity of the incident light L1 will be defined as the diffusion transmission ratio, while the proportion which the entire amount of the transmitted light bears to the incident light will be defined as the entire light beam transmission ratio. From the above definitions, it is possible to define that the result of subtracting the diffusion transmission ratio from the entire light beam transmission ratio is the parallel beam transmission ratio. In order to make the above explanation even simpler to understand, the relationship between the incident light L1, the azimuth angle φ, and the parallel transmitted light L3 is also shown in FIG. 1.

It should be understood that, although a transmission ratio scale which is termed "haze" is also generally known in the optical field, haze is a value which is expressed as a percentage by dividing the diffusion transmission ratio by the entire light beam transmission ratio, and the parallel beam transmission ratio which is used in this embodiment is a completely different concept.

Next, when expressing the maximum transmission ratio of the parallel beam transmission ratio using the previous polar angle θ and azimuth angle φ, it is defined as being expressed as Tmax (φ1, θ1), and the minimum transmission ratio of the parallel beam transmission ratio is defined as being expressed as Tmin (φ2, θ2). Furthermore, to put it in other words, from the nature of the directional frontal scattering film 18, the condition for exhibiting the maximum transmission ratio is the condition that the scattering is weakest; and the condition for exhibiting the minimum transmission ratio is the condition that the scattering is strongest.

For example, when hypothetically the maximum transmission ratio is exhibited when the polar angle θ=0° and the azimuth angle φ=0°, then this is expressed as Tmax(0, 0). (This means that the parallel beam transmission ratio is maximum along the normal direction to the directional frontal scattering film. To put it in other words, it means that the scattering is weakest along the direction of the normal H to the directional frontal scattering film.) Furthermore, when the minimum transmission ratio is exhibited when the polar angle θ=10° and the azimuth angle φ=45°, then this is expressed as Tmin(10, 45), and this means that in this case the scattering in this direction is the strongest.

Based upon the above definitions, the characteristics of the directional frontal scattering film 18 which are desirable for application to a liquid crystal display device will be explained in the following.

As described above, for the directional frontal scattering film 18, the angle at which the parallel beam transmission ratio exhibits the maximum transmission ratio is the angle at which the scattering is the weakest, and the angle at which it exhibits the minimum transmission ratio is the angle at which the scattering is the strongest.

Accordingly, to put it in other words, for a reflective type liquid crystal display device as shown in FIG. 2 which employs the ambient light as the incident light L1 upon the liquid crystal panel 10, when it is considered that the observer perceives the light reflected from the reflective layer 31 as the reflected light, when, in terms of the coordinate axes of FIG. 4, the incident light enters into the liquid crystal panel 10 from a direction in which the scattering is strong when the light is incident (to put it in other words, a direction in which the parallel beam transmission ratio is low), and when the reflected light is being observed by an observer it is seen from a direction in which the scattering is weak (to put it in other words, a direction in which the parallel beam transmission ratio is high), then it is considered that it is possible to obtain a state in which blurring of the pattern which is displayed on the display is low. This is a matter based upon the knowledge that has become known to the present inventors, that, although it is difficult for the scattering when the light is incident upon the directional frontal scattering film 18 for the first time to exert influence upon blurring of the pattern which is displayed on the display, nevertheless, when it, as reflected light, passes through the directional frontal scattering film 18 for the second time, the influence of the scattering upon blurring of the pattern which is displayed on the display is great.

In other words, in this embodiment, for the objective of preventing regular reflection (mirror reflection) from the reflective layer 31 and of making it possible to obtain a clear display over a wide angle of field of view, it is desirable more to scatter the light when the incident light L1 passes through the forward directivity scattering film 18 for the first time (so that the diffused transmitted light is greater). Moreover, this is because it is considered to be desirable in view of the fact that the lower amount of scattering when the light which has been reflected by the reflective layer 31 in the interior of the liquid crystal device passes through the directional frontal scattering film 18 for the second time reduces the blurring of the pattern which is displayed on the display. Accordingly, as a characteristic for the directional frontal scattering film 18, it is desirable to orient the polar angle and azimuth angle which exhibit the minimum transmission ratio, or to put it in other words, the polar angle and the azimuth angle direction of the incident light for which the scattering is strongest, towards the light reception side of the liquid crystal panel 10; or, to put it in other words, to orient them towards the opposite side from that of the observer. And it is necessary to orient the polar angle and azimuth angle for which the parallel beam transmission ratio exhibits the maximum transmission ratio, or, to put it in other words, the incident light angle and incidence direction for which the scattering is weakest, towards the side of the observer of the liquid crystal panel 10.

Below, the cross sectional structure of the directional frontal scattering film 18 which is utilized in this embodiment is shown in FIG. 6B, and the state as described above of the polar angle and azimuth angle will be explained.

The cross sectional structure model of the directional frontal scattering film 18 which is utilized in this embodiment, as shown in FIG. 6B, is structured so that portions of index of refraction n1 and portions of index of refraction n2 are arranged alternately in the form of layers in a slanting direction having a predetermined angle with respect to the cross sectional structure of the directional frontal scattering film 18. When it is supposed that incident light L1 having a suitable polar angle is incident from a slanting direction upon the directional frontal scattering film 18 of this structure, then when, along with being scattered at the boundary portions between the various layers which have different indexes of refraction, a portion of the scattered light passes through the liquid crystal layer 15 and is reflected by the reflective layer 31, this reflected light R1 passes through the liquid crystal layer 15 for a second time and attempts to pass through the directional frontal scattering film 18 at a different polar angle from that of the previous incident light L1. The reflected light R1 here is able to pass through the directional frontal scattering film 18 in a state in which the scattering is lower.

And, in order to satisfy this type of relationship, it is most desirable that $\phi1=\phi2\pm180°$ as a relationship between the azimuth angles $\phi1$ and $\phi2$. This means that $\phi2$ is adjusted to the incident angle direction and $\phi1$ is adjusted to the direction of observation, and when applied to an actual liquid crystal device these angles are different from 180°. In this case, a sharp display is obtained with no blurring of the pattern which is displayed on the display, since the light which is incident upon the liquid crystal device is strongly scattered when it is incident, and it is hard for the light which is reflected by the reflective layer 31 to be scattered. However in consideration of the fact that this directional frontal scattering film 18, in which the layers which have different indexes of refraction are arranged alternately in layer form in a slanting direction and have a predetermined angle such as described above, is not absolutely structurally uniform, $\phi1=\phi2\pm180°$ is ideal as a relationship between the azimuth angles $\phi1$ and $\phi2$. However, based upon the relationship $\phi1=\phi2\pm180°$, it will be presumed that cases up to a deviation of approximately $\pm10°$ from these angles still fall within the ambit of the present invention. It becomes difficult to obtain a sharp display with no blurring of the pattern on the display with structures in which the deviation from these angles exceeds $\pm10°$.

Next, it is desirable for the value of the above (Tmax/Tmin) to satisfy the relationship (Tmax/Tmin)$\geq$2. By satisfying this relationship, sufficient scattering is obtained upon incidence, and a bright and sharp reflection display is obtained. Furthermore, by this relationship being satisfied, it is possible to implement a clearer reflective display than in the case of utilizing an isotropic scattering film such as is known from the prior art.

Next, to consider each of the polar angles $\theta1$ and $\theta2$, in order to obtain a clearer display than with an isotropic scattering film, ranges of $-40°\leq\theta1<0°$ and $0°<\theta2\leq40°$ are desirable; and ranges of $-30°\leq\theta1>-10°$ and $10°\leq\theta2\leq30°$ are more desirable.

Next, when the parallel beam transmission ratio in the normal direction to the directional frontal scattering film 18 (directly in front thereof) is defined as T(0, 0), then, in order to obtain a clearer display than with an isotropic scattering film such as is known from the prior art, in the case of $\theta1=-20, \theta2=20°$, it is desirable for T(0, 0) to be greater than or equal to 3% and to be less than or equal to 50%. Furthermore, it is more desirable for T(0, 0) to be greater than or equal to 5% and to be less than or equal to 40%. When T(0, 0) falls below 3% then the scattering is too strong and the pattern on the display becomes blurred, while when T(0, 0) exceeds 40% then the frontal scattering is too weak and the situation becomes close to mirror reflection.

Next, when a range of azimuth angle $\phi$ of the directional frontal scattering film 18 of ($\phi1 \pm60°$ ($\phi2 \pm60°$) is specified, it is desirable for the absolute maximum (maximum) of the parallel beam transmission ratio to be always attained at $\theta1$ and the absolute minimum value (minimum value) of the parallel beam transmission ratio to be always attained at $\theta2$, and also for the ratio between the absolute maximum value (maximum value) and the absolute minimum value (minimum value) to be greater than or equal to 1.5. When these characteristic are satisfied, since it is possible to scatter the light, not only in a single direction of p2 but also up to an azimuth angle of $\pm60°$, thereby it becomes easy to cope with various environments, and it is possible to implement a clear display.

Next, when the polar angle $\theta$ of the direction which is orthogonal to the azimuth angle $\phi1$ which gives the maximum transmission ratio and to the azimuth angle $\phi2$ which gives the minimum transmission ratio is varied from $-40°$ to $+40°$, when over this range the parallel beam transmission ratio is equal to or is greater than the transmission ratio in the normal direction of the directional frontal scattering film, then it is possible to obtain a sharp display with no blurring of the pattern on the display, even when the liquid crystal device is observed from a sidewise direction. In other words, it is desirable for it to be arranged to satisfy the relationship T(0, 0)$\leq$T($\phi1\pm90$, $\theta0$), and to satisfy the relationship T(0, 0)$\leq$T($\phi2\pm90$, $\theta$).

Next, in the range of polar angle of $-60°\leq\theta\leq+60°$, it is desirable for the parallel beam transmission ratio T($\phi$, $\theta$) to be greater than or equal to 2%, and to be less than or equal to 50%. In other words, it is desirable for the relationship 2%$\leq$T($\phi$, $\theta$)$\leq$50% to be satisfied, provided that $-60°\leq\theta\leq+$ 60°. By establishing this type of relationship, it is possible to obtain a sharp display which is bright and which has no blurring of the pattern on the display.

Figure 20:
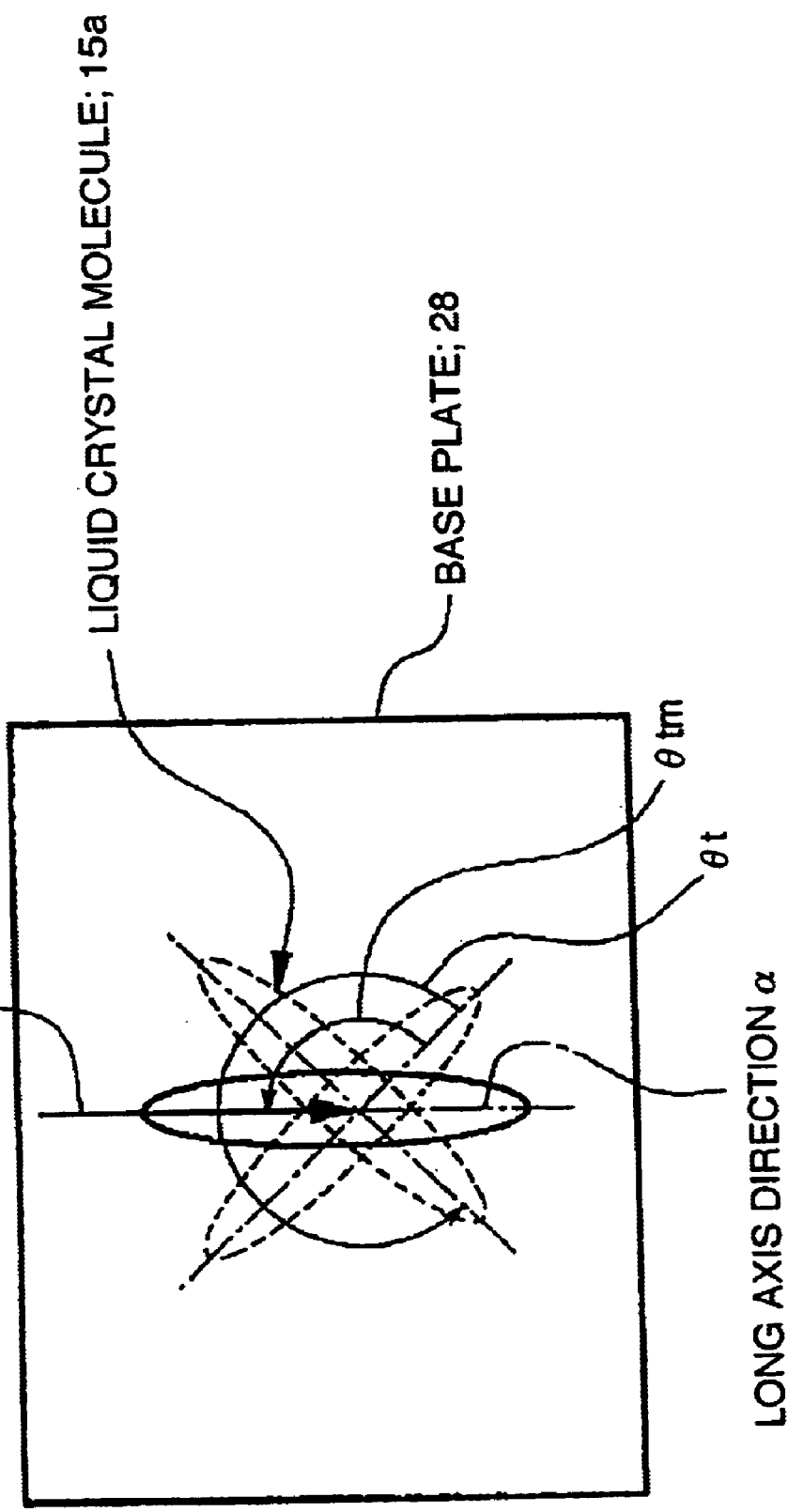
FIG. 20 is an explanatory figure of the positional relationship between the direction of an azimuth angle $\phi 2$ at which the parallel transmitted light which has passed through a directional frontal scattering film exhibits the minimum transmission ratio and the long axis direction $\alpha$ of the liquid crystal molecules when a STN cell is not electrified.

Moreover, as shown in FIG. 20, the directional frontal scattering film 18 is arranged so that the direction of the azimuth angle φ2 at which the parallel transmitted light L3 which has passed through the directional frontal scattering film 18 exhibits the minimum transmission ratio (the diffused transmitted light LT exhibits the maximum transmission ratio), and the long axis direction α of the nematic liquid crystal molecules 15a which are positioned at the central portion in the thickness direction of the liquid crystal layer 15 when there is no electric field between the base plates 17 and 28 (i.e. when the voltage applied to them has been canceled), match one another. Since these liquid crystal molecules 15a are ones whose twist angle is from 240° to 255° as has been described above, for the nematic liquid crystal molecules 15a which are positioned at the central portion in the thickness direction of the liquid crystal layer 15 when there is no electric field between the base plates (i.e. when the voltage applied to them has been canceled), their twist angle θtm is twisted by from 120° to 127.5°, so that the long axis direction α when this twist angle is θt matches the direction of the azimuth angle φ2.

The angle subtended between the direction of the azimuth angle φ2 for which the parallel transmitted light L3 which has passed through the directional frontal scattering film 18 exhibits the minimum transmission ratio, and the long axis direction α of the nematic liquid crystal molecules 15a which are positioned at the central portion in the thickness direction of the liquid crystal layer 15 when there is no electric field between the base plates (i.e. when the voltage applied to them has been canceled), need not be 0°, provided that it is in the range ±30°. To put it in another way, it will be acceptable when the arrangement is such that the direction of the azimuth angle φ2 for which the parallel transmitted light L3 which has passed through the directional frontal scattering film 18 exhibits the minimum transmission ratio ±30°, and the long axis direction α of the nematic liquid crystal molecules 15a which are positioned at the central portion in the thickness direction of the liquid crystal layer 15 when the voltage applied to the base plates 17 and 28 has been canceled, match one another.

As described above, the directional frontal scattering film 18 is arranged so that the direction of the azimuth angle φ2 for which the parallel transmitted light L3 exhibits the minimum transmission ratio, and the long axis direction α of the nematic liquid crystal molecules 15a which are positioned at the central portion of the liquid crystal layer 15, approximately match one another, so that the long axis direction α of the nematic liquid crystal molecules 15a which are positioned at the central portion of the liquid crystal layer 15 when there is no electric field (when the applied voltage has been canceled) is the direction in which the contrast is high. By making this high contrast direction and the direction from which the blurring of the pattern which is displayed on the display appears to be low to match one another, a display is obtained which has no blurring at high contrast, and accordingly it is possible to enhance the display quality.

Furthermore, the directional frontal scattering film 18 is arranged so that the direction of the azimuth angle φ2 for which the parallel transmitted light L3 which has passed through the directivity frontal film 18 exhibits the minimum transmission ratio (the diffused transmitted light LT exhibits the maximum transmission ratio), and the in-plane direction in which the contrast of the liquid crystal panel is high for incident light for which the incident light angle is from 10° to 30° with respect to the polar angle direction, to match one another.

It will be acceptable when the angle which is subtended between the direction of the azimuth angle φ2 for which the parallel transmitted light L3 which has passed through the directional frontal scattering film 18 exhibits the minimum transmission ratio, and the in-plane direction in which the contrast of the liquid crystal panel is high for incident light for which the incident light angle is from 10° to 30° with respect to the direction of the polar angle θ is not 0°, provided that it is in the range of ±30°. To put it in another way, it will be acceptable when the arrangement is such that the direction of the azimuth angle φ2 for which the parallel transmitted light L3 which has passed through the directional frontal scattering film 18 exhibits the minimum transmission ratio ±30°, and the in-plane direction in which the contrast of the liquid crystal panel is high for incident light for which the incident light angle is from 10° to 30° with respect to the polar angle direction, match one another.

By arranging the directional frontal scattering film 18 so that the direction of the azimuth angle φ2 for which the parallel transmitted light L3 which has passed through the directional frontal scattering film 18 exhibits the minimum transmission ratio, and the in-plane direction in which the contrast of the liquid crystal panel is high for incident light for which the incident light angle is from 10° to 30° with respect to the polar angle θ direction, match one another, it is ensured that the direction which includes to a maximum limit the region in which the contrast of the liquid crystal panel 10 is high, and the direction in which it appears that blurring of the pattern which is displayed on the display is low, agree with one another. As a result a display is obtained which has no blurring at high contrast, so that a sharp display is obtained, and it is possible to enhance the display quality.

Figure 21:
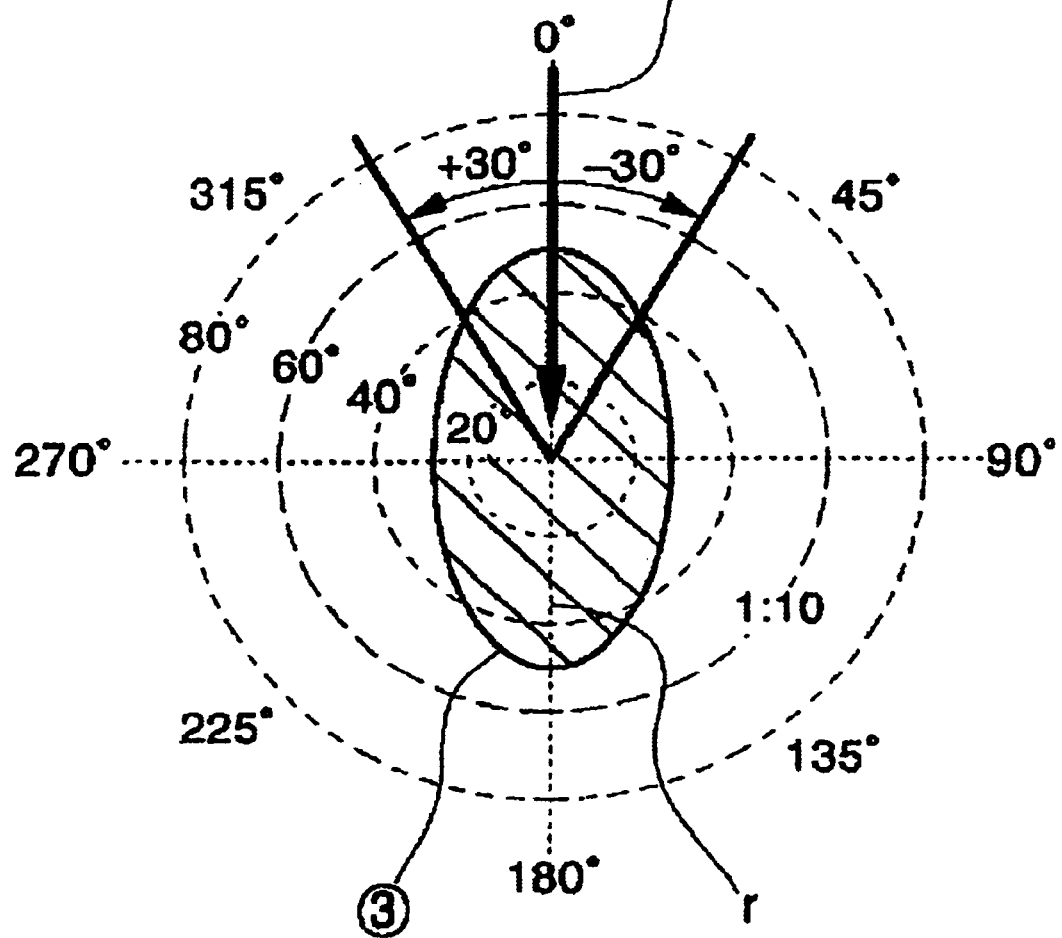
FIG. 21 is a figure showing the contrast characteristic of an embodiment of the liquid crystal panel.

FIG. 21 is a figure showing the contrast characteristic when the light which is incident upon the liquid crystal panel 10 of this embodiment is incident at a polar angle of 20° and an azimuth angle of 0°. The azimuth angle of the incident light at this time is the direction of the azimuth angle φ2 at which the parallel transmitted light which has passed through the directional frontal scattering film 18 exhibits the minimum transmission ratio (the diffused transmitted light exhibits the maximum transmission ratio). The center of the concentric circles shown in FIG. 21 is a visual angle in the normal direction to the liquid crystal panel 10; the outermost circle represents a visual angle seen from an 80° slanting direction from the normal direction H; the second circle from the outermost one represents a visual angle seen from a 60° slanting direction from the normal direction H; the third circle from the outermost one represents a visual angle seen from a 40° slanting direction from the normal direction H; and the innermost circle represents a visual angle seen from a 20° slanting direction from the normal direction H. In FIG. 21, the region ③ shown by the sloping lines indicates that a contrast greater than or equal to 1:10 is obtained.

From FIG. 21, it is possible to show a contrast of 1:10 with respect to incident light from the direction of the azimuth angle φ2, even when the visual angle of the observer is inclined by 40° from the normal direction, and a contrast of greater than or equal to 1:10 with respect to incident light from the direction of the azimuth angle φ2, even when the visual angle of the observer is inclined by from 30° to 0° from the normal direction. When observing a liquid crystal panel, normally, the observer observes the display from a direction somewhat different from the regular reflection direction of the incident light, or to put it in another way, from a direction in the vicinity of the normal or from a direction somewhat towards the normal direction from the regular reflection direction. Due to this when, as with the liquid crystal panel of this embodiment, it is arranged so that the direction of the azimuth angle $\phi 2$, and the in-plane direction $\gamma$ in which the contrast of the liquid crystal panel is high for incident light for which the incident light angle is from 10° to 30° with respect to the polar angle $\theta$ direction, match one another, then it will be understood that the contrast is high, and that it is possible to enhance the display quality, when as in FIG. 21 the visual angle is from 30° to 0° from the normal direction.

Furthermore, when it is arranged that the azimuth angle $\phi 2$ which yields the minimum transmission ratio for the parallel transmitted light L3 which has passed through the directional frontal scattering film 18, ±30°, and the in-plane direction $\gamma$ in which the contrast of the liquid crystal panel is high for incident light for which the incident light angle is from 10° to 30° with respect to the polar angle $\theta$ direction, match one another, then it will be understood that the contrast is high when the visual angle is from 30° to 0° from the normal direction, as will be understood from FIG. 21.

Ninth Embodiment of the Liquid Crystal Device

FIG. 7 is a partial sectional view of the liquid crystal panel 40 of the ninth embodiment of the liquid crystal device according to the present invention.

The liquid crystal panel 40 of this embodiment is one of a simple matrix structure of the reflective type, which comprises a directional frontal scattering film 18 the same as the liquid crystal panel 10 of the previously described eighth embodiment which was explained based upon FIG. 1 through FIG. 3 above. Since the basic structure is the same as the eighth embodiment, the same reference symbols will be affixed to the same structural elements and the explanation of those structural elements will be curtailed, and in the following principally the differing structural elements will be explained.

The liquid crystal panel 40 of this embodiment is made up by sandwiching a liquid crystal layer 15 which is surrounded by a seal member 12 between a base plate unit 41 and a base plate unit 42 which are opposed to one another. In the upper side base plate unit 41, since the color filter layer 20 in the base plate unit 13 of the previously described eighth embodiment has been curtailed, a color filter layer 20 is layered over the reflective layer 31 of the lower side base plate unit 42 on the opposite side, and thus the structure of this portion differs from the structure of the previously described first embodiment. In other words, the liquid crystal panel 40 shown in FIG. 7 is structured with the color filter layer 20, which in the previously described eighth embodiment was provided on the base plate unit 13 side on the upper side (the observer side), being provided on the base plate unit 42 side on the lower side (the opposite side to the observer side) of the liquid crystal layer 15. Although the structure of the color filter layer 20 is the same as the structure of the eighth embodiment, since the color filter layer 20 is formed upon the upper surface side of the base plate 28, accordingly the up and down direction of the lamination structure of the color filter layer 20 is reversed with respect to the state of FIG. 3.

In the structure of this ninth embodiment as well, the directional frontal scattering film 18 is provided identically to the structure and arrangement of the previously described eighth embodiment (with the azimuth angle $\phi 2$ which yields the minimum transmission ratio for the parallel transmitted light L3 and the long axis direction $\alpha$ of the nematic liquid crystal molecules 15a which are positioned in the central portion of the liquid crystal layer 15 when no electric field is applied between the base plates (when the applied voltage has been cancelled) matching one another, and with the azimuth angle $\phi 2$ direction which yields the minimum transmission ratio for the parallel transmitted light and the in-plane direction $\gamma$ in which the contrast of the liquid crystal panel is high for incident light for which the incident light angle is from 10° to 30° with respect to the polar angle $\theta$ direction, match one another). As a result, it is possible to obtain the identical beneficial results to the structure of the previously described eighth embodiment, with relation to blurring and contrast of the pattern which is displayed on the reflective display.

Furthermore, with the liquid crystal device 40 shown in FIG. 7, there is the particular characteristic that it is difficult for any problem of color deviation to occur, since the color filter layer 20 is formed directly over the reflective layer 31, and since the light which is incident upon the liquid crystal device 40 arrives at the reflective layer 31 via the liquid crystal layer 15, and passes through the color filter 32 directly after being reflected.

In this embodiment the reflective layer 31 is in the mirror (specular surface) state, but it will be no problem when it has minute convexities and concavities of approximately 1 to 20 $\mu$m.

Tenth Embodiment of the Liquid Crystal Device

In FIG. 8 there is shown a partial sectional view of the liquid crystal panel 50 of the tenth embodiment of the liquid crystal device according to the present invention.

The liquid crystal panel 50 of this embodiment is one of a simple matrix structure of the semi-transparent reflective type which comprises a base plate unit 55 which is provided with a semi-transparent reflective layer 52, instead of the reflective layer 31 which was provided to the liquid crystal panel 10 of the previously described eighth embodiment which was explained based upon FIG. 1 through FIG. 3; and, with regard to its other basic structures, to portions which are identical to ones of the eighth embodiment the same reference symbols will be affixed and the explanation of those structural elements will be curtailed, and in the following principally the differing structural elements will be explained.

The features in which the structure of this liquid crystal panel 50 differs from that of the eighth embodiment, are: that the semi-transparent reflective layer 52 is provided; furthermore, that a light source 60 such as a back light or the like is provided at the back side (the lower side in FIG. 8) of the liquid crystal panel 50; and that a phase difference plate 56 and a polarization plate 57 are provided.

It should be understood that, in the case of use for a transparent type liquid crystal device, it is necessary for the base plate 28' on the lower side to be made from a transparent base plate such as glass or the like.

For the semi-transparent reflective layer 52, it is possible to employ an appropriate one such as is widely used in semi-transparent reflective type liquid crystal display devices, such as a semi-transparent reflective layer of sufficient thickness for allowing the passage of the transmitted light which is generated by the light source 60 such as a back light or the like on the back side (the lower side in FIG. 8), or a structure whose optical transparency is enhanced by the formation of a large number of minute through holes in a portion of the reflective layer, or the like.

With the liquid crystal device of this ninth embodiment, it is possible to apply it as a liquid crystal display of the transparent type when transmitted light from the light source such as a back light or the like is employed, or when no light from any light source is employed, it can be employed as a reflective type liquid crystal display device by performing reflective display utilizing ambient light. And, with the structure of this ninth embodiment as well, the directional frontal scattering film 18 is provided identically to the structure and arrangement of the previously described eighth embodiment (with the azimuth angle φ2 which yields the minimum transmission ratio for the parallel transmitted light L3 and the long axis direction α of the nematic liquid crystal molecules 15a which are positioned in the central portion of the liquid crystal layer 15 when no electric field is applied between the base plates (when the applied voltage has been cancelled) matching one another, and with the azimuth angle φ2 direction which yields the minimum transmission ratio for the parallel transmitted light and the in-plane direction in which the contrast of the liquid crystal panel 50 is high for incident light for which the incident light angle is from 10° to 30° with respect to the polar angle θ direction matching one another). And, due to this, when the display is being employed as a reflective type liquid crystal display device, just as in the case of the previously described eighth embodiment, due to the existence of the directional frontal scattering film 18, it is possible to obtain a display of a sharp reflective type in which blurring of the pattern which is displayed on the display and deterioration of its contrast have been eliminated.

It should be understood that although, in the eighth, ninth, and tenth embodiments that have been explained up to this point, by way of example, the application of the present invention to a reflective type liquid crystal display device of a simple matrix type has been explained, it is of course also acceptable to apply the present invention to a reflective type liquid crystal display device, or to a semi-transparent reflective type liquid crystal display device, of an active matrix type which is equipped with a two terminal type switching element or with a three terminal type switching element.

In the case of application to those active matrix type liquid crystal display devices, instead of the electrodes in stripe form shown in FIG. 2, FIG. 7, and FIG. 8, the present invention can, of course, be applied to a liquid crystal display device of a TFT (thin film transistor) type drive type structure, in which a common electrode is provided on the side of one of the base plates, and, on the side of the other one of the base plates, a large number of pixel electrodes are provided, one for each pixel, and driving is performed for each one of the pixel electrodes using a thin film transistor which is a three terminal type switching element; or to a two terminal type linear element drive type, in which electrodes in stripe form are provided on the side of the one base plate elements, while pixel electrodes are provided on the side of the other one of the base plates, one for each pixel, with a thin film diode, which is a two terminal type linear element, driving each of these pixel electrodes. For either of these types of liquid crystal display device, the present invention has the distinguishing feature that it can extremely easily be applied to any one of the embodiments of the liquid crystal display device, since it can be applied only by arranging the directional frontal scattering film in the above described specified direction.

Figure 22:
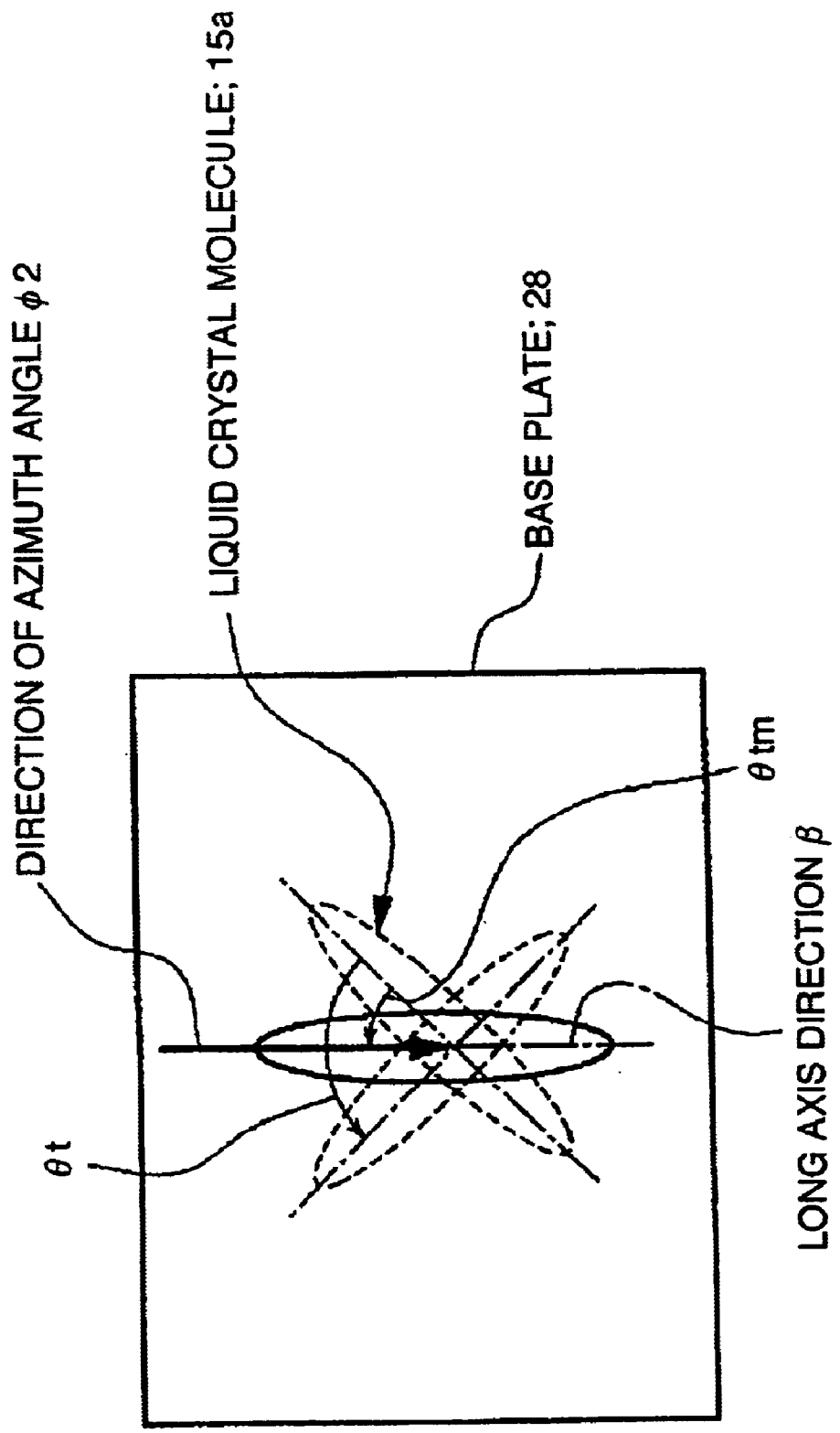
FIG. 22 is an explanatory figure of the positional relationship between the direction of an azimuth angle $\phi 2$ at which the parallel transmitted light which has passed through a directional frontal scattering film exhibits the minimum transmission ratio and the long axis direction $\beta$ of the liquid crystal molecules when a STN cell is not electrified.

When the liquid crystal device of the present invention is applied to a liquid crystal display device of the active matrix type, nematic liquid crystal molecules which are set to a twist angle of 60° to 80° can be used for making up the liquid crystal layer, and in this case the directional frontal scattering film is arranged so that, as shown in FIG. 22, the azimuth angle φ2 direction which yields the minimum transmission ratio for the parallel transmitted light which has passed through the directional frontal scattering film (i.e., which yields the maximum transmission ratio for the diffused transmitted light) and the long axis direction β of the nematic liquid crystal molecules 15b which are positioned in the central portion in the thickness direction of the liquid crystal layer 15 when no electric field is applied between the base plates (when the applied voltage has been cancelled) match one another. Since these liquid crystal molecules 15b are ones for which the twist angle θt is from 60° to 80° as described above, the nematic liquid crystal molecules 15b which are positioned in the central portion in the thickness direction of the liquid crystal layer when no electric field is applied between the base plates (when the applied voltage has been cancelled) are twisted at a twist angle θtm of from 30° to 40°, and the long axis direction β for this twist angle θtm matches with the direction of the azimuth angle φ2.

Furthermore, it is acceptable for the angle subtended between the azimuth angle φ2 direction which yields the minimum transmission ratio for the parallel transmitted light which has passed through the directional frontal scattering film and the long axis direction β of the nematic liquid crystal molecules 15b which are positioned in the central portion in the thickness direction of the liquid crystal layer 15 when no electric field is applied between the base plates (when the applied voltage has been cancelled) to be, not 0°, but within a range of ±30°. To put it in other words, it will be acceptable provided that the azimuth angle φ2 direction which yields the minimum transmission ratio for the parallel transmitted light which has passed through the directional frontal scattering film ±30°, and the long axis direction β of the nematic liquid crystal molecules which are positioned in the central portion in the thickness direction of the liquid crystal layer when the voltage applied between the base plates has been cancelled, are arranged so as to match one another.

It should be understood that, in the embodiment, the explanation has been made in terms of the case that the directional frontal scattering film is arranged so that the azimuth angle φ2 direction which yields the minimum transmission ratio for the parallel transmitted light which has passed through the directional frontal scattering film and the long axis direction of the nematic liquid crystal molecules which are positioned in the central portion of the liquid crystal layer when there is no electric field between the base plates (when the voltage applied between the base plates has been cancelled) match one another, and moreover the azimuth angle φ2 direction which yields the minimum transmission ratio for the parallel transmitted light and the in-plane direction in which the contrast of the liquid crystal panel is high for incident light for which the incident light angle is from 10° to 30° with respect to the polar angle θ direction, match one another. However, it is possible to solve the problems of the present invention, when the directional frontal scattering film is arranged so that the azimuth angle φ2 direction and the long axis direction of the nematic liquid crystal molecules which are positioned in the central portion of the liquid crystal layer when there is no electric field between the base plates match one another, or so that the azimuth angle φ2 direction and the in-plane direction in which the contrast of the liquid crystal panel is high for incident light for which the incident light angle is from 10° to 30° with respect to the polar angle θ direction match one another.

TEST EXAMPLE 17

Measurement tests were performed using a directional frontal scattering film manufactured by a transparent type hologram technique.

Light from a halogen lamp light source (disposed at a position separated by 300 mm from the directional frontal scattering film) was illuminated upon the central portion of the surface of a directional frontal scattering film of 50 mm×40 mm rectangular form in plan view arranged horizontally, and a light receiving portion (disposed at a position separated by 300 mm from the directional frontal scattering film) which had a light receiving element made from CCDs was set up upon the rear surface side of the directional frontal scattering film in various directions which were squarely opposed with respect to the incident light from the light source; and the polar angle and azimuth angle of the light source were regulated as shown in FIG. 4, and the parallel beam transmission ratio at an angular error within ±2° was measured by the light receiving portion.

The polar angle θ of the light source (the angle of incidence of the incident light with respect to the normal to the frontal scattering film) was adjusted within a range of ±60°, and the results of measuring the parallel beam transmission ratio (%) for each polar angle are shown in FIG. 10. Furthermore, with regard to the azimuth angle, the data were also measured for each of 0°, +30°, +60°, +90°, and +180° (which are all the rightwards rotational direction as shown in FIG. 4) and for each of −30°, −60°, −90°, and −180° (which are all the leftwards rotational direction as shown in FIG. 4), and these are shown all together in FIG. 10.

From the results shown in FIG. 10, the measurement results in the cases of 0° and +180° give exactly the same curve, and the relationship between the maximum transmission ratio Tmax and the minimum transmission ratio Tmin of the parallel transmitted light becomes (Tmax/Tmin) ≈50:6≈8.33, i.e. a value which exceeds the value of 2 which is desired for the present invention.

Next, the results of performing the same measurement tests of transmission ratio using a different directional frontal scattering film which was made by a transparent type hologram technique are shown in FIG. 11. Furthermore, the results of performing the same measurement tests of transmission ratio using a different transparent type hologram directional frontal scattering film are shown in FIG. 12.

When the characteristic shown in FIG. 11 is considered, the relationship between the maximum transmission ratio Tmax and the minimum transmission ratio Tmin of the parallel transmitted light becomes (Tmax/Tmin)≈12:3≈4, thus yielding a value which exceeds the value of 2 which is desired for the present invention.

When the characteristic shown in FIG. 12 is considered, the relationship between the maximum transmission ratio Tmax and the minimum transmission ratio Tmin of the parallel transmitted light becomes (Tmax/Tmin)≈52:26≈2, thus yielding the value of 2 which is desired for the present invention.

Furthermore, with any one of the directional frontal scattering films shown by way of example in FIG. 10, FIG. 11, and FIG. 12, in the range of ±60°, it was clear that, the maximum, and minimum numerical values were at almost the same angle. For example, from the results shown in FIG. 10, the absolute maximum value was at the polar angle of −(30°) and the absolute minimum value was at the polar angle of +(23°); from the results shown in FIG. 11, the absolute maximum value was at the polar angle of −(20°) and the absolute minimum value was at the polar angle of +(18°); and, from the results shown in FIG. 12, the absolute maximum value was at the polar angle of −(30°) and the absolute minimum value was at the polar angle of +(25°).

Next, for the directional frontal scattering films shown by way of example in FIG. 10, FIG. 11, and FIG. 12, when φ was ±90°, in any of the examples, it was ascertained that the transmission ratio was the lowest when the polar angle θ was 0; or, to put it in another way, it was ascertained that the scattering upon incidence was the strongest (the amount of diffused transmitted light was the greatest).

Furthermore, for the directional frontal scattering films shown by way of example in FIG. 10, FIG. 11, and FIG. 12, it was also clear that for the transmission ratio in all conditions, it was always within the range of 2% to 50%.

Next, the transmission ratio of the directional frontal scattering film was measured while varying the azimuth angle φ while keeping the polar angle θ fixed, or to put it in other words, while rotating only the directional frontal scattering film in the horizontal plane, and the results are shown in FIG. 13.

According to the results shown in FIG. 13, although the state for the condition θ=0° in which the light was incident in the normal direction to the directional frontal scattering film is shown, almost the same transmission ratio was exhibited, while in the case of θ=−20, −40°, and −60°, over the range 0±90° of azimuth angle, the transmission ratio followed a curve which was convex to the upper side and attained a maximum. And, in the case of θ=+20°, +40°, and +60°, over the range 0±90° of azimuth angle, the transmission ratio showed a tendency to follow a curve which was convex to the lower side (convex to the upper side) and attained a minimum. From this fact it is vividly shown that the directional frontal scattering film which was used in this embodiment exhibited maxima and minima of transmission ratio, according to polar angle and azimuth angle.

It should be understood that, when analyzing the transmission ratio relationships shown in FIG. 13, for negative polar angles θ(−20°, −40°, and −60°), within an azimuth angle of φ=±30°, in other words, in the range φ=−30° to +30°, the maximum value of the transmission ratio was constrained to vary within 5%, while for positive polar angles θ (+20°, +40°, and +60°), within an azimuth angle of φ=±30°, in other words, in the range φ=−30° to +30°, the minimum value of the transmission ratio was constrained to vary within 5%.

FIG. 14 is a figure showing the results of measurement of the relationship between polar angle and transmission ratio, for each azimuth angle, in tests of a liquid crystal device which was manufactured using a prior art isotropic frontal scattering film (product name IDS-16K, made by Dainippon Printing Co. Ltd.). In these tests, a liquid crystal device the same as in the previously described first test example was utilized, and these are the results of measurements obtained by changing the directional frontal scattering film (an anisotropic frontal film) for an isotropic scattering film which is in current use.

From the results shown in FIG. 14, it is clear that almost no variation was seen in the transmission ratio of the parallel transmitted light for any azimuth angle, and that, along with almost overlapping into a single curve, it attained its maximum when the polar angle was 0°, and only varied by approximately a few percent even when the polar angle was varied through the + region or through the − region. From these results, it is clear that the beneficial results of the present invention were not obtained even when an isotropic frontal scattering film was used in the liquid crystal device.

TEST EXAMPLE 18

Next, the brightness of a reflective type color liquid crystal display device which utilized a directional frontal scattering film was compared, in an office under lighting by fluorescent lamps, as the polar angle θ1 and the polar angle θ2 of the previously described test were varied. For this brightness, comparison was made with a reflective type color liquid crystal display device which employed an isotropic frontal scattering film according to the prior art (the reflective type color liquid crystal display device employing an isotropic scattering film which was used for the measurements shown in the previously described FIG. 14), and those which could be perceived as brighter than the reflective type color liquid crystal display device according to the prior art are shown in the following Table 6 by "○", those which were the same by "Δ", and those which were darker by "X".

TABLE 11

| θ1 (°) | -80 | -70 | -60 | -50 | -40 | -30 | -20 | -10 | 0 |
|---|---|---|---|---|---|---|---|---|---|
| θ2 (°) | 0 | 0 | 0 | 0 | 0 | 0 | 0 | 0 | 0 |
| Results of Evaluation | x | x | x | x | x | Δ | Δ | Δ | x |
| θ1 (°) | -80 | -70 | -60 | -50 | -40 | -30 | -20 | -10 | 0 |
| θ2 (°) | 10 | 10 | 10 | 10 | 10 | 10 | 10 | 10 | 10 |
| Results of Evaluation | x | x | x | x | Δ | ○ | ○ | ○ | x |
| θ1 (°) | -80 | -70 | -60 | -50 | -40 | -30 | -20 | -10 | 0 |
| θ2 (°) | 20 | 20 | 20 | 20 | 20 | 20 | 20 | 20 | 20 |
| Results of Evaluation | x | x | x | x | Δ | ○ | ○ | ○ | x |
| θ1 (°) | -80 | -70 | -60 | -50 | -40 | -30 | -20 | -10 | 0 |
| θ2 (°) | 30 | 30 | 30 | 30 | 30 | 30 | 30 | 30 | 30 |
| Results of Evaluation | x | x | x | x | Δ | ○ | ○ | ○ | x |
| θ1 (°) | -80 | -70 | -60 | -50 | -40 | -30 | -20 | -10 | 0 |
| θ2 (°) | 40 | 40 | 40 | 40 | 40 | 40 | 40 | 40 | 20 |
| Results of Evaluation | x | x | x | x | x | Δ | Δ | Δ | x |

As is clear from the results of measurement shown in Table 11, it will be understood that, when the polar angles when the parallel transmitted light attains its maximum (the diffused transmitted light attains its minimum) are within the range of $-40° \leq \theta1 \leq 0°$, and the polar angle when the parallel transmitted light attains its minimum (the diffused transmitted light attains its maximum) is within the range of $0° \leq \theta2 \leq 40°$, then it is possible to ensure brightness of approximately the same as the prior art; while, when they are within the range of $-30° \leq \theta1 \leq 0°$ and the range of $0° \leq \theta2 \leq 30°$, then a liquid crystal display device is obtained which is superior in brightness over the prior art.

TEST EXAMPLE 19

Directional frontal scattering films were prepared by varying the parallel beam transmission ratio T(0, 0) in the normal direction to the directional frontal scattering film over various values, and the brightness of liquid crystal display devices which were equipped with these directional frontal scattering films was compared in an office under lighting by fluorescent lamps. The prior art product with which comparison was performed was the same as the one used in the previously described test example. The cases which could be perceived as brighter than the reflective type color liquid crystal display device according to the prior art are shown in the following Table 12 by "○", those which were the same by "Δ", and those which were darker by "X".

TABLE 12

| T (0, 0) | 3% | 5% | 10% | 20% | 30% | 40% | 50% | 60% |
|---|---|---|---|---|---|---|---|---|
| Results of Evaluation | Δ | ○ | ○ | ○ | ○ | ○ | Δ | x |

As is clear from the results of measurement shown in Table 12, it is clear that, when the range is $3\% \leq T(0, 0) \leq 60\%$, and more desirably is $5\% \leq T(0, 0) \leq 40\%$, then it is possible to provide a reflective type color liquid crystal display device which is clearer than the prior art in an environment of actual use.

Next, from the results shown in FIG. 10, FIG. 11, and FIG. 12, it is also clear that, when the azimuth angles φ of the directional frontal scattering film are regulated to be in the ranges of φ1 ±60° and moreover φ2 ±60°, then a maximum of the parallel beam transparency (to put it in another way, a minimum of the diffusion transmission ratio) is always exhibited for θ1, while a minimum of the parallel beam transmission ratio (to put it in another way, a maximum of the diffusion transmission ratio) is always exhibited for θ2.

TEST EXAMPLE 20

Next, a large number of directional frontal scattering films manufactured by a transparent type hologram technique were prepared, and the results of comparing the brightness of the reflective type color display devices when the value of (Tmax/Tmin) was adjusted to various values with a liquid crystal display device using an isotropic scattering film according to the previously described prior art are given in the following Table 13. The cases which could be perceived as twice as bright or more as compared with the reflective type color liquid crystal display device according to the prior art are shown in the following Table 13 by "⊚", those which were perceived as brighter than the prior art product by "○", those which were the same by "Δ", and those which were darker by "X".

TABLE 13

| Tmax/Tmin | 10 | 5 | 3 | 2 | 1.8 | 1.5 | 1 |
|---|---|---|---|---|---|---|---|
| Results of Evaluation | ⊚ | ⊚ | ⊚ | ⊚ | ○ | Δ | Δ |

From the results shown in Table 13, it is clear that particularly bright viewing was possible when the ratio between the absolute minimum value and the absolute maximum value of the parallel beam transmission ratio explained previously was greater than or equal to 2.

TEST EXAMPLE 21

With the azimuth angle when the parallel beam transmission ratio attained its minimum value (or, to put it in another way, the diffusion transmission ratio attained its maximum value) and when the parallel beam transmission ratio attained its maximum value (or, to put it in another way, the diffusion transmission ratio attained its minimum value) being taken to be φ2 and φ1, the ratio between the absolute maximum value and the absolute minimum value of the transmitted light characteristic which was measured by varying the polar angle θ was measured in the ranges φ2 ±60° and φ1 ±60°. The brightness of the reflective type color liquid crystal display devices was compared in an office under lighting by fluorescent lamps while varying this ratio. The prior art product with which comparison was performed was the same as the one used in the previously described test examples. The cases which could be perceived as brighter than the reflective type color liquid crystal display device according to the prior art are shown in the following Table 14 by "○", those which were the same by "Δ", and those which were darker by "X".

TABLE 14

| absolute maximum value/ absolute minimum value | 5 | 3.5 | 2 | 1.5 | 1.2 | 1 |
|---|---|---|---|---|---|---|
| Results of Evaluation | ○ | ○ | ○ | ○ | Δ | Δ |

From the results shown in Table 14, it is clear that it is desirable for the absolute maximum value/the absolute minimum value to be greater than or equal to 1.5. In other words it is also clear that, when the azimuth angles φ of the directional frontal scattering film are regulated in the ranges of φ1 ±60° and moreover φ2 ±60°, then the ratio between the absolute minimum value and the absolute maximum value of the parallel beam transmission ratio is greater than or equal to 1.5.

TEST EXAMPLE 22

When, for the directional frontal scattering film, the polar angle θ was taken as −60°≦θ≦+60°, the brightness of the reflective type color liquid crystal display device was compared in an office under lighting by fluorescent lamps while varying the maximum value and the minimum value of the parallel beam transmission ratio T. The prior art product with which comparison was performed was the same as the one used in the previously described test examples. The cases which could be perceived as brighter than the reflective type color liquid crystal display device according to the prior art which utilized an isotropic frontal scattering film are shown in the following Table 15 by "○", those which were the same by "Δ", and those which were darker by "X".

TABLE 15

| maximum transmission ratio Tmax | 60% | 50% | 40% | 30% | 20% | 10% |
|---|---|---|---|---|---|---|
| minimum transmission ratio Tmin | 1% | 1% | 1% | 1% | 1% | 1% |
| Results of Evaluation | x | x | Δ | Δ | Δ | x |
| maximum transmission ratio Tmax | 60% | 50% | 40% | 30% | 20% | 10% |
| minimum transmission ratio Tmin | 2% | 2% | 2% | 2% | 2% | 2% |
| Results of Evaluation | x | ○ | ○ | ○ | ○ | ○ |
| maximum transmission ratio Tmax | 60% | 50% | 40% | 30% | 20% | 10% |
| minimum transmission ratio Tmin | 5% | 5% | 5% | 5% | 5% | 5% |
| Results of Evaluation | Δ | ○ | ○ | ○ | ○ | ○ |
| maximum transmission ratio Tmax | 60% | 50% | 40% | 30% | 20% | 10% |
| minimum transmission ratio Tmin | 10% | 10% | 10% | 10% | 10% | 10% |
| Results of Evaluation | Δ | ○ | ○ | ○ | ○ | Δ |
| maximum transmission ratio Tmax | 60% | 50% | 40% | 30% | 20% | 10% |
| minimum transmission ratio Tmin | 20% | 20% | 20% | 20% | 20% | 20% |
| Results of Evaluation | x | ○ | ○ | Δ | Δ | x |
| maximum transmission ratio Tmax | 60% | 50% | 40% | 30% | 20% | 10% |
| minimum transmission ratio Tmin | 30% | 30% | 30% | 30% | 30% | 30% |
| Results of Evaluation | x | Δ | Δ | x | x | x |
| maximum transmission ratio Tmax | 60% | 50% | 40% | 30% | 20% | 10% |
| minimum transmission ratio Tmin | 40% | 40% | 40% | 40% | 40% | 40% |
| Results of Evaluation | x | x | x | x | x | x |

From the results shown in Table 15, it will be understood that it is necessary for the maximum value/the minimum value to satisfy ≧2, and for the transmission ratio to be greater than or equal to 2% and less than or equal to 50%.

Eleventh Embodiment of the Liquid Crystal Device

Figure 23:
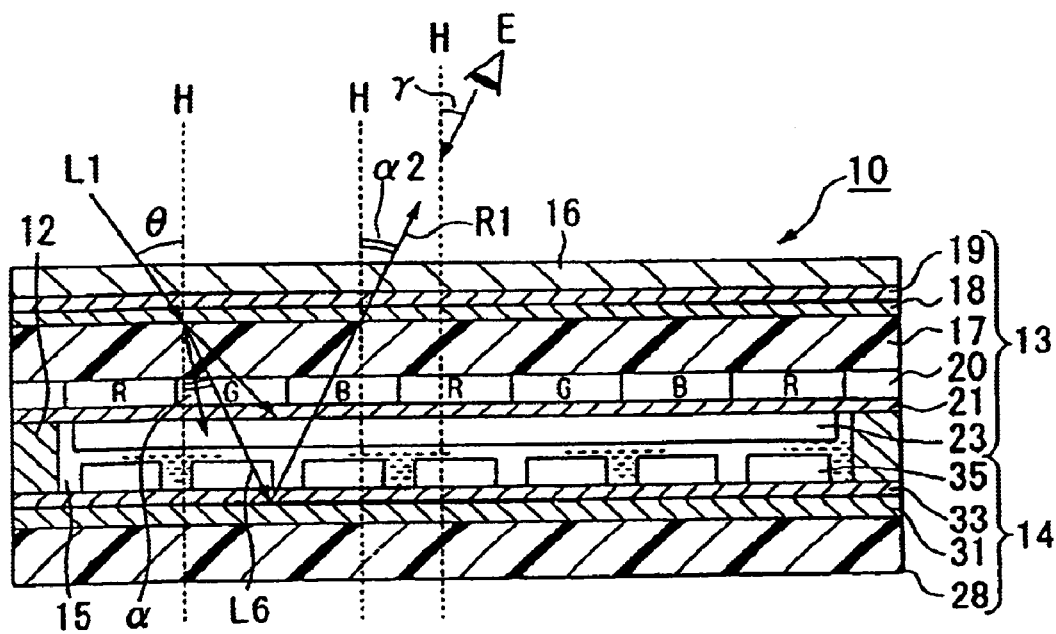
FIG. 23 is a partial sectional schematic view of the liquid crystal device of the eleventh embodiment of the present invention, taken along the lines A—A in FIG. 1.

The eleventh embodiment of the liquid crystal device according to the present invention will be described below with reference to FIG. 1, FIG. 23, and FIG. 3. FIG. 1 is a plan view showing this embodiment in which the present invention is applied to a reflective type liquid crystal panel of a simple matrix type; FIG. 23 is a partial sectional schematic view taken along the lines A—A of the liquid crystal panel shown in FIG. 1; and FIG. 3 is an enlarged sectional view of a color filter portion housed in the liquid crystal panel. As a finished product, a liquid crystal display device (liquid crystal device) is constituted by peripheral equipment such as an IC for liquid crystal driving, a support member and the like being fitted to the liquid crystal device of this embodiment.

The liquid crystal panel 10 of this embodiment comprises as main elements a pair of base plate units 13 and 14 which are rectangular in plan view and which are adhered together so as mutually to oppose one another with a cell gap being opened between them via a seal member 12 which is roughly rectangular in plan view and moreover is annular, a liquid crystal layer 15 which is sandwiched between these and is also surrounded by the seal member 12, and a directional frontal scattering film 18, a phase difference plate 19, and a polarization plate 16, which are provided upon the upper surface side of one of the base plate units 13 (in FIG. 23, the upper side one). Among the base plate units 13 and 14, the base plate unit 13 is that base plate unit on the display side (the upper side) which is provided to face towards the side of the observer, while the base plate unit 14 is the base plate unit on the opposite side, or to put it in other words, is provided on the rear side (the lower side).

The base plate unit 13 on the upper side comprises: a base plate 17 which is made of a transparent material such as for example glass or the like; a directional frontal scattering film 18, a phase difference plate 19 and a polarization plate 16 provided in that order upon the display side (the upper surface side in FIG. 23, i.e. the observer side) of the base plate 17; and a color filter layer 20, an overcoat layer 21, and a plurality of electrode layers 23 formed upon the liquid crystal layer 15 side of the surface of the overcoat layer 21 in stripe form for driving the liquid crystal, formed in that order upon the rear side (in other words, the liquid crystal layer 15 side) of the base plate 17. Moreover, in an actual liquid crystal device, orientation films are formed as coatings upon the liquid crystal layer 15 side of the electrode layers 23, and upon the liquid crystal layer 15 side of stripe form electrode layers 35 upon the lower base plate side as will be more explained hereinafter. However, these orientation films are omitted from FIG. 23 and explanation thereof is also omitted; and in the other embodiments explained below in order, such orientation films are also omitted from the explanation and from the drawings. Furthermore, in the illustrations of the cross sectional structure of the liquid crystal devices given in FIG. 23 and the various subsequent figures, the thickness of the various layers is shown as adjusted to make them easier to see in the drawings, and they are different from those in an actual liquid crystal device.

The electrode layers 23 for driving on the side of the upper base plate are formed in a stripe form in plan view from, in this embodiment, a transparent electroconductive material such as ITO (Indium Tin Oxide) or the like, and they are formed in the required number of lines to correspond to the number of display regions and of pixels of the liquid crystal panel 10.

In this embodiment, the color filter layer 20 is formed by forming a black mask 26 for light interception and RGB patterns 27 for color display upon the lower surface of the upper side base plate 17 (or, to put it in other words, on its surface towards the liquid crystal layer 15), as shown enlarged in FIG. 3. Furthermore, an overcoat layer 21 is coated as a transparent protective planarizing film which protects the RGB pattern 27.

The black mask 26 is formed, for example by a spattering method or a vacuum vapor deposition method, as a patterned metallic thin film of chrome or the like of approximately 100 to 200 nm in thickness. In the RGB patterns 27, a red color pattern (R), a green color pattern (G), and a blue color pattern (B) are formed so as to be aligned in a desired pattern arrangement by one of various methods such as, for example, a pigment scattering method using photosensitive resin which includes a specified coloring material, or various printing methods, electrodeposition methods, transcription methods, dyeing methods, or the like.

On the other hand, the base plate unit 14 on the lower side comprises a base plate 28 which is made from a transparent material such as glass or the like or from some other non transparent material, and, formed in order upon the surface side of the base plate 28 (the upper surface side in FIG. 23, or to put it in other words, the side of the liquid crystal layer 15), a reflective layer 31, an overcoat layer 33, and a plurality of electrode layers 35 for driving of stripe form which are formed upon the surface of the overcoat layer 33 towards the liquid crystal layer 15. These electrode layers 35, just like the previous electrode layers 23, are formed in the required number of lines to correspond to the number of display regions and of pixels of the liquid crystal panel 10.

Next, the reflective layer 31 of this embodiment is made of a light reflective and moreover electroconductive metallic material such as Ag or Al or the like, and it is formed upon the base plate 28 by a vapor deposition method or a spattering method or the like. However, it is not essential for the reflective layer 31 to be made from an electroconductive material, and it makes no difference when a structure is utilized in which an electrode layer for driving made of an electroconductive material different from the reflective layer 31 is provided, so that the reflective layer 31 and the drive electrodes are provided separately.

Next, the details of the above described directional frontal scattering film 18 which is attached to the base plate unit 13 on the upper side will be explained in the following.

As the directional frontal scattering film 18 which is utilized in this embodiment, from the point of view of its basic structure, a frontal scattering film endowed with directivity such as disclosed in Japanese Patent Application, Unexamined First Publication Nos. 2000-035506, 2000-066026, or 2000-180607 or the like may appropriately be employed. For example, as disclosed in Japanese Patent Application, Unexamined First Publication No. 2000-035506, upon a resin sheet which is a mixture of two or more types of monomer or oligomer capable of photopolymerization and having different indexes of refraction which mutually differ, a material endowed with the function of causing scattering with good efficiency only in a specified wide direction when illuminated from a slanting direction with ultraviolet rays, or, as an on line holographic scattering sheet which is disclosed in Japanese Patent Application, Unexamined First Publication No. 2000-066026, a material made so as to have a layer structure of regions which partially differ in index of refraction by illuminating a laser upon a photosensitive material for use as a hologram, or the like, may appropriately be employed.

Here, the directional frontal scattering diffraction film 18 used for this embodiment is a material which is made by adjusting various parameters such as parallel beam transmission ratio or the like in a suitable specified positional relationship to the liquid crystal display device as will be explained hereinafter.

First, it will be supposed that the directional frontal scattering diffraction film 18 of rectangular shape in plan view as shown in FIG. 4 is arranged horizontally. It should be understood that the horizontal arrangement state is explained in FIG. 4 since the horizontal arrangement state is easy to explain. However, the direction in which the directional frontal scattering diffraction film 18 is arranged is not limited to the horizontal direction, and any direction will do, provided that it is possible for the positional relationship (a polar angle $\theta n$ and an azimuth angle $\phi m$ which will be described hereinafter) of a light source K, a light receiving portion J, and the directional frontal scattering diffraction film 18 to be determined precisely. In the explanation of this embodiment, the horizontal direction arrangement of the directional frontal scattering diffraction film 18 will be explained, by way of example, as an easily comprehensible direction.

In FIG. 4, the case will be supposed that the incident light L1 is incident from the light source K towards an origin O at the central portion of the directional frontal scattering diffraction film 18 at a sloping direction from an area right and diagonally above the directional frontal scattering diffraction film 18 and relatively remote from the viewer. And a measurement system will be assumed in which transmitted light which passes directly through the directional frontal scattering diffraction film 18 past the origin O of the directional frontal scattering diffraction film 18 is received by the light receiving portion J which is a light sensor or the like.

Here, in order to specify the direction of the incident light L1 upon the directional frontal scattering diffraction film 18, coordinates will be hypothesized which, as shown in FIG. 4, pass through the origin O at the central portion and divide the directional frontal scattering diffraction film 18 into four equal rectangular shapes by coordinate axes at 0°, 90°, 180° and 270° (or, to put it in other words, the directional frontal scattering diffraction film 18 is divided into four equal portions in such a way that the one end of each of the coordinate axes passes through the central point of one of its sides). And the rotational angle of the incident light L1 about the horizontal direction projected vertically upon the surface of this directional frontal scattering diffraction film 18 is defined as the azimuth angle $\phi m$ (angles turning rightwards from the 0° coordinate axis are considered as + while angles turning leftwards from the 0° coordinate axis are considered as −). Next, the angle subtended with respect to the normal H to the directional frontal scattering diffraction film with respect to the direction of the incident light L1 projected horizontally into a vertical plane which contains the coordinate axes 0° and 180° (the plane shown in FIG. 4 by the reference symbol M1) will be defined as the polar angle θn of the incident light L1. To put it in other words, by the polar angle θn is meant the angle of incidence of the incident light L1 in a vertical plane with respect to the directional frontal scattering diffraction film 18 when the film is arranged horizontally, and the azimuth angle φm corresponds to the rotational angle within the horizontal plane of the incident light L1.

In this state, when for example the polar angle of the incident light L1 is supposed to be 0° and the azimuth angle is also supposed to be 0°, then the incident light L1 comes to be incident at a right angle upon the directivity frontal film 18 as shown in FIG. 5 (i.e. is incident from the direction of the normal direction), and the directional frontal scattering diffraction film 18 comes to be in the state shown in FIG. 5 by the reference symbol 18. When the polar angle θn is supposed to be +60°, then this means that the positional relationship between the light source K, the light receiving portion J, and the directivity frontal film 18 comes to be the state in which the directional frontal scattering diffraction film 18 is arranged as shown by the reference symbol 18A in FIG. 5. And, when the polar angle θn is supposed to be −60°, then this means that the positional relationship between the light source K, the light receiving portion J, and the directional frontal scattering diffraction film 18 comes to be the state in which the directional frontal scattering diffraction film 18 is arranged as shown by the reference symbol 18B.

Next, when incident lig ht L1 generated from a light source which is arranged upon one surface side (in FIG. 6A, the left side) of the directional frontal scattering diffraction film 18 passes through the directional frontal scattering diffraction film 18 as shown in FIG. 6A and emerges at the other side surface (in FIG. 6B, the right side) of the directional frontal scattering diffraction film 18, it will be supposed that the light which is scattered on the one side surface (the left side) of the directional frontal scattering diffraction film 18 will be termed the backward scattered light LR, while the light which passes through the directional frontal scattering diffraction film 18 will be termed the forward scattered light (in the present invention, the diffracted light which has been diffracted when passing through the directional frontal scattering diffraction film 18 and has passed through the other surface side (the right side) of the directional frontal scattering diffraction film 18 is also included in this forward scattered light). And, with respect to the forward scattered light which has passed through the directional frontal scattering diffraction film 18 (the diffracted light is also included in this forward scattered light), the proportion which the light intensity of the forward scattered light L3 which proceeds directly in the same direction at an angular error within ±2° with respect to the direction of progression of the incident light L1 bears with respect to the light intensity of the incident light L1 will be defined as the parallel beam transmission ratio. Furthermore, the proportion which the light intensity of the forward scattered light (the diffracted light is also included in this forward scattered light) LT which is diffused slantingly to the sides at an angle of greater than ±2° bears to the light intensity of the incident light L1 will be defined as the diffusion transmission ratio, while the proportion which the entire amount of the transmitted light bears to the incident light will be defined as the entire light beam transmission ratio. From the above definitions, it is possible to define that the result of subtracting the diffusion transmission ratio from the entire light beam transmission ratio is the parallel beam transmission ratio. In order to make the above explanation even simpler to understand, the relationship between the incident light L1, the azimuth angle φm, and the parallel transmitted light L3 is also shown in FIG. 1.

It should be understood that, although a transmission ratio scale which is termed "haze" is also generally known in the optical field, haze is a value which is expressed as a percentage by dividing the diffusion transmission ratio by the entire light beam transmission ratio, and the parallel beam transmission ratio which is used in this embodiment is a completely different concept.

Next, when expressing the maximum transmission ratio of the parallel beam transmission ratio using the previous polar angle θn and azimuth angle φm, it is defined as being expressed as Tmax (φ1, θ1), and the minimum transmission ratio of the parallel beam transmission ratio is defined as being expressed as Tmin (φ2, θ2). Furthermore, to put it in other words, from the nature of the directional frontal scattering diffraction film, the condition for exhibiting the maximum transmission ratio is the condition that the scattering (including the diffraction) is weakest; and the condition for exhibiting the minimum transmission ratio is the condition that the scattering (including the diffraction) is strongest.

For example, when hypothetically the maximum transmission ratio is exhibited when the polar angle θn=0° and the azimuth angle φm=0°, then this is expressed as Tmax(0, 0) (This means that the parallel beam transmission ratio is maximum along the normal direction to the directional frontal scattering diffraction film. To put it in other words, it means that the scattering and diffraction are weakest along the normal direction to the directional frontal scattering diffraction film.). Furthermore, when the minimum transmission ratio is exhibited when the polar angle θn=10° and the azimuth angle φ m=45°, then this is expressed as Tmin(10, 45), and this means that in this case the scattering and diffraction in this direction are the strongest.

Based upon the above definitions, the characteristics of the directional frontal scattering diffraction film 18 which are desirable for application to a liquid crystal display device will be explained in the following.

As described above, for the directional frontal scattering diffraction film 18, the angle at which the parallel beam transmission ratio exhibits the maximum transmission ratio is the angle at which the scattering and the diffraction are the weakest, and the angle at which it exhibits the minimum transmission ratio is the angle at which the scattering and the diffraction are the strongest.

Accordingly, to put it in other words, for a reflective type liquid crystal display device as shown in FIG. 23 which employs the ambient light as the incident light L1 upon the liquid crystal panel 10, when it is considered that the observer perceives as the reflected light the light which is reflected from the reflective layer 31 as this incident light L1 is incident upon the liquid crystal panel 10, when, in terms of the coordinate axes of FIG. 4, the incident light enters into the liquid crystal panel 10 from a direction in which the scattering or diffraction is strong when the light is incident (or to put it in other words, a direction in which the parallel beam transmission ratio is low), and when the reflected light is being observed by an observer it is seen from a direction in which the scattering or diffraction is weak (to put it in other words, a direction in which the parallel beam transmission ratio is high), then it is considered that it is possible to obtain a state in which blurring of the pattern which is displayed on the display is low. This is a matter based upon the knowledge that has become known to the present inventors, that, although it is difficult for the scattering when the light is incident upon the directional frontal scattering diffraction film 18 for the first time to exert influence upon blurring of the pattern which is displayed on the display, nevertheless, when it, as reflected light, passes through the directional frontal scattering diffraction film 18 for the second time, the influence of the scattering upon blurring of the pattern which is displayed on the display is great.

In other words, in this embodiment, for the objective of preventing regular reflection (mirror reflection) from the reflective layer 31 and of making it possible to obtain a clear display over a wide angle of field of view, it is desirable more to scatter or diffract the light when the incident light L1 passes through the forward directivity scattering film 18 for the first time. Moreover, this is because it is considered to be desirable in view of the fact that the amount of scattering and diffraction is less when the light which has been reflected by the reflective layer 31 in the interior of the liquid crystal device passes through the directional frontal scattering diffraction film 18 for the second time. Accordingly, as a characteristic for the directional frontal scattering diffraction film 18, it is desirable to orient the polar angle and azimuth angle which exhibit the minimum transmission ratio, or to put it in other words, the polar angle and the azimuth angle direction of the incident light for which the scattering and diffraction are the strongest, towards the light reception side of the liquid crystal panel 10; or, to put it in other words, to orient them towards the opposite side from that of the observer. And it is necessary to orient the polar angle and azimuth angle for which the parallel beam transmission ratio exhibits the maximum transmission ratio, or, to put it in other words, the incident light angle and incidence direction for which the scattering and diffraction are the weakest, towards the side of the observer of the liquid crystal panel 10.

In this connection, the cross sectional structure of the directional frontal scattering diffraction film 18 which is utilized in this embodiment is shown in FIG. 6B, and the state as described above of the polar angle and azimuth angle will be explained.

The cross sectional structure model of the directional frontal scattering diffraction film 18 which is utilized in this embodiment, as shown in FIG. 6B, is structured so that portions of index of refraction n1 and portions of index of refraction n2 are arranged alternately in the form of layers in a slanting direction having a predetermined angle with respect to the cross sectional structure of the directional frontal scattering diffraction film 18. When it is supposed that incident light L1 having a suitable polar angle is incident from a slanting direction upon the directional frontal scattering diffraction film 18 of this structure, then when, along with being scattered and diffracted at the boundary portions between the various layers which have different indexes of refraction, a portion of the scattered and diffracted light passes through the liquid crystal layer 15 and is reflected by the reflective layer 31, this reflected light R1 passes through the liquid crystal layer 15 for a second time and attempts to pass through the directional frontal scattering diffraction film 18 at a different polar angle from that of the previous incident light L1. The reflected light R1 here is able to pass through the directional frontal scattering diffraction film 18 in a state in which the scattering and the diffraction are lower.

And, in order to satisfy this type of relationship, it is most desirable that $\phi1=\phi2\pm180°$ as a relationship between the azimuth angles $\phi1$ and $\phi2$. This means that $\phi2$ is adjusted to the incident angle direction and $\phi1$ is adjusted to the direction of observation, and when applied to an actual liquid crystal device these angles are different from 180°. In this case, a sharp display is obtained with no blurring of the pattern which is displayed on the display, since the light which is incident upon the liquid crystal device is strongly scattered and diffracted when it is incident, and it is hard for the light which is reflected by the reflective layer 31 to be scattered or diffracted. However in consideration of the fact that this directional frontal scattering diffraction film 18, in which the layers which have different indexes of refraction are arranged alternately in layer form in a slanting direction and have a predetermined angle such as described above, is not absolutely structurally uniform, $\phi1=\phi2\pm180°$ is ideal as a relationship between the azimuth angles $\phi1$ and $\phi2$. However, based upon the relationship $\phi1=\phi2\pm180°$, it will be presumed that cases up to a deviation of approximately $\pm10°$ from these angles still fall within the ambit of the present invention. It becames difficult to obtain a sharp display with no blurring of the pattern which is displayed on the display with structures in which the deviation from these angles exceeds $\pm10°$.

Next, it is desirable for the value of the above (Tmax/Tmin) to satisfy the relationship (Tmax/Tmin)$\geq$2. By satisfying this relationship, sufficient scattering and diffraction are obtained upon incidence, and a bright and sharp reflection display is obtained. Furthermore, by this relationship being satisfied, it is possible to implement a clearer reflective display than in the case of utilizing an isotropic scattering film such as is known from the prior art.

Next, to consider each of the polar angles $\theta1$ and $\theta2$, in order to obtain a clearer display than with an isotropic scattering film, ranges of $-40°\leq\theta1<0°$ and $0°<\theta2\leq+40°$ are desirable; and ranges of $-30°\leq\theta1\leq-10°$ and $10°\leq\theta2\leq30°$ are more desirable.

Next, when the parallel beam transmission ratio in the normal direction to the directional frontal scattering diffraction film 18 (directly in front thereof) is defined as T(0, 0), then, in order to obtain a clearer display than with an isotropic scattering film such as is known from the prior art, in the case of $\theta1=-20°$ and $\theta2=20°$, it is desirable for T(0, 0) to be greater than or equal to 3% and to be less than or equal to 50%. And it is more desirable for T(0, 0) to be greater than or equal to 5% and to be less than or equal to 40%. When T(0, 0) is less than 3% then the scattering and the diffraction are too strong and the pattern which is displayed on the display becomes blurred, while when T(0, 0) exceeds 40% then the frontal scattering and diffraction are too weak and the situation becomes close to mirror reflection.

Next, when a range of azimuth angle $\phi m$ of the directional frontal scattering diffraction film 18 of $\phi1 \pm60°$ ($\phi2 \pm60°$) is specified, it is desirable for the absolute maximum of the parallel beam transmission ratio to be attained at $\theta1$ and the absolute minimum value of the parallel beam transmission ratio to be attained at $\theta2$, and also for the ratio between the absolute maximum value and the absolute minimum value to be greater than or equal to 1.5. When this type of characteristic is possessed, since it is possible to scatter and to diffract the light, not only in a single direction of $\phi2$ but also up to an azimuth angle of $\pm60°$, thereby it becomes easy to cope with various environments, and it is possible to implement a clear display.

Next, when the polar angle $\theta n$ of the direction which is orthogonal to the azimuth angle $\phi1$ which gives the maximum transmission ratio and to the azimuth angle $\phi2$ which gives the minimum transmission ratio is varied from −40° to +40°, when over this range the parallel beam transmission ratio is equal to or is greater than the transmission ratio in the normal direction of the directional frontal scattering film, then it is possible to obtain a sharp display with no blurring of the pattern which is displayed on the display, even when the liquid crystal device is observed from a sidewise direction. In other words, it is desirable for it to be arranged to satisfy the relationship T(0, 0)≦T(φ1±90, θ), and to satisfy the relationship T(0, 0)≦T(φ2±90, θ).

Next, in the range of polar angle θn of −60°≦θ≦+60, it is desirable for the parallel beam transmission ratio T(φ, θ) to be greater than or equal to 2%, and to be less than or equal to 50%. In other words, it is desirable for the relationship 2%≦T(φ, θ)≦50% to be satisfied, provided that −60°≦θ≦+60°.

By satisfying this type of relationship, it is possible to obtain a sharp display with no blurring of the pattern which is displayed on the display.

Just by the above described type of directional frontal scattering diffraction film 18 being provided to the liquid crystal panel 10 in the liquid crystal device of this embodiment, the influence upon blurring of the pattern which is displayed on the display is reduced, and a sharp display with no blurring of the pattern which is displayed on the display is obtained. Due to this, it is possible to manage without forming any concavities and convexities in the reflective layer such as with a liquid crystal device of the internal scattering type according to the prior art, and it is possible to reduce the cost of production.

Next, for a directional frontal scattering diffraction film 18 which is arranged so as to direct the polar angle direction and the azimuth angle direction which yield the minimum transmission ratio for the parallel beam transmission ratio towards the light reception side of the liquid crystal panel 10, and so as to direct the polar angle direction and the azimuth angle direction which yield the maximum transmission ratio for the parallel beam transmission ratio towards the observer side of the liquid crystal panel 10, when as shown in FIG. 23, the incident angle with respect to the normal H to the film 18 of the incident light L1 which is incident from the above described light reception side upon the directional frontal scattering diffraction film 18 via the polarization plate 16 and the phase difference plate 19 of this liquid crystal panel 10 is defined as θ, and the diffraction angle with respect to the normal H to the film 18 of the diffracted light L6 which is diffracted when the incident light L1 passes through the directional frontal scattering diffraction film 18 is defined as a, then it is desirable for the absolute value of the diffraction angle α of the diffracted light L6 to be smaller than the absolute value of the incident angle θ of the incident light L1, in other words, for the relationship |α|<|θ| to be satisfied.

When in this manner a directional frontal scattering diffraction film 18 such as one for which the incident light L1 and the diffracted light L6 is able to satisfy the relationship |α|<|θ| is fitted to the liquid crystal device, it is possible to enhance the brightness when observing from, approximately, the surface reflection direction of the liquid crystal panel 10 (the direction in which the angle of the reflected light R1 when the diffracted light L6 is reflected by the reflective layer 31 from the normal H is of the same magnitude as the absolute value of the angle of incidence θ of the incident light L1) displaced from the normal direction H to the panel 10, and a sharp display is obtained.

This is for the following reasons. When the diffraction angle |α| of the diffracted light L6 which has been diffracted when the incident light L1 which is incident upon the light reception side passes through the directional frontal scattering diffraction film 18 is smaller than the incident angle |θ| of the incident light L1, then it is possible for the emitted light R1 which is emitted to the exterior of the liquid crystal panel 10 when the reflected light R1 which is reflected when this diffracted light L6 is reflected by the reflected layer 31 passes through the directional frontal scattering diffraction film 18 to be emitted strongly over a smaller angular range than the regular reflection direction of the incident light L1. In other words, since it is possible for the reflected light R1 from the diffracted light L6 to be emitted strongly in directions which are close to the normal H to the directional frontal scattering diffraction film 18 (to put it in another way, it is possible for the range over which the reflected light R1 of the diffracted light L6 is emitted to be shifted towards the normal direction H), therefore the brightness becomes higher in an angular range which is smaller than the regular reflection direction of the incident light L1, and a bright and sharp display is obtained when the user (observer) E observes from, approximately, the normal direction H of the panel, which is somewhat displaced from the surface reflection direction of the liquid crystal panel 10.

It should be understood that, with the liquid crystal device of this embodiment, although the incident light L1 which is incident into the liquid crystal panel 10 is diffracted when it passes through the directional frontal scattering diffraction film 18, this diffracted light L6 is reflected by the surface of the reflective layer 31, after further having passed through the transparent base plate 17, the color filter layer 20, the overcoat layer 21, the electrode layer 23, the liquid crystal layer 15, the electrode layers 35 (sometimes it also may happen that the diffracted light L6 does not pass through these electrode layers 35), and the overcoat layer 33. The above described |α| of the diffracted light L6 before being reflected by the reflective layer 31 is an angle which includes, apart from the diffraction which is caused by the directional frontal scattering diffraction film 18, the refraction which is generated by it passing through at least the transparent base plate 17.

To explain by presenting a concrete example, normally, when the user (the observer) observes the liquid crystal device, the reflected light R1 of the incident light L1 such as illumination light etc. which is incident upon the liquid crystal panel 10 slantingly within the range of from 20° to 35° with respect to the normal H to the liquid crystal panel 10 is observed from a direction of from −30° to 0° removed from the regular reflection direction (a range of from −20° to −35° with respect to the normal H) with respect to the normal H (the observation angle γ of the observer E is in the range of from −30° to 0° with respect to the normal H). Due to this, when the incident light L1 which is incident from the above described light reception side passes through the directional frontal scattering diffraction film 18, when the diffraction angle α of the diffracted light L6 which has been diffracted is an angle less than −35° to −20° with respect to the normal H (i.e. |α| is a value less than 35° to 20° with respect to the normal), then the reflected light R1 of this diffracted light L6 (this reflected light R1 is the emitted light R1 which is emitted to the outside of the liquid crystal panel 10) is also strongly emitted within an angular range which is less than −35° to −20° with respect to the normal H (i.e., the absolute value of the angle α2 with respect to the normal H of the reflected light R1 of the diffracted light L6 is within an angular range of less than 35° to 20°). In other words, it is possible to cause the reflected light R1 of the diffracted light L6 to be emitted strongly (in great quantity) over a smaller angular range than the regular reflection direction of the incident light L1 (or, to put it in another way, it is possible to cause the range over which the reflected light R1 of the diffracted light L6 is emitted to be shifted towards the normal direction H). Due to this, the brightness of the incident light L1 over a smaller angular range than the regular reflection direction (an angular range of which the absolute value of the angle with respect to the normal H is smaller than 35° to 20°) is increased, and a bright and sharp display is obtained when the user (observer) E observes from a direction somewhat deviated from the surface reflection direction of the liquid crystal panel 10 and approximately the normal direction H to the panel.

It should be understood that here the direction of incident light L1 which is incident from the left side in FIG. 23 with respect to the normal H is taken as the + direction, while the direction of incident light L1 which is incident from the right side in FIG. 23 with respect to the normal H is taken as the − direction. Furthermore, the direction of emitted light (reflected light) R1 which is emitted to the left side in FIG. 23 with respect to the normal H is taken as the + direction, while the direction of emitted light (reflected light) R1 which is emitted to the right side in FIG. 23 with respect to the normal H is taken as the − direction. Yet further, the observation direction (observation angle) looking from the left side in FIG. 23 with respect to the normal H is taken as the + direction, while the observation direction (observation angle) looking from the right side in FIG. 23 with respect to the normal H is taken as the − direction.

Furthermore, by making the above described directional frontal scattering diffraction film 18 so that it satisfies the relationship defined by $5° \leq |\theta|-|\alpha| \leq 20°$, it is possible securely to enhance the brightness when observing from a direction somewhat deviated from the surface reflection direction of the liquid crystal panel 10 and approximately the normal direction H to the panel, and this is desirable from the point of view of providing a sharp display.

Thus, when it is supposed that the user (observer) E observes the display of the liquid crystal device at an observation angle γ (the angle from the normal H to the liquid crystal panel 10), since normally the absolute value of the above described observation angle γ is smaller than the absolute value of the angle of incidence θ of the incident light L1 which is incident upon the liquid crystal panel 10 (the angle from the normal H to the liquid crystal panel 10), and since, furthermore, it often happens that the absolute value of the above described observation angle γ is from 5° to 20° smaller than the absolute value $|\theta|$ of the angle of incidence, when the range of the difference between the above described $|\theta|$ and the above described $|\alpha|$ is from 5° to 20°, therefore it is possible for the reflected light R1 of the above described diffracted light L6 to be emitted strongly (in great quantity) at a direction towards the normal direction from the regular reflection direction of the above described incident light L1 by 5° to 20°, and a bright and sharp display is obtained when the display is observed at an observation angle $|\gamma|$ which is from 5° to 20° smaller than the absolute value $|\theta|$ of the angle of incidence.

Twelfth Embodiment of the Liquid Crystal Device

Figure 24:
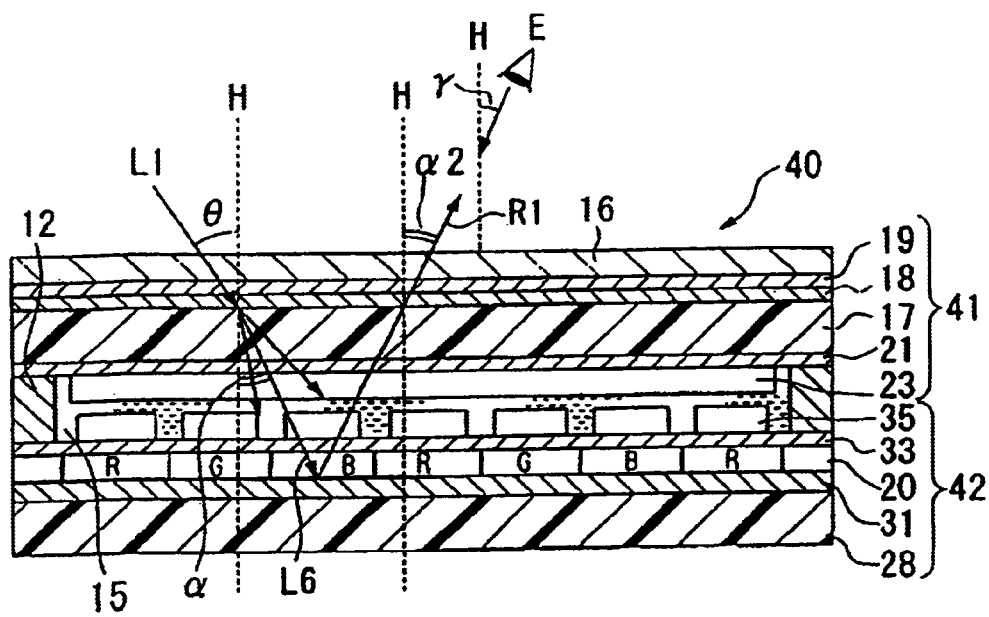
FIG. 24 is a partial sectional view of a liquid crystal panel incorporating the liquid crystal device of the twelfth embodiment of the present invention.

In FIG. 24, there is shown a partial sectional view of a liquid crystal panel 40 which incorporates a liquid crystal device according to the twelfth embodiment of the present invention.

The liquid crystal panel 40 of this embodiment is one of a simple matrix structure of the reflective type, and comprises a directional frontal scattering diffraction film 18 the same as the liquid crystal device of the previously described eleventh embodiment which was explained based upon FIG. 1, FIG. 23, and FIG. 3; and, since the basic structure is the same as the eleventh embodiment, the same reference symbols will be affixed to the same structural elements and the explanation of those structural elements will be curtailed, and in the following principally the differing structural elements will be explained.

The liquid crystal panel 40 of this embodiment is made up by sandwiching a liquid crystal layer 15 which is surrounded by a seal member 12 between a base plate unit 41 and a base plate unit 42 which are opposed to one another. In the upper side base plate unit 41, since the color filter layer 20 in the base plate unit 13 of the previously described eleventh embodiment has been curtailed, a color filter layer 20 is laminated over the reflective layer 31 of the lower side base plate unit 42 on the opposite side, and thus the structure of this portion differs from the structure of the previously described eleventh embodiment. In other words, the liquid crystal panel 40 shown in FIG. 24 is structured with the color filter layer 20, which in the previously described eleventh embodiment was provided on the base plate unit 13 side on the upper side (the observer side), being provided on the base plate unit 42 side on the lower side (the opposite side to the observer side) of the liquid crystal layer 15. Although the structure of the color filter layer 20 is the same as the structure of the eleventh embodiment, since the color filter layer 20 is formed upon the upper surface side of the base plate 28, accordingly the up and down direction of the lamination structure of the color filter layer 20 is reversed with respect to the state of FIG. 3.

In the structure of this twelfth embodiment as well, since the directional frontal scattering film 18 is provided identically to the structure of the previously described eleventh embodiment, it is possible to obtain the identical beneficial results to the structure of the previously described eleventh embodiment, with relation to blurring of the pattern which is displayed on the reflective display.

Furthermore, since just by the above described type of directional frontal scattering diffraction film 18 being provided to the liquid crystal panel 40, the influence upon blurring of the pattern which is displayed on the display is reduced, and a sharp display with no blurring of the pattern which is displayed on the display is obtained, therefore it is possible to manage without forming any concavities and convexities in the reflective layer such as with a liquid crystal device of the internal scattering type according to the prior art, and it is possible to reduce the cost of production.

Furthermore, since with this directional frontal scattering diffraction film 18, just as with the structure of the previously described eleventh embodiment, it is arranged for it to be possible for the incident light L1 which is incident upon the film 18 from the light reception side and the diffracted light L6 of this incident light L1, to satisfy the above described relationship $|\alpha|<|\theta|$, therefore it is possible to enhance the brightness when observing from, approximately, the normal direction H to the panel 10, which is displaced from the surface reflection direction of the liquid crystal panel 10, and a sharp display is obtained.

Furthermore, with the liquid crystal device shown in FIG. 24, there is the particular characteristic that it is difficult for any problem of color deviation to occur, since the color filter layer 20 is formed directly over the reflective layer 31, and since the light which is incident upon the liquid crystal panel 40 arrives at the reflective layer 31 via the liquid crystal layer 15, and passes through the color filter 32 directly after being reflected.

Thirteenth Embodiment of the Liquid Crystal Device

Figure 25:
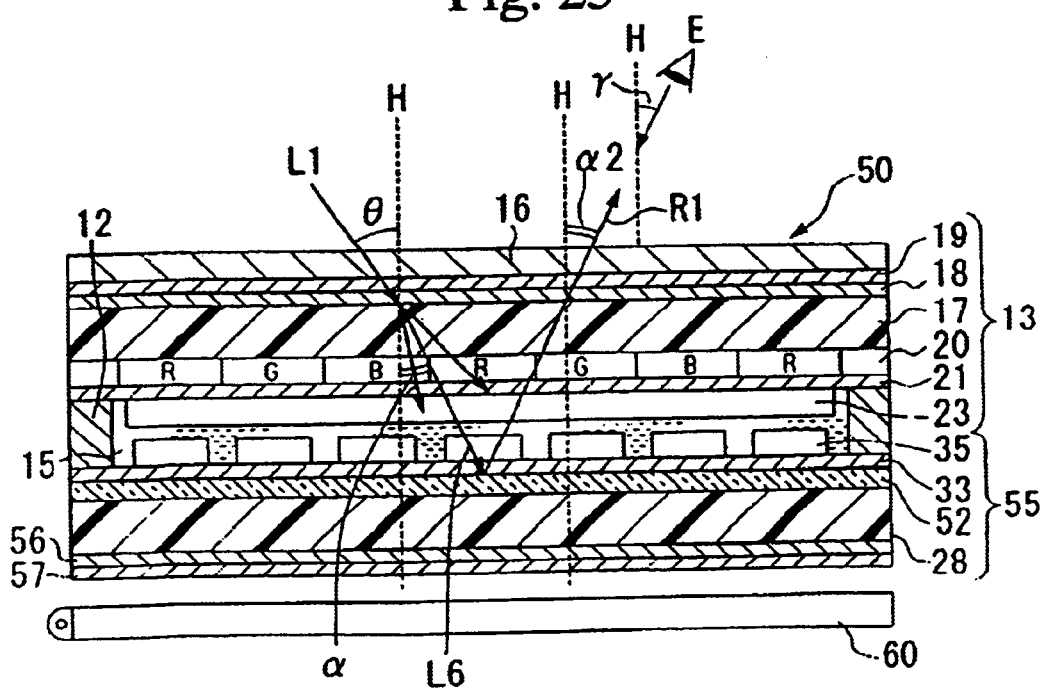
FIG. 25 is a partial sectional view of a liquid crystal panel incorporating the liquid crystal device of the thirteenth embodiment of the present invention.

In FIG. 25 there is shown a partial sectional view of a liquid crystal panel 50 which incorporates a liquid crystal device according to the thirteenth embodiment of the present invention.

The liquid crystal panel 50 which is included in the liquid crystal device of this embodiment is one of a simple matrix structure of the semi-transparent reflective type which comprises a base plate unit 55 which is provided with a semi-transparent reflective layer 52, instead of the reflective layer 31 which was provided to the liquid crystal panel 10 of the previously described eleventh embodiment which was explained based upon FIG. 1, FIG. 23, and FIG. 3. With regard to its other basic structures, to portions which are identical to ones of the eleventh embodiment the same reference symbols will be affixed and the explanation of those structural elements will be curtailed, and in the following principally the differing structural elements will be explained.

The features in which the structure of this liquid crystal panel 50 differs from that of the eleventh embodiment, are: that the semi-transparent reflective layer 52 is provided; furthermore, that a light source (illumination device) 60 such as a back light or the like is provided at the back side (the lower side in FIG. 8) of the liquid crystal panel 50; and that a phase difference plate 56 and a polarization plate 57 are provided.

It should be understood that, in the case of use for a transparent type liquid crystal device, it is necessary for the base plate 28' on the lower side to be made from a transparent base plate such as glass or the like.

For the semi-transparent reflective layer 52, it is possible to employ an appropriate one such as is widely used in semi-transparent reflective type liquid crystal display devices, such as a semi-transparent reflective layer of sufficient thickness (for example, a thin film of Al or a thin film of Ag of film thickness of a few hundred angstroms) for allowing the passage of the transmitted light which is generated by the light source 60 such as a back light or the like on the back side (the lower side in FIG. 8), or a structure whose optical transparency is enhanced by the formation of a large number of minute through holes in a portion of the reflective layer, or the like.

With the liquid crystal device of this thirteenth embodiment, it is possible to apply it as a liquid crystal display of the transparent type when transmitted light from the light source 60 such as a back light or the like is employed, or when no light from any light source is employed, it can be employed as a reflective type liquid crystal display device by performing reflective display utilizing ambient light.

And, when the display is being employed as a reflective type liquid crystal display device, just as in the case of the previously described eleventh embodiment, due to the existence of the directional frontal scattering diffraction film 18, it is possible to obtain a display of a sharp reflective type in which blurring of the pattern which is displayed on the display have been eliminated. Furthermore, with the liquid crystal device of this embodiment, just by the above described type of directional frontal scattering diffraction film 18 being provided to the liquid crystal panel 50, the influence upon blurring of the pattern which is displayed on the display is reduced, and a sharp display with no blurring of the pattern which is displayed on the display is obtained. Therefore, it is possible to manage without forming any concavities and convexities in the reflective layer such as with a liquid crystal device of the internal scattering type according to the prior art, and it is possible to reduce the cost of production. Furthermore since with this directional frontal scattering diffraction film 18, just as with the structure of the previously described eleventh embodiment, it is arranged for it to be possible for the incident light L1 which is incident upon the film 18 from the light reception side and the diffracted light L6 of this incident light L1, to satisfy the above described relationship $|\alpha|<|\theta|$, therefore it is possible to enhance the brightness when observing from, approximately, the normal direction H to the panel 10, which is displaced from the surface reflection direction of the liquid crystal panel 10, and a sharp display is obtained.

Fourteenth Embodiment of the Liquid Crystal Device

Figure 26:
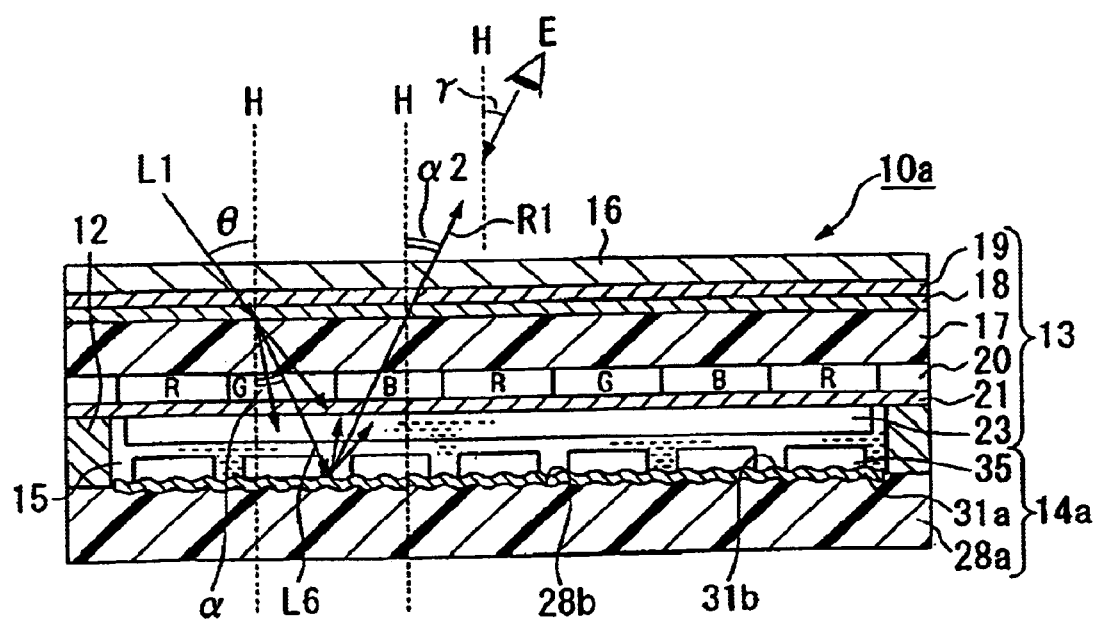
FIG. 26 is a partial sectional view of a liquid crystal panel incorporating the liquid crystal device of the fourteenth embodiment of the present invention.

In FIG. 26 there is shown a partial sectional view of a liquid crystal panel 10a which incorporates a liquid crystal device according to the fourteenth embodiment of the present invention.

The liquid crystal panel 10a which is included in the liquid crystal device of this embodiment is one of a simple matrix structure of the reflective type which comprises a base plate unit 14a provided with a reflective layer 31a which is formed on its surface with minute concavities and convexities 31b, instead of the reflective layer 31 which was provided to the liquid crystal panel 10 of the previously described eleventh embodiment which was explained based upon FIG. 1, FIG. 23, and FIG. 3. With regard to its other basic structures, to portions which are identical to ones of the eleventh embodiment the same reference symbols will be affixed and the explanation of those structural elements will be curtailed, and in the following principally the differing structural elements will be explained.

The features in which the structure of this liquid crystal panel 10a differs from that of the eleventh embodiment, are: that the reflective layer 31a is formed with the minute concavities and convexities 31b upon its surface; and furthermore, that minute concavities and convexities 28b are formed upon the surface of the base plate 28a which is under the reflective layer 31a.

Accordingly, in this embodiment, between this base plate 28a and the reflective layer 31a there is interposed no overcoat layer 33 such as the one which was provided in the eleventh embodiment.

As one example of a means for forming the minute concavities and convexities 31b upon the reflective layer 31a in the liquid crystal device of this embodiment, for example, it is possible to propose a method of forming such minute concavities and convexities by forming the minute concavities and convexities 28b upon the surface of the base plate 28a, and then forming a metallic thin film over them, so as to cause the minute concavities and convexities 28b upon the surface of the base plate 28a to be mirrored in the metallic thin film, or the like. In concrete terms, a so called frosting method of etching the surface of the glass base plate which is used as the base plate 28a by using hydrofluoric acid, or a sandblasting method of forming concavities and convexities by colliding minute particles with the glass base plate, are known. The frosting method is a method of forming minute concavities and convexities by using a supersaturated solution including specified elements which are included in glass, coating the supersaturated solution, attaching the specified elements at the surface of the glass substrate for the base plate 28a, and selectively etching the glass surface by etching between adhesions and this supersaturated solution. When at least a metallic thin film is formed upon the concave and convex surface of the glass surface which has been formed in this manner, the reflective layer 31 is obtained which possesses the minute concavities and convexities 31b upon its surface. Furthermore, it will also be acceptable to form the convexities and concavities using a photopolymer.

With the liquid crystal device of this embodiment, just as with the previously described eleventh embodiment, due to the existence of the directional frontal scattering diffraction film 18, blurring of the pattern which is displayed on the display is eliminated, and a display of a sharp reflective type is obtained.

Furthermore, since with this directional frontal scattering diffraction film 18, just as with the structure of the previously described eleventh embodiment, it is arranged for it to be possible for the incident light L1 which is incident upon the film 18 from the light reception side and the diffracted light L6 of this incident light L1, to satisfy the above described relationship $|\alpha|<|\theta|$, therefore it is possible to enhance the brightness when observing from, approximately, the normal direction H to the panel 10, which is displaced from the surface reflection direction of the liquid crystal panel 10, and a sharp display is obtained.

Furthermore, since with the liquid crystal device of this embodiment the minute concavities and convexities 31b are formed upon the surface of the reflective layer 31a which is provided internally to the liquid crystal panel 10a, thereby, when the diffracted light L6 which is generated when the incident light L1 which is incident upon this liquid crystal panel 10a passes through the directional frontal scattering diffraction film 18 is employed, it is possible to obtain a sharp color display which is bright and which is not subject to blurring, without giving any attention to regular reflection from the surface of the liquid crystal panel.

Fifteenth Embodiment of the Liquid Crystal Device

Figure 27A:
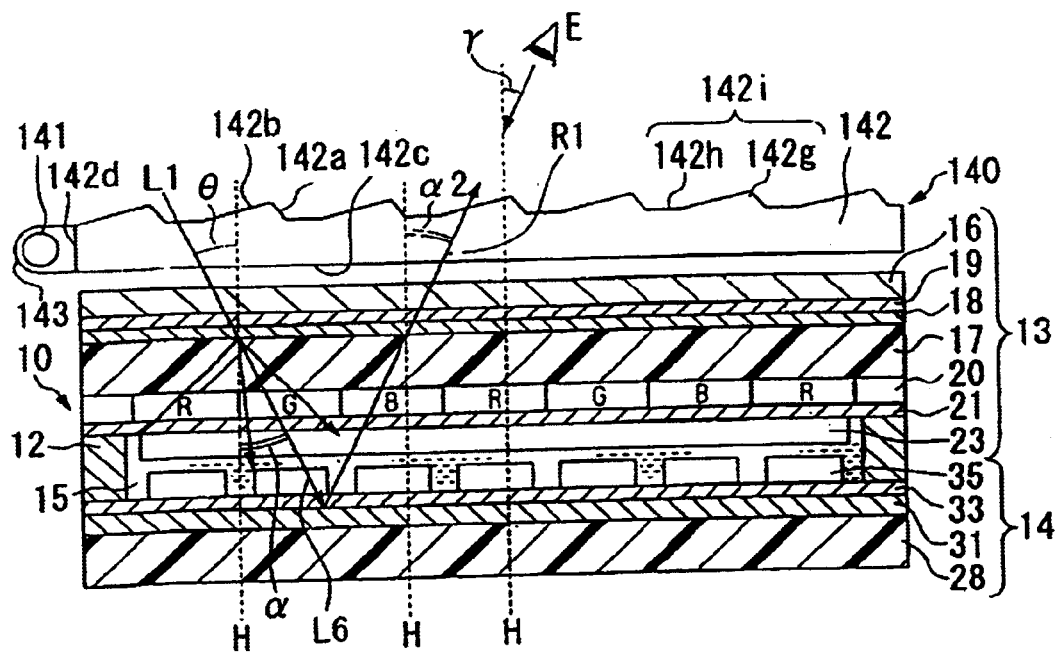
FIGS. 27A and 27B are partial sectional figures showing the liquid crystal device of the fifteenth embodiment of the present invention.
Figure 27B:
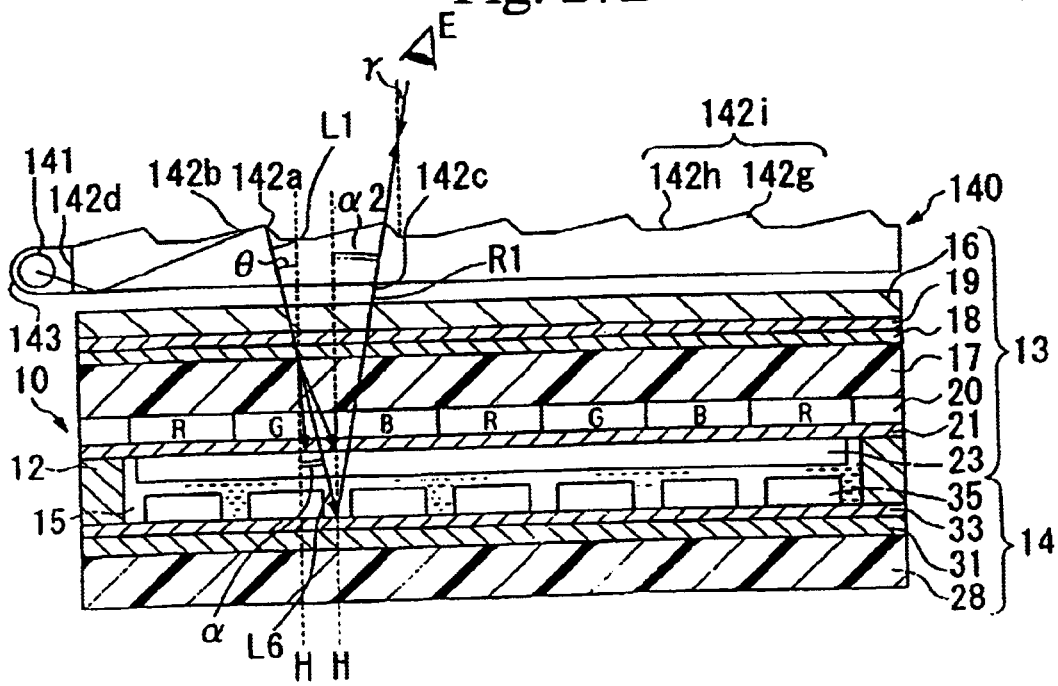

In FIGS. 27A and 27B there are shown partial sectional views of a liquid crystal device according to the fifteenth embodiment of the present invention; FIG. 27A is a figure showing the case when the reflection display is not employing a front light, while FIG. 27B is a figure showing the case when the reflection display is employing the front light.

With the liquid crystal device of this embodiment, a front light (a light generating element in a sheet shape) 40 which emits illumination light towards the liquid crystal panel 10 is provided on the opposite side to the other base plate 17 of the directional frontal scattering diffraction film 18 of this liquid crystal panel 10 of the eleventh embodiment which was explained based upon the previously described FIG. 1, FIG. 23, and FIG. 3 (i.e., upon the side of the polarization plate 16 opposite to the phase difference plate 19 side). With regard to its other basic structures, to portions which are identical to ones of the eleventh embodiment the same reference symbols will be affixed and the explanation of those structural elements will be curtailed, and in the following principally the differing structural elements will be explained.

The front light 140 is made from a light source 141 such as a cold cathode tube or a fluorescent light tube or plurality of white colored LEDs or the like, a transmission plate 142 which is formed in plate shape so as to conduct the light from the light source 141 in from the end surface 142d and rightwards in the figure, and a reflection plate 143 which is arranged to surround the light source 141. As a material from which the transmission plate 142 may be made, a transparent material such as transparent acryl resin, polystyrene, transparent polycarbonate, or the like is proposed.

Upon the surface (the plate surface) of the transmission plate 142 there are provided concavities and convexities 142i which are formed periodically towards the right side in the figure by convex portions 142g which are formed from steep sloping surface portions 142a which serve as working surface portions and gently sloping surface portions 142b which serve as transparent surface portions adjacent to the projecting ends of the steep sloping surface portions 142a, and by planar portions (transparent surface portions) 142h which are adjacent to the convex portions 142g. These steep sloping surface portions 142a and gently sloping surface portions 142b are each made in stripe form so as to extend in the lengthwise direction of the transmission plate 142 (the direction from the viewer through the drawing paper in FIG. 27). The steep sloping surface portions 142a which are formed upon the transmission plate 142 and serve as working surface portions are provided upon the side which faces the light source 141 (so as to confront the light source 141).

On the other hand, the rear surface 142c of the transmission plate 142 (the plate surface on the other side) is formed as planar.

Here the light source 141 does not always provide lighting, but rather is a device which provides lighting upon a command of a user E or of a sensor, only in circumstances in which it is dark such as when there is almost no ambient lighting (external light). Accordingly, when the light source 141 is providing lighting, as shown in FIG. 27B, this display comes to perform reflective display by functioning as a reflective type display, due to the illumination light L1 from the front light 140, after it has been propagated within the transmission plate 42, being emitted within the liquid crystal panel 10 as illumination light (incident light) and being reflected by the reflective layer 31 surface.

On the other hand, when the light source 141 is turned off, then this display comes to perform reflective display by functioning as a reflective type display, due to the incident light L1 which is incident into the liquid crystal panel 10 from the upper surface side (the surface side of the transmission plate 142) of the liquid crystal device 141 being reflected by the reflective layer 31, as shown in FIG. 27A.

With this liquid crystal device of the fifteenth embodiment, it can function as a transparent type liquid crystal display when it employs transmitted light from the light source 60 such as a back light or the like, while it can be employed as a reflective type liquid crystal display device by performing reflective display using ambient light, when light from the light source is not being employed.

With this liquid crystal device according to the fifteenth embodiment, either in the case when it is being employed as a reflective display with the light source 141 turned off, or in the case when it is being employed as a reflective display with the light source 141 turned on, it is possible to eliminate blurring of the pattern which is displayed on the display and to provide a display of the sharp reflective type, due to the existence of the directional frontal scattering diffraction film 18. Furthermore, with the liquid crystal device of this embodiment, just by providing the directional frontal scattering film 18 of the above described type, the influence with regard to blurring of the pattern which is displayed on the display is reduced, and a sharp display with little blurring of the pattern which is displayed on the display is obtained. Due to this, it is possible to manage without any system of concavities and convexities upon the reflective layer of the liquid crystal device such as the internal scattering system of the prior art, so that it is possible to reduce the cost of production.

Furthermore since, when it is being employed as a reflective display with the light source 141 being turned off, with this directional frontal scattering diffraction film 18, just as with the structure of the previously described eleventh embodiment, it is arranged for it to be possible for the incident light L1 which is incident upon the film 18 from the light reception side and the diffracted light L6 of this incident light L1, to satisfy the above described relationship $|\alpha|<|\theta|$, therefore it is possible to enhance the brightness when observing from, approximately, the normal direction H to the panel 10, which is displaced from the surface reflection direction of the liquid crystal panel 10, and a sharp display is obtained.

Moreover, when it is being employed as a reflective display with the light source 141 being illuminated as well, the brightness of a smaller angular range than the regular reflection direction of the incident light L1 which has been emitted from the light source 141 as illumination light L1 and has passed through the directional frontal scattering diffraction film 18 and has been incident into the liquid crystal panel 1010 becomes great, and a bright and sharp display is obtained when the user (the observer) E observes from, approximately, the normal direction H to the panel 10, which is displaced from the surface reflection direction of the liquid crystal panel 10.

Sixteenth Embodiment of the Liquid Crystal Device

Figure 28:
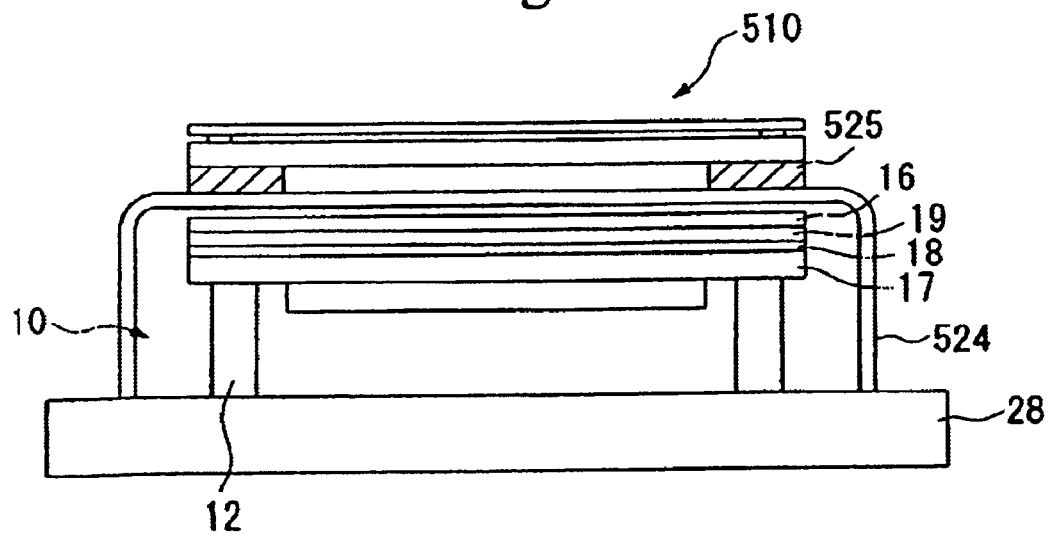
FIG. 28 is an outline sectional figure showing the liquid crystal device of the sixteenth embodiment of the present invention.
Figure 29:
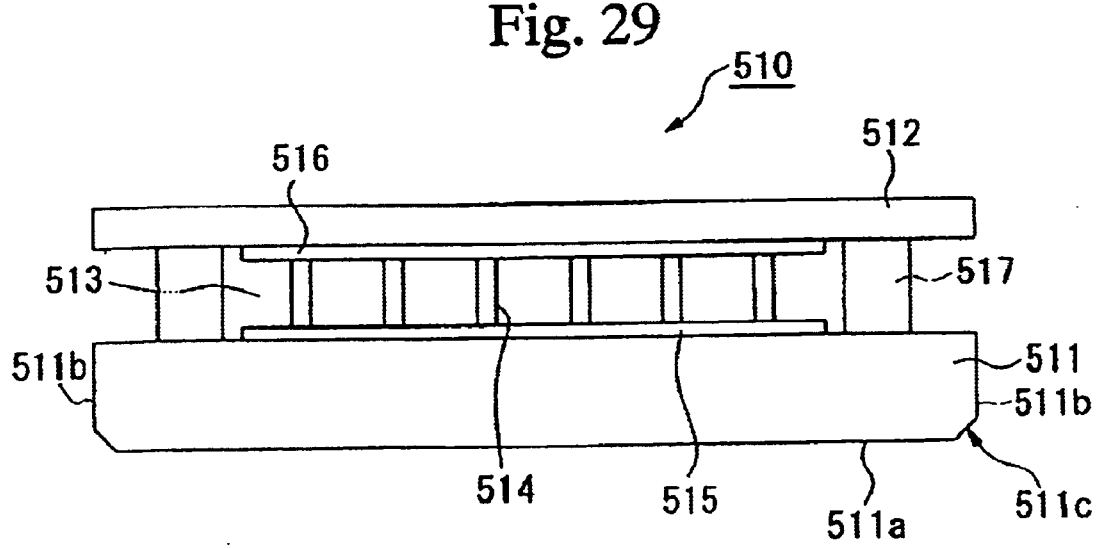
FIG. 29 is a sectional figure showing an outline of the structure of a touch panel which incorporates the liquid crystal device of FIG. 28.

In FIG. 28 there is shown a partial sectional view of a liquid crystal panel which incorporates a liquid crystal device according to the sixteenth embodiment of the present invention, and FIG. 29 is a sectional view showing the outline structure of a touch panel (input device) which is provided to the liquid crystal device of FIG. 28.

As shown in FIG. 28, the display device of this embodiment is one in which a touch panel 510 is fitted upon the side of the directional frontal scattering diffraction film 18 of the liquid crystal panel 10 of the liquid crystal device of the eleventh embodiment opposite to the other base plate 17 (i.e. to the side of the polarization plate 16 opposite to the side of the phase difference plate 19). With regard to its other basic structures, to portions which are identical to ones of the eleventh embodiment the same reference symbols will be affixed and the explanation of those structural elements will be curtailed, and in the following principally the differing structural elements will be explained.

The liquid crystal panel 10 is used as a display means which displays information which has been inputted by the touch panel 510. A frame 524 which is made from metal or the like is provided upon the side of the polarization plate 16 of the liquid crystal panel 10 opposite to the phase difference plate 19.

The touch panel 510 is fixed to the upper side of the liquid crystal panel 10 by being adhered to both sides of the frame 524 by double sided tape 525.

In the touch panel 510, as shown in FIG. 29, a lower side base plate 511 and an upper side base plate 512 are arranged to oppose one another at a predetermined interval, and they are adhered in place by a seal 517 which is obtained by drawing double sided tape. The lower side base plate 511 is transparent, and the corner portions 511c formed by its outer side surface 511a and its end surfaces 511b are beveled. Furthermore, the upper side base plate 512 is transparent and flexible. And a lower side transparent electrode 515 and an upper side transparent electrode 516 which are made from indium tin oxide (ITO) or the like are formed, respectively, upon the inner surfaces of the lower side base plate 511 and the upper side base plate 512, over virtually their entire surfaces which correspond to the range over which input is to be performed by a finger or a pen or the like.

Furthermore, a lower side lead wire connection portion (omitted from the drawing) is provided following along the sides of the lower side transparent electrode 515 on both sides (the two mutually opposing sides) (omitted from the drawing), for connecting between the lower side transparent electrode 515 and lead wires; and also an upper side lead wire connection portion (omitted from the drawing) is provided following along the sides of the upper side transparent electrode 516 on both sides (the two mutually opposing sides) (omitted from the drawing), for connecting between the upper side transparent electrode 516 and lead wires. The above described lower side lead wire connection portion and the above described upper side lead wire connection portion are made from a material of low resistance such as silver or the like, and are arranged so as to mutually intersect one another. And the above described lower side lead wire connection portion is connected to lead wires, while the above described upper side lead wire connection portion is also connected to lead wires.

Furthermore, an empty layer 513 is sandwiched between the lower side base plate 511 upon which the lower side transparent electrode 515 is formed, and the upper side base plate 512 upon which the upper side transparent electrode 516 is formed (i.e., between the lower side transparent electrode 515 and the upper side transparent electrode 516). Moreover, a spacer 514 is arranged between the lower side transparent electrode 515 and the upper side transparent electrode 516 in order for there to be no connection between the lower side transparent electrode 515 and the upper side transparent electrode 516, in the state in which no input is being performed by a finger or a pen or the like.

It should be understood that, in this embodiment, the upper side base plate 512 side of the touch panel 510 becomes its user side, while its lower side base plate 511 side becomes its side at which the liquid crystal panel 10 is fitted to the touch panel 510.

With a liquid crystal device to which is fitted a touch panel 510 which uses a low resistance contact method such as the one described above being provided over the liquid crystal panel 10, the structure becomes one which is capable of performing determination of position, due to contact being made between the lower side transparent electrode 515 and the upper side transparent electrode 516 by deformation of the spot upon the upper side base plate 512, which is endowed with flexibility, which has been depressed due to pressure by a finger or a pen or the like initiated by the person who is performing input.

With this liquid crystal device of the sixteenth embodiment, just as with the previously described eleventh embodiment, it is possible to obtain a display of a sharp reflective type in which blurring of the pattern which is displayed on the display has been eliminated, due to the existence of the directional frontal scattering diffraction film 18. Furthermore, it is possible to enhance the brightness during observation from, roughly, the normal direction to the panel 10, which is deviated from the surface reflection direction of the liquid crystal panel 10, and a sharp display is obtained.

It should be understood that although, with regard to the liquid crystal device of the sixteenth embodiment, the explanation has been in terms of the case in which the touch panel 510 has been provided above a liquid crystal device which was identical to that of the eleventh embodiment, it would also be acceptable for it to be provided above a liquid crystal panel of a liquid crystal device according to the twelfth through the fifteenth embodiments.

It should be understood that, in the eleventh through sixteenth embodiments, the above described $|\alpha|$ of the diffracted light is an angle which includes, apart from the diffraction which is generated by the directional frontal scattering diffraction film 18, also refraction which is generated by passage through the transparent base plate 17 and the like.

Furthermore, with the liquid crystal devices of the eleventh through the sixteenth embodiments, it would also be acceptable to provide an optically transparent protective plate which was made from acryl or the like, upon the side of the directional frontal scattering diffraction film 18 which is opposite to the side of the other base plate, or to the side of the front light 140 which is opposite to the side of the directional frontal scattering diffraction film 18, or to the side of the touch panel 510 which is opposite to the side of the directional frontal scattering diffraction film 18, or to the side of the touch panel (input device) which is opposite to the side of a planar light generation element.

It should be understood that although, in the eleventh through the sixteenth embodiments, by way of example, the application of the present invention to a reflective type liquid crystal display device, or to a semi-transparent reflective type liquid crystal display device, of a simple matrix type has been explained, it is of course also acceptable to apply the present invention to a reflective type liquid crystal display device, or to a semi-transparent reflective type liquid crystal display device, of an active matrix type which is equipped with a two terminal type switching element or with a three terminal type switching element.

In the case of application to those active matrix type liquid crystal display devices, instead of the electrodes in stripe form shown in FIG. 23, FIG. 24, FIG. 25, FIG. 26, FIG. 27, and FIG. 28, the present invention can, of course, be applied to a liquid crystal display device of a TFT (thin film transistor) type drive type structure, in which a common electrode is provided on the side of one of the base plates, and, on the side of the other one of the base plates, a large number of pixel electrodes are provided, one for each pixel, and driving is performed for each one of the pixel electrodes using a thin film transistor which is a three terminal type switching element; or to a liquid crystal display device of a two terminal type linear element drive type, in which electrodes in stripe form are provided on the side of the one base plate elements, while pixel electrodes are provided on the side of the other one of the base plates, one for each pixel, with a thin film diode, which is a two terminal type linear element, driving each of these pixel electrodes; or the like. For either of these types of liquid crystal display device, the present invention has the distinguishing feature that it can extremely easily be applied to various ones of the embodiments of the liquid crystal display device, since it can be applied by only arranging the directional frontal scattering diffraction film in the above described specified direction to the liquid crystal panel.

TEST EXAMPLE 23

Measurement tests were performed using a directional frontal scattering diffraction film manufactured by a transparent type hologram technique.

Light from a halogen lamp light source (disposed at a position separated by 300 mm from the directional frontal scattering film) was illuminated upon the central portion of the surface of a directional frontal scattering film of 50 mm×40 mm rectangular form in plan view arranged horizontally; a light receiving portion (disposed at a position separated by 300 mm from the directional frontal scattering diffraction film) which had a light receiving element made from CCDs was set up upon the rear surface side of the directional frontal scattering film in various directions which were squarely opposed with respect to the incident light from the light source; the polar angle and azimuth angle of the light source were regulated as shown in FIG. 4; and the parallel beam transmission ratio at an angular error within ±2° was measured by the light receiving portion.

The polar angle θn of the light source (the angle of incidence of the incident light with respect to the normal to the frontal scattering diffraction film) was adjusted within a range of ±60°, and the results of measuring the parallel beam transmission ratio (in %) for each polar angle are shown in FIG. 10. Furthermore, with regard to the azimuth angle, the data were also measured for each of 0°, +30°, +60°,+90°, and +180° (which are all the rightwards rotational direction as shown in FIG. 10) and for each of −30°, −60°, and −90° (which are all the leftwards rotational direction as shown in FIG. 10), and these are shown all together in FIG. 10.

From the results shown in FIG. 10, the measurement results in the cases of 0° and +180° give exactly the same curve, and the relationship between the maximum transmission ratio Tmax and the minimum transmission ratio Tmin of the parallel transmitted light becomes (Tmax/Tmin) ≈50:6≈8.33, i.e. a value which exceeds the value of 2 which is desired for the present invention.

Here it will be understood that, when the maximum transmission ratio of the parallel transmitted light is being exhibited, the amounts of scattering and diffraction are small (the scattered light and the diffracted light are weak), while, when the minimum transmission ratio of the parallel transmitted light is being exhibited, the amounts of scattering and diffraction are large (the scattered light and the diffracted light are strong).

Next, the results of performing the same measurement tests of transmission ratio using a different directional frontal scattering diffraction film whose scattering and diffraction intensity were omnidirectional in orientation are shown in FIG. 11. Furthermore, the results of performing the same measurement tests of transmission ratio using a different directional frontal scattering diffraction film are shown in FIG. 12.

When the characteristic shown in FIG. 11 is considered, the relationship between the maximum transmission ratio Tmax and the minimum transmission ratio Tmin of the parallel transmitted light becomes (Tmax/Tmin)≈12:3≈4, thus yielding a value which exceeds the value of 2 which is desired for the present invention.

When the characteristic shown in FIG. 12 is considered, the relationship between the maximum transmission ratio Tmax and the minimum transmission ratio Tmin of the parallel transmitted light becomes (Tmax/Tmin)≈52:26≈2, thus yielding the value of 2 which is desired for the present invention.

Furthermore, with any one of the directional frontal scattering diffraction films shown by way of example in FIG. 10, FIG. 11, and FIG. 12, in the range of ±60°, it was clear that, roughly, the maximum and the minimum numerical values were at almost the same angle. For example, from the results shown in FIG. 10, the absolute maximum value was at the polar angle of −30° and the absolute minimum value was at the polar angle of +23°; from the results shown in FIG. 11, the absolute maximum value was at the polar angle of −20° and the absolute minimum value was at the polar angle of +18°; and, from the results shown in FIG. 12, the absolute maximum value was at the polar angle of −30° and the absolute minimum value was at the polar angle of +25°.

Next, for the directional frontal scattering diffraction films shown by way of example in FIG. 10, FIG. 11, and FIG. 12, when $\phi$m was ±90°, in any of the examples, it was ascertained that the transmission ratio was the lowest when the polar angle θ was 0. Furthermore, for the directional frontal scattering diffraction films shown by way of example in FIG. 10, FIG. 11, and FIG. 12, it was also clear that for the transmission ratio in all conditions, it was always within the range of 2% to 50%.

Next, the transmission ratio of the directional frontal scattering film was measured while varying the azimuth angle φm while keeping the polar angle θn fixed, or to put it in other words, while rotating only the directional frontal scattering diffraction film in the horizontal plane, and the results are shown in FIG. 13.

According to the results shown in FIG. 13, although the state for the condition θn=0° in which the light was incident in the normal direction to the directional frontal scattering diffraction film is shown, almost the same transmission ratio was exhibited, while in the case of θn=−20°, −40°, and −60°, over the range 0±90° of azimuth angle, the transmission ratio followed a curve which was convex to the upper side and attained a maximum; and, in the case of θn=+20°, +40°, and +60°, over the range 0±90° of azimuth angle, the transmission ratio showed a tendency to follow a curve which was convex to the lower side (concave to the upper side) and attained a minimum. From this fact it is vividly shown that the directional frontal scattering film which was used in this embodiment exhibited maxima and minima of transmission ratio, according to polar angle and azimuth angle. In other words, for the directional frontal scattering diffraction film used in this embodiment, the amounts of scattering and diffraction were small when the transmission ratio was at a maximum (the scattered light and the diffracted light were weak), while the amounts of scattering and diffraction were great when the transmission ratio was at a minimum (the scattered light and the diffracted light were strong).

From the results shown in FIG. 14, it is clear that almost no variation was seen in the transmission ratio of the parallel transmitted light for any azimuth angle, and that, along with almost overlapping into a single curve, it attained its maximum when the polar angle was 0°, and only varied by approximately a few percent even when the polar angle was varied through the + region or through the − region. From these results, it is clear that the beneficial results of the present invention were not obtained even when an isotropic frontal scattering film according to the prior art was used in the liquid crystal device.

TEST EXAMPLE 24

Next, the brightness of a reflective type color liquid crystal display device in an office under lighting by fluorescent lamps was compared, as the polar angle θ1 and the polar angle θ2 of the previously described test were varied. For this brightness, comparison was made with a reflective type color liquid crystal display device which employed an isotropic frontal scattering film according to the prior art (the reflective type color liquid crystal display device employing an isotropic scattering film which was used for the measurements shown in the previously described FIG. 14), and those which could be perceived as brighter than the reflective type color liquid crystal display device according to the prior art are shown in the following Table 16 by "○", those which were the same by "Δ", and those which were darker by "X".

TABLE 16

| θ1 (°) | −80 | −70 | −60 | −50 | −40 | −30 | −20 | −10 | 0 |
|---|---|---|---|---|---|---|---|---|---|
| θ2 (°) | 0 | 0 | 0 | 0 | 0 | 0 | 0 | 0 | 0 |
| Results of Evaluation | x | x | x | x | x | Δ | Δ | Δ | x |
| θ1 (°) | −80 | −70 | −60 | −50 | −40 | −30 | −20 | −10 | 0 |
| θ2 (°) | 10 | 10 | 10 | 10 | 10 | 10 | 10 | 10 | 10 |
| Results of Evaluation | x | x | x | x | Δ | ○ | ○ | ○ | x |
| θ1 (°) | −80 | −70 | −60 | −50 | −40 | −30 | −20 | −10 | 0 |
| θ2 (°) | 20 | 20 | 20 | 20 | 20 | 20 | 20 | 20 | 20 |
| Results of Evaluation | x | x | x | x | Δ | ○ | ○ | ○ | x |
| θ1 (°) | −80 | −70 | −60 | −50 | −40 | −30 | −20 | −10 | 0 |
| θ2 (°) | 30 | 30 | 30 | 30 | 30 | 30 | 30 | −30 | 30 |
| Results of Evaluation | x | x | x | x | Δ | ○ | ○ | ○ | x |
| θ1 (°) | −80 | −70 | −60 | −50 | −40 | −30 | −20 | −10 | 0 |
| θ2 (°) | 40 | 40 | 40 | 40 | 40 | 40 | 40 | 40 | 20 |
| Results of Evaluation | x | x | x | x | x | Δ | Δ | Δ | x |

It should be understood that, when analyzing the transmission ratio relationships shown in FIG. 13, for negative polar angles θn (−20°, −40°, and −60°), within an azimuth angle of φm=±30°, in other words, in the range φ=−30° to +30°, the maximum value of the transmission ratio was constrained to vary within 5%, while for positive polar angles θn (+20°, +40°, and +60°), within an azimuth angle of φm=±30°, in other words, in the range φ=−30° to +30°, the minimum value of the transmission ratio was constrained to vary within 5%.

FIG. 14 is a figure showing the results of measurement of the relationship between polar angle and transmission ratio, for each azimuth angle, in tests of a liquid crystal device which was manufactured using a prior art isotropic frontal scattering film (product name IDS-16K, made by Dainippon Printing Co. Ltd.). In these tests, a liquid crystal device the same as in the previously described test example was utilized, and these are the results of measurements obtained by changing the directional frontal scattering film (an anisotropic frontal film) for an isotropic scattering film.

As is clear from the results of measurement shown in Table 16, it will be understood that, when the polar angles when the parallel transmitted light attains its maximum (the diffused transmitted light attains its minimum) are within the range of −40°≦θ1≦0° and the range 0°≦θ2≦40°, then it is possible to ensure brightness of approximately the same as the prior art; while, when they are within the range of −30°≦θ1≦0° and the range 0°≦θ2≦30°, then the amount by which the incident light is scattered and diffracted when it passes through this film becomes great, and a liquid crystal display device is obtained which is superior in brightness over the prior art.

TEST EXAMPLE 25

Directional frontal scattering diffraction films were prepared by varying the parallel beam transmission ratio T(0, 0) in the normal direction to the directional frontal scattering diffraction film over various values, and the brightnesses of liquid crystal display devices which were equipped with these directional frontal scattering diffraction films were compared in an office under lighting by fluorescent lamps. The prior art product with which comparison was performed was the same as the one used in the previously described test example. The cases which could be perceived as brighter than the reflective type color liquid crystal display device according to the prior art are shown in the following Table 17 by "○", those which were the same by "Δ", and those which were darker by "X".

TABLE 17

| T (0, 0) | 3% | 5% | 10% | 20% | 30% | 40% | 50% | 60% |
|---|---|---|---|---|---|---|---|---|
| Results of Evaluation | Δ | ○ | ○ | ○ | ○ | ○ | Δ | x |

As is clear from the results of measurement shown in Table 17, it is clear that, when the range is 3%≦T(0,0)≦60%, and more desirably is 5%≦T(0,0)≦40%, then it is possible to provide a reflective type color liquid crystal display device which is clearer than the prior art in an environment of actual use.

Next, from the results shown in FIG. 10, FIG. 11, and FIG. 12, it is also clear that, when the azimuth angles φ of the directional frontal scattering film are regulated to be in the ranges of φ1±60° and moreover φ2±60°, then a maximum of the parallel beam transparency is always exhibited for θ1, while a minimum of the parallel beam transmission ratio is always exhibited for θ2.

TEST EXAMPLE 26

Next, a large number of directional frontal scattering diffraction films manufactured by a transparent type hologram technique were prepared, and the results of comparing the brightnesses of the reflective type color display devices when the value of (Tmax/Tmin) was adjusted to various values with a liquid crystal display device according to the previously described prior art are given in the following Table 18. The cases which could be perceived as twice as bright or more as compared with the reflective type color liquid crystal display device according to the prior art are shown in the following Table 18 by "⊙", those which were perceived as brighter than the prior art product by "○", those which were the same by "Δ", and those which were darker by "X".

TABLE 18

| Tmax/Tmin | 10 | 5 | 3 | 2 | 1.8 | 1.5 | 1 |
|---|---|---|---|---|---|---|---|
| Results of Evaluation | ⊙ | ⊙ | ⊙ | ⊙ | ○ | Δ | Δ |

From the results shown in Table 8, it is clear that particularly bright viewing possible when the ratio between the absolute minimum value and the absolute maximum value of the parallel beam transmission ratio explained previously was greater than or equal to 2.

TEST EXAMPLE 27

With the azimuth angle when the parallel beam transmission ratio attained its minimum value or its maximum value being taken to be φ2 or φ1, the ratio between the absolute maximum value and the absolute minimum value of the transmitted light characteristic which was measured by varying the polar angle θ was measured in the ranges φ2±60° and φ1±60°. The brightnesses of the reflective type color liquid crystal display devices were compared in an office under lighting by fluorescent lamps while varying this ratio. The prior art product with which comparison was performed was the same as the one used in the previously described test examples. The cases which could be perceived as brighter than the reflective type color liquid crystal display device according to the prior art are shown in the following Table 19 by "○", those which were the same by "Δ", and those which were darker by "X".

TABLE 19

| absolute maximum value/ absolute minimum value | 5 | 3.5 | 2 | 1.5 | 1.2 | 1 |
|---|---|---|---|---|---|---|
| Results of Evaluation | ○ | ○ | ○ | ○ | Δ | Δ |

From the results shown in Table 9, it is clear that it is desirable for the absolute maximum value/the absolute minimum value to be greater than or equal to 1.5. In other words it is also clear that, when the azimuth angles φ of the directional frontal scattering diffraction film are regulated in the ranges of φ1±60° and moreover φ2±60°, then the ratio between the absolute minimum value and the absolute maximum value of the parallel beam transmission ratio is greater than or equal to 1.5.

TEST EXAMPLE 28

When, for the directional frontal scattering film, the polar angle θ was taken as −60°≦θ≦+60°, the brightness of the reflective type color liquid crystal display device was compared in an office under lighting by fluorescent lamps while varying the maximum value and the minimum value of the parallel beam transmission ratio T. The prior art product with which comparison was performed was the same as the one used in the previously described test examples. The cases which could be perceived as brighter than the reflective type color liquid crystal display device according to the prior art are shown in the following Table 20 by "○", those which were the same by "Δ", and those which were darker by "X".

TABLE 20

| maximum transmission ratio Tmax | 60% | 50% | 40% | 30% | 20% | 10% |
|---|---|---|---|---|---|---|
| minimum transmission ratio Tmin | 1% | 1% | 1% | 1% | 1% | 1% |
| Results of Evaluation | x | x | Δ | Δ | Δ | x |
| maximum transmission ratio Tmax | 60% | 50% | 40% | 30% | 20% | 10% |
| minimum transmission ratio Tmin | 2% | 2% | 2% | 2% | 2% | 2% |
| Results of Evaluation | x | ○ | ○ | ○ | ○ | ○ |
| maximum transmission ratio Tmax | 60% | 50% | 40% | 30% | 20% | 10% |
| minimum transmission ratio Tmin | 5% | 5% | 5% | 5% | 5% | 5% |
| Results of Evaluation | Δ | ○ | ○ | ○ | ○ | ○ |
| maximum transmission ratio Tmax | 60% | 50% | 40% | 30% | 20% | 10% |
| minimum transmission ratio Tmin | 10% | 10% | 10% | 10% | 10% | 10% |
| Results of Evaluation | Δ | ○ | ○ | ○ | ○ | Δ |
| maximum transmission ratio Tmax | 60% | 50% | 40% | 30% | 20% | 10% |
| minimum transmission ratio Tmin | 20% | 20% | 20% | 20% | 20% | 20% |
| Results of Evaluation | x | ○ | ○ | Δ | Δ | x |
| maximum transmission ratio Tmax | 60% | 50% | 40% | 30% | 20% | 10% |
| minimum transmission ratio Tmin | 30% | 30% | 30% | 30% | 30% | 30% |

TABLE 20-continued

| Results of Evaluation | x | Δ | Δ | x | x | x |
|---|---|---|---|---|---|---|
| maximum transmission ratio Tmax | 60% | 50% | 40% | 30% | 20% | 10% |
| minimum transmission ratio Tmin | 40% | 40% | 40% | 40% | 40% | 40% |
| Results of Evaluation | x | x | x | x | x | x |

From the results shown in Table 20, it will be understood that it is necessary for the maximum value/the minimum value to satisfy $\geq 2$, and for the transmission ratio to be greater than or equal to 2% and less than or equal to 50%.

TEST EXAMPLE 29

Using a directional frontal scattering diffraction film (a directional frontal scattering diffraction film which had been made by a transparent type hologram technique) which exhibited a characteristic as shown in FIG. 21 (the relationship between the maximum transmission ratio Tmax and the minimum transmission ratio Tmin satisfied (Tmax/Tmin) ≈50:6≈8.33), the intensity of the transmitted light (the scattered light and the diffracted light) which had passed through the directional frontal scattering diffraction film was investigated.

Figure 30:
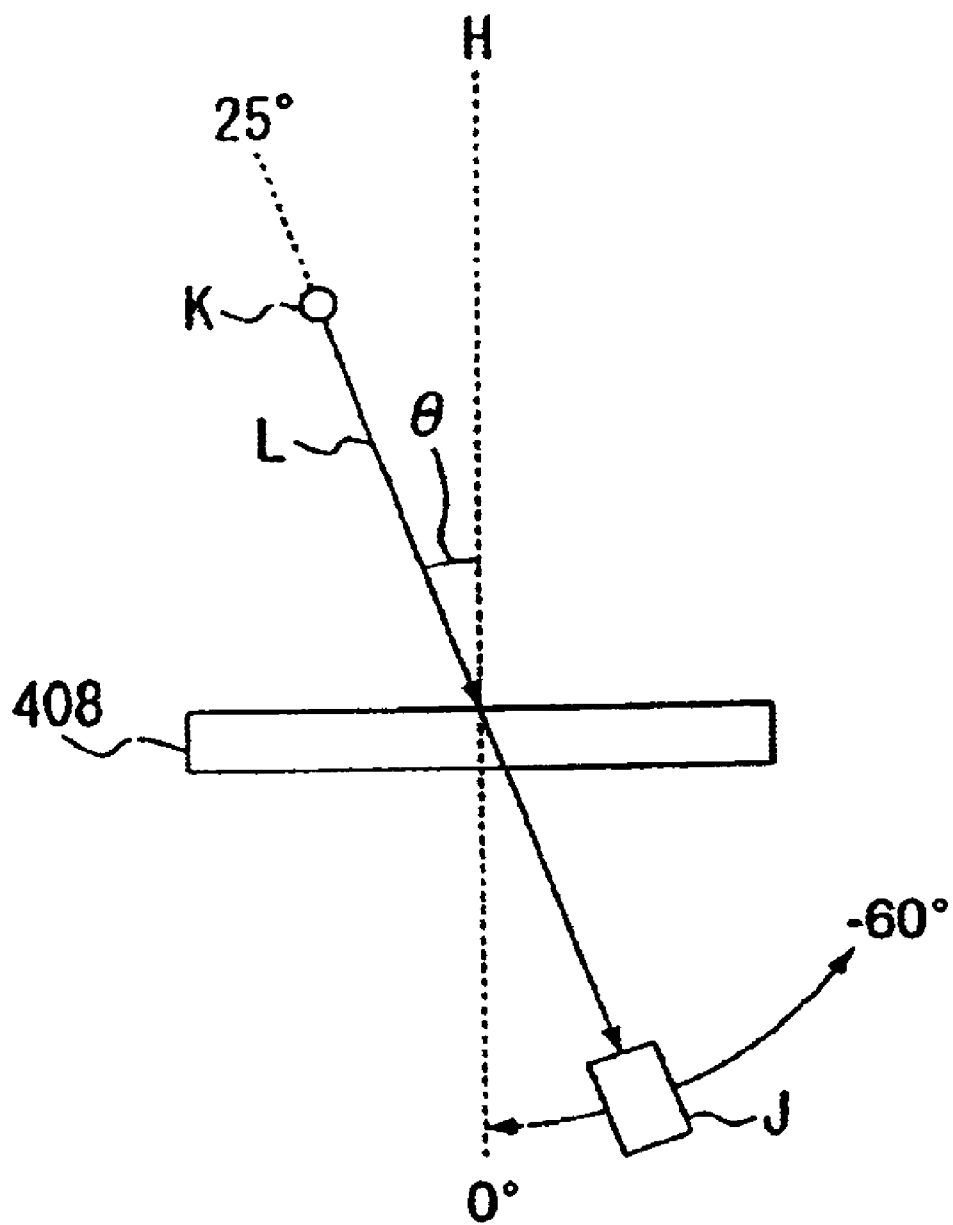
FIG. 30 is an explanatory figure of a method of measurement of the intensity of transmitted light for a test sample.

For the intensity of the transmitted light here, using the measurement system shown in FIG. 30: a directional frontal scattering diffraction film 408 (the directional frontal scattering diffraction film of the embodiment) which exhibited the characteristic and which was of rectangular form in plan view and was of dimension (50×40) mm was arranged horizontally; light L from a (halogen) lamp light source K which was disposed on the surface side of the directional frontal scattering diffraction film 408 (and which was arranged at a position separated by 300 mm from the directional frontal scattering film) was illuminated upon the central portion of the surface of the directional frontal scattering diffraction film 408 at a polar angle θ=25° and an azimuth angle φ=90°; and the relationship between the intensity of the transmitted light and the angle of the light receiving portion J was investigated when the transmitted light which had passed through this directional frontal scattering diffraction film 408 was being received by a light receiving portion J (arranged at a position which was separated from the directional frontal scattering film by 300 mm) comprising a light reception element made from a CCD which was arranged on the rear surface side of the directional frontal scattering film 408 in the range of reception angle from 0° to 60° (an angle (a polar angle)=from 0° to −60° from the normal direction and an azimuth angle of 90°). The results thereof are shown in FIG. 31.

Furthermore, for the sake of comparison, an isotropic frontal scattering film according to the prior art having a characteristic as shown in FIG. 14 was arranged instead of the directional frontal scattering diffraction film, light L from a light source K was illuminated thereupon by the same method as described above, and the relationship between the reception angle when the transmitted light was received by a light receiving portion and the intensity of the transmitted light was investigated. The results thereof are shown in FIG. 31. In FIG. 31, (①) is the characteristic of the directional frontal scattering diffraction film of the embodiment. And (②) is the characteristic of the isotropic frontal scattering film of the comparison example.

Figure 31:
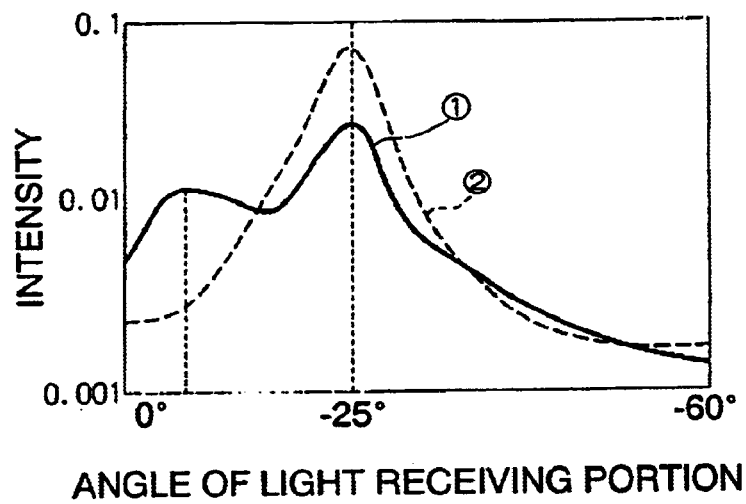
FIG. 31 is a figure showing the transmitted light intensity when the incident light is incident at an angle of 25°, for an embodiment and for a comparison example.

From FIG. 31, with the isotropic frontal scattering film of the comparison example, the peak of the intensity of the transmitted light of light L which was incident at an angle of incidence of 25° is −25°, and as the angle became smaller than 25° (as the angle became close to the normal direction H) the intensity of the transmitted light became smaller. Due to this, with the isotropic frontal scattering film of the comparison example, although the scattered light at angles of the same magnitude as the angle of incidence |θ| of the light L is strong (is great), the scattered light in the angular range smaller than the angle of incidence |θ| of the light L (angles close to the normal direction H) is small. Accordingly, when a reflective layer (one which performs specular surface reflection) is provided upon the lower side of this film (the side upon which the light receiving portion is provided), then the emission angle of the emitted light which is emitted to the upper side of the film (the side opposite to the side upon which the light receiving portion was provided) by the above described scattered light being reflected by this reflective layer and the reflected light passing through the isotropic frontal scattering film becomes of the same magnitude as the angle from the normal direction of the scattered light. Due to this, it will be understood that the reflected light which is emitted in an angular range which is smaller than the regular reflection direction of the light L undesirably becomes weak (small), and it appears to be dark when the user (the observer) observes roughly from the normal direction H of the film which is deviated from the surface reflection direction (−25°) of the light L.

By contrast to this, with the directional frontal scattering diffraction film of the embodiment, although the peak of the intensity of the transmitted light of light L which was incident at an angle of incidence of 25° was −25°,even at angles smaller than 25° (angles close to the normal direction H) the proportional reduction of the intensity of the transmitted light was small, and it will be understood that, at angles smaller than the vicinity of −12° to −13° (angles from the vicinity of −12° to −13° up to the normal direction H), by comparison with the comparison example, the intensity of the transmitted light became high, and in particular, in the vicinity of from −6° to −7°, by comparison with the comparison example, the intensity of the transmitted light increased by twice or more.

Due to this it will be understood that, with the directional frontal scattering diffraction film of the embodiment, the diffracted light and the scattered light are great in the angular range smaller than the angle of incidence |θ| of the light L (angles close to the normal direction H), and that accordingly, when a reflective layer (one which performs specular surface reflection) is provided under this film (the side at which the light receiving portion is provided), the emitted light of the reflected light of the diffracted light and the scattered light described above which is reflected by this reflective layer and which passes through this directional frontal scattering diffraction film and is emitted at the upper side of the film (the side which is opposite to the side on which the light receiving portion is provided) is emitted strongly (greatly) in an angular range which is smaller than the regular reflection direction of the light L, so that, when the user (the observer) observes roughly from the normal direction H to the film which is deviated from the surface reflection directnio of the light L (−25°), it is clear as compared with the comparison example.

TEST EXAMPLE 30

The state in which the user (the observer) was using the liquid crystal device was investigated.

Here, the distribution of light such as illumination light and the like which was incident upon the liquid crystal panel at an angle of incidence θ was investigated when the user (the observer) 124 was using the reflective type liquid crystal device of the embodiment shown in FIG. 1, FIG. 23, and FIG. 3. The results are shown in Table 21 below, and in FIG. 32.

TABLE 21

| | angle of incidence \|θ\| (degrees) | | | | | | | | |
|---|---|---|---|---|---|---|---|---|---|
| | 0 | 5 | 10 | 15 | 20 | 25 | 30 | 35 | 40 | 45 |
| number of users | 0 | 0 | 2 | 5 | 34 | 44 | 20 | 16 | 2 | 1 |

Figure 32:
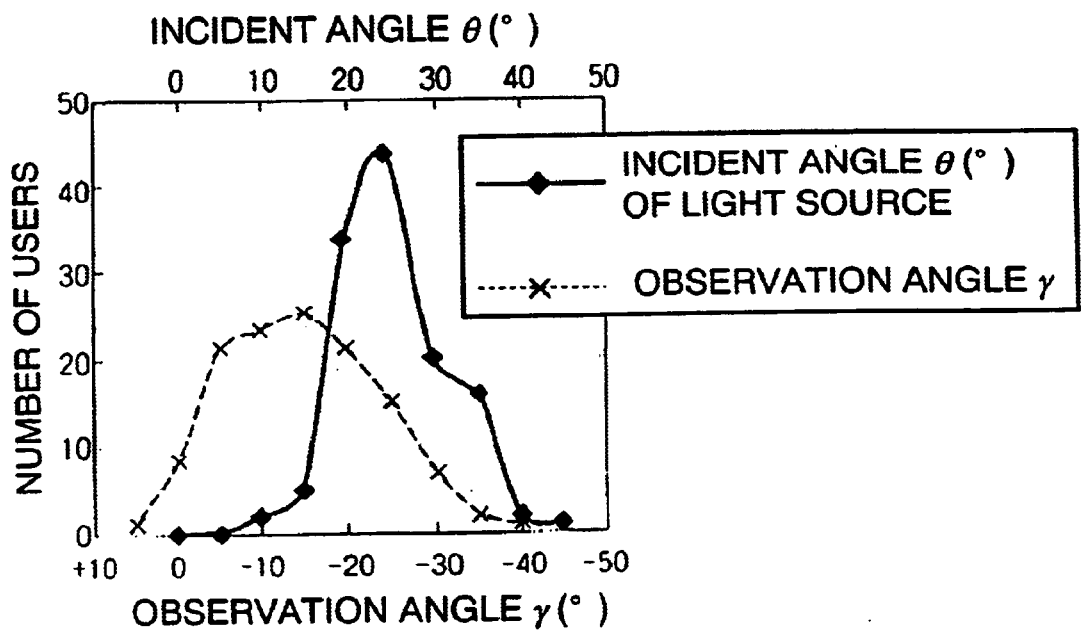
FIG. 32 is a figure showing the distribution of the incident angle and the observation angle, when the liquid crystal display device is used.

From the results shown in Table 21 and FIG. 32 it will be understood that normally, when the user (the observer) is observing the display of the liquid crystal device, very often he employs light such as illumination light or the like which is incident upon the liquid crystal panel 10 at a sloping angle within a range of from 20° to 35° with respect to the normal to the liquid crystal panel as incident light. It should be understood that, when the same test was performed for the case of the use of the reflective type liquid crystal device according to the prior art which used an isotropic scattering film shown in FIG. 34A, almost the same results as those in Table 21 were obtained.

Next, the distribution of the observation angle γ (the angle of the observation direction with respect to the normal to the liquid crystal panel) was investigated when the above described user 124 was observing the reflected light of the incident light which was incident upon the liquid crystal panel of the liquid crystal device of the embodiment shown in FIG. 1, FIG. 23, and FIG. 3 at a sloping angle within a range of from 20° to 35° with respect to the normal. The results are shown in Table 22 below, and in FIG. 32.

TABLE 22

| | observation angle γ (degrees) | | | | | | | | | |
|---|---|---|---|---|---|---|---|---|---|---|
| | 5 | 0 | −5 | −10 | −15 | −20 | −25 | −30 | −35 | −40 |
| number of users | 1 | 8 | 21 | 23 | 25 | 21 | 15 | 7 | 2 | 1 |

From the results shown in Table 22 and FIG. 32 it will be understood that there are many users who observe from a direction from −30° to 0° (the observation angle γ is in the range of from −30° to 0°) separated from the regular reflection direction of the incident light (a range of from −20° to −35° with respect to the normal) which is incident upon the liquid crystal panel at a sloping angle within a range of from 20° to 35° with respect to the normal to the liquid crystal panel of the embodiment shown in FIG. 1, FIG. 23, and FIG. 3. It should be understood that, when the same test was performed for the case of the use of the reflective type liquid crystal device according to the prior art which used an isotropic scattering film shown in FIG. 34A, almost the same results as those in Table 22 were obtained.

Next, the relationship between the angle of incidence θ and the observation angle γ was investigated from the above described Table 21 and Table 22. The results thereof are shown in Table 23.

TABLE 23

| | \|θ\| − \|γ\| (degrees) | | | | | | | | |
|---|---|---|---|---|---|---|---|---|---|
| | 0 | 5 | 10 | 15 | 20 | 25 | 30 | 35 | 40 |
| number of users | 1 | 16 | 28 | 41 | 30 | 7 | 1 | 0 | 0 |

From the results of Table 23, it will be understood that it often happens that, when the user is observing the display of the liquid crystal device, the absolute value of the observation angle γ is from 5° to 20° smaller than the absolute value of the angle of incidence θ.

Figure 34A:
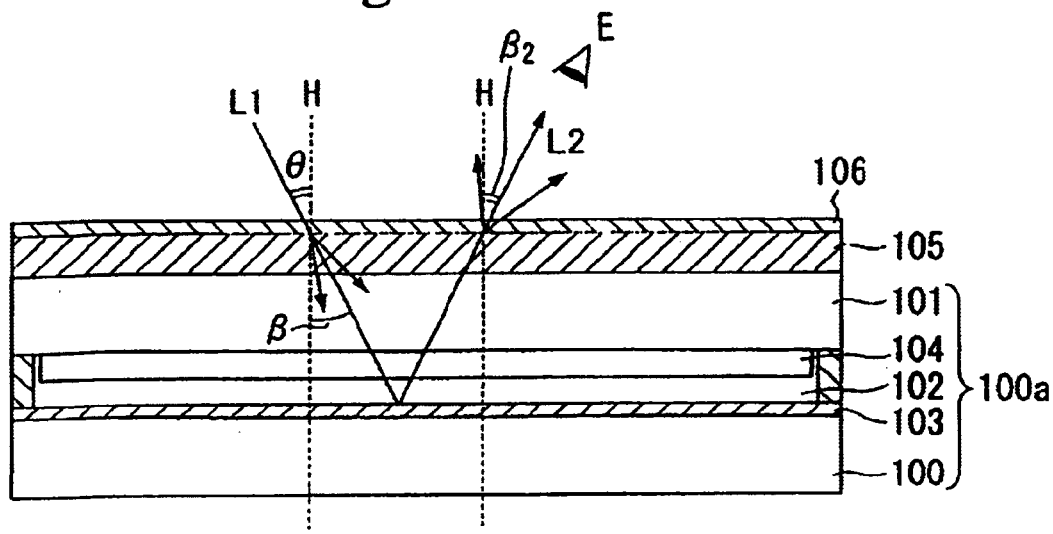
FIGS. 34A and 34B are figures showing prior art reflective type liquid crystal devices.
Figure 34B:
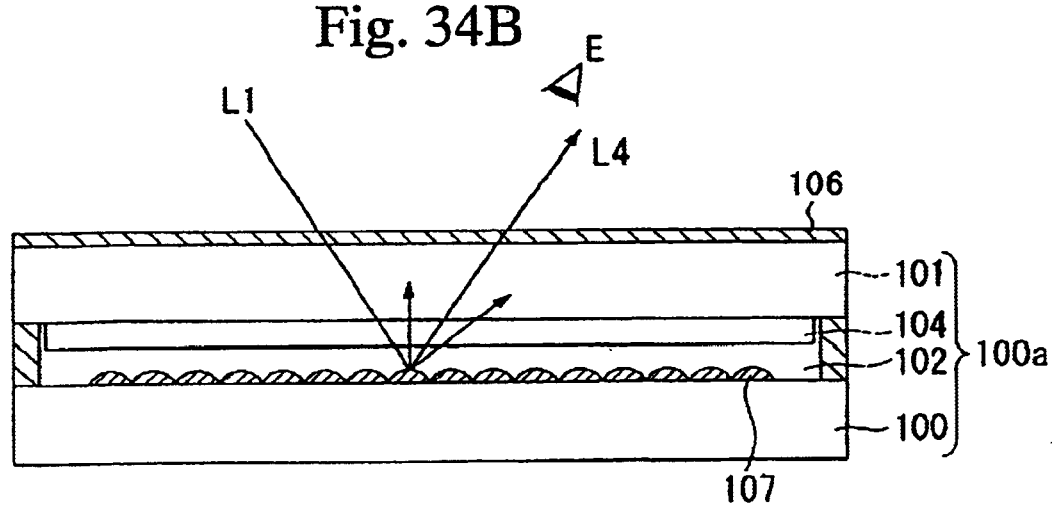

It should be understood that, when the same test was performed for the case of the use of the reflective type liquid crystal device according to the prior art which used an isotropic scattering film shown in FIG. 34A, almost the same results as those in Table 23 were obtained.

From the above, when it is arranged for a directional frontal scattering diffraction film such that the difference between the absolute value of the angle of incidence θ of the incident light and the absolute value of the angle of diffraction α of the incident light is in the range of from 5° to 20° to be provided to the liquid crystal panel, it is possible to cause the reflected light of the diffracted light to be emitted strongly (in great quantity) from 5° to 20° towards the normal direction from the regular reflection direction of the above described incident light, and it is considered that it is possible for the display to be seen brightly and vividly, when the display is observed at an observation angle |γ| from 5° to 20° smaller than the absolute value |θ| of the angle of incidence. Accordingly, with the reflective type liquid crystal display device of the embodiment in which, to the liquid crystal panel, a directional frontal scattering diffraction film is provided which has a characteristic like the one shown in FIG. 10 (the relationship between the maximum transmission ratio Tmax and the minimum transmission ratio Tmin of the parallel transmitted light satisfies (Tmax/Tmin) ≈50:6≈8.33), or which has the characteristic shown in FIG. 31 by ①, it will be understood that it is possible to enhance the brightness when observing roughly from the normal direction of the liquid crystal panel which is deviated from the surface reflection direction of the panel, and a sharp display is obtained; and furthermore that, in particular, a bright and sharp display is obtained when the display is observed at an observation angle |γ| which is from 5° to 20° smaller than |θ|.

As has been explained above, according to the liquid crystal device of the present invention, with a liquid crystal display device of a reflective type or a semi-transparent reflective type which is provided with a directional frontal scattering diffraction film, by arranging the directional frontal scattering diffraction film upon the liquid crystal panel so that the polar angle direction which gives the minimum transmission ratio is upon the light reception side and the polar angle direction which gives the maximum transmission ratio is upon the observation direction side, the azimuth angle φ2 when the minimum transmission ratio of the parallel transmitted light is exhibited becomes the direction of the angle of incidence, and the azimuth angle φ1 when the maximum transmission ratio of the parallel transmitted light is exhibited becomes the direction of the observer. Thus, although the light which is incident upon the directional frontal scattering diffraction film is subjected to great scattering and diffraction upon incidence (i.e., is strongly scattered and diffracted), since the amount of scattering and diffraction of the light which is reflected by the reflective layer or the semi-transparent reflective layer within the liquid crystal panel and then passes through the directional frontal scattering diffraction film for a second time is small (there is almost no scattering or diffraction), as a result a sharp display is obtained in which there is little blurring of the pattern which is displayed on the display.

Embodiments of the Electronic Apparatus

Next, concrete examples of electronic apparatuses which may be equipped with any of the liquid crystal devices of the above described embodiments will be explained.

Figure 33A:
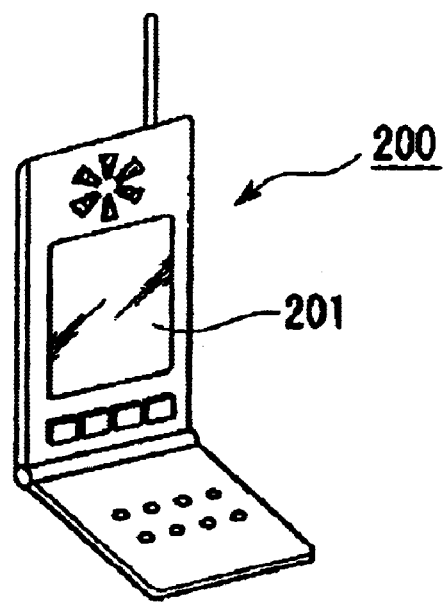
FIGS. 33A, 33B, and 33C are figures showing examples of the application of the electronic apparatus of the present invention.

FIG. 33A is a perspective view showing an example of a portable telephone.

In FIG. 33A, the reference symbol 200 denotes the main body of the portable telephone, while the reference symbol 201 denotes a liquid crystal display section which employs any one of the liquid crystal devices of the above described embodiments.

Figure 33B:
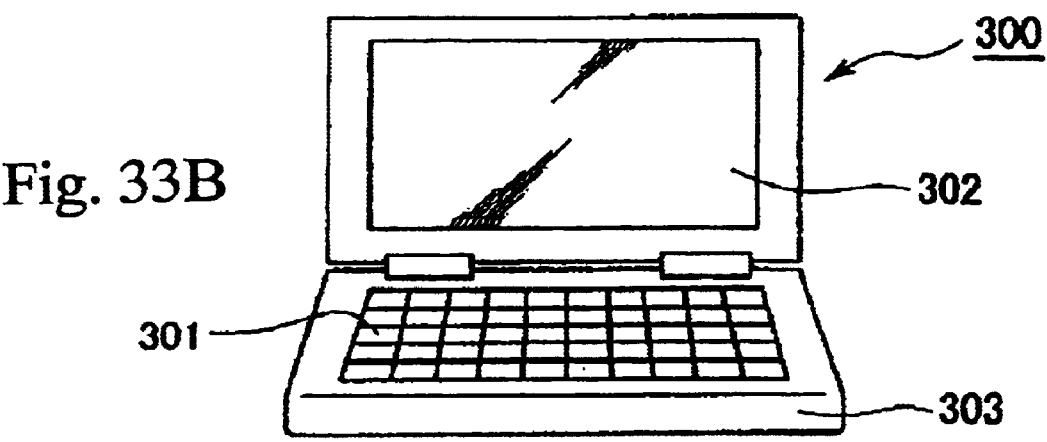

FIG. 33B is a perspective view showing an example of a portable type information processing device such as a word processor or a personal computer or the like.

In FIG. 33B, the reference symbol 300 denotes the information processing device, the reference symbol 301 denotes an input section such as a keyboard or the like, the reference symbol 303 denotes the main body of the information processing device, and the reference symbol 302 denotes a liquid crystal display section which employs any one of the liquid crystal devices of the above described embodiments.

Figure 33C:
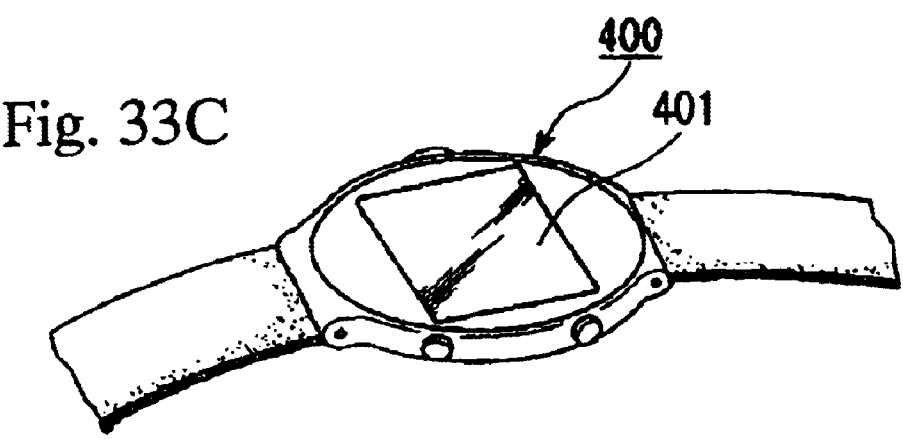

FIG. 33C is a perspective view showing an example of a wristwatch type electronic apparatus.

In FIG. 33C, the reference symbol 400 denotes the main body of the watch, while the reference symbol 401 denotes a liquid crystal display section which employs any one of the liquid crystal devices of the above described embodiments.

Any one of the electronic apparatuses shown in FIGS. 33A through 33C is one in which there is no blurring of the pattern which is displayed on the display, in which there is a bright and sharp display, and in which the display quality is excellent, since a liquid crystal display section (display means) is incorporated which utilizes any one of the liquid crystal devices of the above described embodiments.

What is claimed is:

1. A liquid crystal device, wherein the liquid crystal device is provided with a liquid crystal panel which comprises a pair of base plates, a liquid crystal layer which is sandwiched between these base plates, a reflective layer or a semi-transparent reflective layer which is provided on the liquid crystal layer side of one of said base plates, and a directional frontal scattering film which is provided on the side of the other one of said base plates opposite to its liquid crystal layer side; and wherein when light from a light source which is arranged on the one surface side of said directional frontal scattering film is illuminated thereupon, and the parallel transmitted light, which excludes the diffused transmitted light from the entire transmitted light which has passed through said directional frontal scattering film, is observed by a light receiving portion which is arranged on the other surface side of said directional frontal scattering film and when the angle of incidence of the incident light with respect to the normal to said directional frontal scattering film is defined as the polar angle θn, the incident light angle of the in-plane direction of said directional frontal scattering film is defined as the azimuth angle φm, the maximum transmission ratio of the parallel transmitted light is defined as Tmax (φ1, θ1), and the minimum transmission ratio of the parallel transmitted light is defined as Tmin (φ2, θ2), then said directional frontal scattering film is arranged in said liquid crystal panel so that the incident light side when the polar angle and the azimuth angle yield the minimum transmission ratio is upon the light reception side of said liquid crystal panel, and so that the incident light side when the polar angle and the azimuth angle yield the maximum transmission ratio is upon the observation direction side of said liquid crystal panel.

2. A liquid crystal device as described in claim 1, wherein when the maximum transmission ratio of said parallel transmitted light is taken as Tmax(φ1, θ1) and the minimum transmission ratio of said parallel transmitted light is taken as Tmax(φ2, θ2), then the relationship φ1=φ2±180° is satisfied.

3. A liquid crystal device as described in claim 1, wherein the ratio between the maximum transmission ratio Tmax and the minimum transmission ratio Tmin of said parallel transmitted light satisfies the relationship (Tmax/Tmin)≧2.

4. A liquid crystal device as described in claim 1, wherein the polar angle θ1 when said parallel transmitted light attains its maximum is within the range
−40°≦θ1≦0° or the range 0°>θ1>40°.

5. A liquid crystal device as described in claim 1, wherein the polar angle θ1 when said parallel transmitted light attains its maximum is within the range
30°>θ1>10° or the range 10°>θ1>30°.

6. A liquid crystal device as described in claim 1, wherein the polar angle θ2 when said parallel transmitted light attains its minimum is within the range
40°>θ2>0° or the range 0°>θ>40°.

7. A liquid crystal device as described in claim 1, wherein the polar angle θ2 when said parallel transmitted light attains its minimum is within the range
30°>θ2>10° or the range 10°>θ2>30°.

8. A liquid crystal device as described in claim 1, wherein, when the parallel beam transmission ratio in the normal direction to said directional frontal scattering film is defined as T(0,0), the relationship 3% T(0,0) 50% is satisfied.

9. A liquid crystal device as described in claim 1, wherein, when the parallel beam transmission ratio in the normal direction to said directional frontal scattering film is defined as T(0,0), the relationship 5% T(0,0) 40% is satisfied.

10. A liquid crystal device as described in claim 1, wherein, when the azimuth angle φ of said directional frontal scattering film is regulated in the ranges of φ1±60° and moreover φ2±60°, the parallel beam transmission ratio always exhibits a maximum at θ1, and the parallel beam transmission ratio always exhibits a minimum at θ2.

11. A liquid crystal device as described in claim 1, wherein, when the azimuth angle p of said directional frontal scattering film is regulated in the ranges of  1±60° and moreover φ2±60°, the ratio between the absolute minimum value and the absolute maximum value of the parallel beam transmission ratio is greater than or equal to 1.5.

12. A liquid crystal device as described in claim 1, wherein the parallel beam transmission ratio, when the polar angle of the direction orthogonal to the azimuth angle θ1 which gives the maximum transmission ratio for the parallel transmitted light and the azimuth angle φ2 which gives the minimum transmission ratio for the parallel transmitted light is varied in the range of ±40° to 40°, is made to be greater than or equal to the normal direction transmission ratio of said directional frontal scattering film.

13. A liquid crystal device as described in claim 1, wherein, when said polar angle θ is in the range of ±60° to 60°, the transmission ratio $T(\phi,\theta)$ is greater than or equal to 2% and less than or equal to 50%.

14. A liquid crystal device as described in claim 1, wherein electrodes for driving the liquid crystal are provided upon the liquid crystal layer side of said one of said base plates and upon the liquid crystal layer side of said other of said base plates.

15. A liquid crystal device as described in claim 1, wherein a color filter is provided on the liquid crystal layer side of one or the other of said pair of base plates.

16. A liquid crystal device as described in claim 1, wherein said reflective layer or said semi-transparent reflective layer has minute concavities and convexities.

17. A liquid crystal device as described in claim 1, wherein said directional frontal scattering film has the function of causing scattering and also diffraction of light incident from the azimuth angle which gives the minimum transmission ratio Tmin($\phi$2, $\theta$2).

18. A liquid crystal device, wherein there is provided, on the observation side of a liquid crystal device as described in claim 1, at least one of a transparent protective plate, a light conducting element of a front light illumination device, and a touch key.

19. A liquid crystal device, wherein the liquid crystal device is provided with a liquid crystal panel which comprises a pair of base plates, a liquid crystal layer which is sandwiched between these base plates, a reflective layer or a semi-transparent reflective layer which is provided on the liquid crystal layer side of one of said base plates, and a directional frontal scattering film which is provided on the side of the other one of said base plates opposite to its liquid crystal layer side; and in that, when light from a light source which is arranged on the one surface side of said directional frontal scattering film is illuminated thereupon, and the parallel transmitted light, which excludes the diffused transmitted light from the entire transmitted light which has passed through said directional frontal scattering film, is observed by a light receiving portion which is arranged on the other surface side of said directional frontal scattering film and when the angle of incidence of the incident light with respect to the normal to said directional frontal scattering film is defined as the polar angle $\theta$n, the incident light angle of the in-plane direction of said directional frontal scattering film is defined as the azimuth angle $\phi$m, the maximum transmission ratio of the parallel transmitted light is defined as Tmax ($\phi$1, $\theta$1), and the minimum transmission ratio of the parallel transmitted light is defined as Tmin ($\phi$2, $\theta$2), then said directional frontal scattering film is arranged in said liquid crystal panel so that the incident light side when the polar angle and the azimuth angle yield the minimum transmission ratio is upon the light reception side of said liquid crystal panel, and so that the incident light side when the polar angle and the azimuth angle yield the maximum transmission ratio is upon the observation direction side of said liquid crystal panel; and wherein said directional frontal scattering film is set so that the hue of the diffused transmitted light which has been incident upon and has passed through said directional frontal scattering film from a polar angle direction and an azimuth angle direction which yield the minimum transmission ratio for light from said light source satisfies $b^*<0$ as expressed in the $L^*a^*b^*$ color system.

20. A liquid crystal device as described in claim 19, wherein said directional frontal scattering film is set so that the hue of diffused transmitted light from said light source which has been illuminated upon said directional frontal scattering film from the polar angle and the azimuth angle direction which yield the minimum transmission ratio and has passed through it, as expressed in the $L^*a^*b^*$ color display system, satisfies $-6<b^*<0$.

21. A liquid crystal device as described in claim 19, wherein said directional frontal scattering film is set so that the hue of diffused transmitted light from said light source which has been illuminated upon said directional frontal scattering film from the polar angle and the azimuth angle direction which yield the minimum transmission ratio and has passed through it, as expressed in the $L^*a^*b^*$ color display system, satisfies $-10<a^*<10$.

22. A liquid crystal device as described in claim 19, wherein said directional frontal scattering film is set so that the hue of diffused transmitted light from said light source which has been illuminated upon said directional frontal scattering film from the polar angle and the azimuth angle direction which yield the minimum transmission ratio and has passed through it, as expressed in the $L^*a^*b^*$ color display system, satisfies $-5<a^*<5$.

23. A liquid crystal device as described in claim 19, wherein the ratio between the maximum transmission ratio Tmax and the minimum transmission ratio Tmin of said parallel transmitted light satisfies the relationship (Tmax/Tmin)$\geq$2.

24. A liquid crystal device as described in claim 19, wherein electrodes for driving the liquid crystal are provided upon the liquid crystal layer side of said one of said base plates and upon the liquid crystal layer side of said other of said base plates.

25. A liquid crystal device as described in claim 19, wherein a color filter is provided on the liquid crystal layer side of one or the other of said pair of base plates.

26. A liquid crystal device as described in claim 19, wherein said reflective layer or said semi-transparent reflective layer has minute concavities and convexities.

27. A liquid crystal device, wherein the liquid crystal device is provided with a liquid crystal panel which comprises a pair of base plates, a liquid crystal layer which is sandwiched between these base plates, a reflective layer or a semi-transparent reflective layer which is provided on the liquid crystal layer side of one of said base plates, and a directional frontal scattering film which is provided on the side of the other one of said base plates opposite to its liquid crystal layer side;

wherein when light from a light source which is arranged on the one surface side of said directional frontal scattering film is illuminated thereupon, and the parallel transmitted light, which excludes the diffused transmitted light from the entire transmitted light which has passed through said directional frontal scattering film, is observed by a light receiving portion which is arranged on the other surface side of said directional frontal scattering film and when the angle of incidence of the incident light with respect to the normal to said directional frontal scattering film is defined as the polar angle $\theta$n, the incident light angle of the in-plane direction of said directional frontal scattering film is defined as the azimuth angle $\phi$m, the maximum transmission ratio of the parallel transmitted light is defined as Tmax ($\phi$1, $\theta$1), and the minimum transmission ratio of the parallel transmitted light is defined as Tmin ($\phi$2, $\theta$2), then said directional frontal scattering film is arranged in said liquid crystal panel so that the incident light side when the polar angle and the azimuth angle yield the minimum transmission ratio is upon the light reception side of said liquid crystal panel, and so that the incident light side when the polar angle and the azimuth angle yield the maximum transmission ratio is upon the observation direction side of said liquid crystal panel; and wherein furthermore said directional frontal scattering film is arranged so that the azimuth angle φ2 direction which yields the minimum transmission ratio for the parallel transmitted light which has passed through said directional frontal scattering film and the long axis direction of the nematic liquid crystal molecules which are positioned at the central portion of said liquid crystal layer when the applied voltage between said base plates has been cancelled match one another, and, when voltage has been applied between said base plates, the long axis direction of said liquid crystal molecules is the direction in which said liquid crystal molecules respond to the electric field.

28. A liquid crystal device as described in claim 27, wherein with said directional frontal scattering film, the direction of the azimuth angle φ2 for which the parallel transmitted light which has passed through said directional frontal scattering film exhibits the minimum transmission ratio, ±30°, and the long axis direction of the nematic crystal molecules which are positioned in the central portion of the liquid crystal layer when the voltage applied between said base plates is cancelled, match one another.

29. A liquid crystal device as described in claim 27, wherein the nematic liquid crystal molecules of said liquid crystal layer are set to a twist angle of 60° to 80°, and, when the voltage applied between said base plates has been cancelled, the nematic liquid crystal molecules which are positioned at the central portion of the liquid crystal layer are twisted with respect to the nematic liquid crystal molecules which are disposed at the base plate surfaces by 30° to 40°.

30. A liquid crystal device as described in claim 27, wherein the nematic liquid crystal molecules of said liquid crystal layer are set to a twist angle of 240° to 255°, and, when the voltage applied between said base plates has been cancelled, the nematic liquid crystal molecules which are positioned at the central portion of the liquid crystal layer are twisted with respect to the nematic liquid crystal molecules which are disposed at the base plate surfaces by 120° to 127.5°.

31. A liquid crystal device as described in claim 27, wherein the ratio between the maximum transmission ratio Tmax and the minimum transmission ratio Tmin of said parallel transmitted light satisfies the relationship (Tmax/Tmin)≧2.

32. A liquid crystal device as described in claim 27, wherein electrodes for driving the liquid crystal are provided upon the liquid crystal layer side of said one of said base plates and upon the liquid crystal layer side of said other of said base plates.

33. A liquid crystal device as described in claim 27, wherein a color filter is provided on the liquid crystal layer side of one or the other of said pair of base plates.

34. A liquid crystal device as described in claim 27, wherein said reflective layer or said semi-transparent reflective layer has minute concavities and convexities.

35. A liquid crystal device, wherein the liquid crystal device is provided with a liquid crystal panel which comprises a pair of base plates, a liquid crystal layer which is sandwiched between these base plates, a reflective layer or a semi-transparent reflective layer which is provided on the liquid crystal layer side of one of said base plates, and a directional frontal scattering film which is provided on the side of the other one of said base plates opposite to its liquid crystal layer side;

wherein when light from a light source which is arranged on the one surface side of said directional frontal scattering film is illuminated thereupon, and the parallel transmitted light, which excludes the diffused transmitted light from the entire transmitted light which has passed through said directional frontal scattering film, is observed by a light receiving portion which is arranged on the other surface side of said directional frontal scattering film and when the angle of incidence of the incident light with respect to the normal to said directional frontal scattering film is defined as the polar angle θn, the incident light angle of the in-plane direction of said directional frontal scattering film is defined as the azimuth angle φm, the maximum transmission ratio of the parallel transmitted light is defined as Tmax (φ1, θ1), and the minimum transmission ratio of the parallel transmitted light is defined as Tmin (φ2, θ2), then said directional frontal scattering film is arranged upon said liquid crystal panel so that the incident light side when the polar angel and the azimuth angle yield the minimum transmission ratio is upon the light reception side of said liquid crystal panel, and so that the incident light side when the polar angle and the azimuth angle yield the maximum transmission ratio is upon the observation direction side of said liquid crystal panel; and wherein furthermore said directional frontal scattering film is arranged so that the azimuth angle φ2 direction which yields the minimum transmission ratio for the parallel transmitted light which has passed through said directional frontal scattering film, and the in-plane direction in which the contrast of the liquid crystal panel is high for incident light of which the incident light angle is from 10° to 30° from the polar angle direction, match one another.

36. A liquid crystal device as described in claim 35, wherein said directional frontal scattering film is arranged so that the direction of the azimuth angle φ2 for which the parallel transmitted light which has passed through said directional frontal scattering film exhibits the minimum transmission ratio, ±30°, and the in-plane direction for which the contrast of the liquid crystal panel is high for incident light whose angle of light incidence from the polar angle direction is from 10° to 30°, match one another.

37. A liquid crystal device, wherein the liquid crystal device is provided with a liquid crystal panel which comprises a pair of base plates, a liquid crystal layer which is sandwiched between these base plates, a reflective layer or a semi-transparent reflective layer which is provided on the liquid crystal layer side of one of said base plates, and a directional frontal scattering diffraction film which is provided on the side of the other one of said base plates opposite to its liquid crystal layer side; and wherein when light from a light source which is arranged on the one surface side of said directional frontal scattering diffraction film is illuminated thereupon, and the parallel transmitted light, which excludes the diffused transmitted light from the entire transmitted light which has passed through said directional frontal scattering diffraction film, is observed by a light receiving portion which is arranged on the other surface side of said directional frontal scattering diffraction film and when the angle of incidence of the incident light with respect to the normal to said directional frontal scattering diffraction film is defined as the polar angle θn, the incident light angle of the in-plane direction of said directional frontal scattering film is defined as the azimuth angle φm, the maximum transmission ratio of the parallel transmitted light is defined as Tmax (φ1, θ1), and the minimum transmission ratio of the parallel transmitted light is defined as Tmin (φ2, θ2), then said directional frontal scattering diffraction film is arranged upon said liquid crystal panel so that the incident light side when the polar angle and the azimuth angle yield the minimum transmission ratio is upon the light reception side of said liquid crystal panel, and so that the incident light side when the polar angle and the azimuth angle yield the maximum transmission ratio is upon the observation direction side of said liquid crystal panel.

38. A liquid crystal device as described in claim 37, wherein when the maximum transmission ratio of said parallel transmitted light is taken as Tmax(φ1, θ1) and the minimum transmission ratio of said parallel transmitted light is taken as Tmax(φ2, θ2), then the relationship φ1=φ2±180° is satisfied.

39. A liquid crystal device as described in claim 37, wherein said directional frontal scattering diffraction film is made so that, when the angle of incidence of incident light which is illuminated upon said directional frontal scattering diffraction film from said light reception side with respect to the normal to said film is defined as θ, and the angle of diffraction of diffracted light which has been diffracted when said incident light has passed through said directional frontal scattering diffraction film with respect to the normal to said film is defined as a, said incident light and said diffracted light satisfy the relationship $|\alpha|<|\theta|$.

40. A liquid crystal device as described in claim 37, wherein said directional frontal scattering diffraction film is made so that, when the angle of incidence of incident light which is illuminated upon said directional frontal scattering diffraction film from said light reception side with respect to the normal to said film is defined as θ, and the angle of diffraction of diffracted light which has been diffracted when said incident light has passed through said directional frontal scattering diffraction film with respect to the normal to said film is defined as α, said incident light and said diffracted light satisfy the relationship $-5°\leq|\theta|-|\alpha|\leq 2°$.

41. A liquid crystal device as described in claim 37, wherein said directional frontal scattering diffraction film is a hologram.

42. A liquid crystal device as described in claim 37, wherein electrodes for driving the liquid crystal are provided upon the liquid crystal layer side of said one of said base plates and upon the liquid crystal layer side of said other of said base plates.

43. A liquid crystal device as described in claim 37, wherein a color filter is provided on the liquid crystal layer side of one or the other of said pair of base plates.

44. A liquid crystal device as described in claim 37, wherein minute concavities and convexities are formed upon the surface of said reflective layer or said semi-transparent reflective layer.

45. A liquid crystal device as described in claim 37, wherein a planar light emitting element which emits illumination light is provided to said liquid crystal panel side upon the opposite side of said directional frontal scattering diffraction film to said other base plate side thereof.

46. A liquid crystal device as described in claim 37, wherein an input device which is formed to include at least one of said base plates, and which detects a position coordinate by input due to pressing said base plate surface, is provided upon the side of the directional frontal scattering diffraction film opposite to the side of the other base plate of said liquid crystal device, or upon the side of said planar light generation element opposite to the side of the directional frontal scattering diffraction film.

47. A liquid crystal device as described in claim 37, wherein an optically transparent protective plate is provided upon the side of said directional frontal scattering diffraction film opposite to the side of the other base plate, or upon the side of said planar light generation element opposite to the side of said directional frontal scattering diffraction film, or upon the side of said input device opposite to the side of said directional frontal scattering diffraction film, or upon the side of said input device opposite to said planar light generation element.

48. An electronic apparatus, characterized by comprising as a display means a liquid crystal device as described in claim 1.

* * * * *